United States Patent [19]
Lew et al.

[11] Patent Number: 5,486,876
[45] Date of Patent: Jan. 23, 1996

[54] VIDEO INTERFACE UNIT FOR MAPPING PHYSICAL IMAGE DATA TO LOGICAL TILES

[75] Inventors: Stephen D. Lew; Gerry C. Luikuo; Thomas G. Kopet, all of Colorado Springs, Colo.

[73] Assignees: Array Microsystems, Inc., Colorado Springs, Colo.; Samsung Electronics Co. Ltd., Seoul, Rep. of Korea

[21] Appl. No.: 54,684

[22] Filed: Apr. 27, 1993

[51] Int. Cl.$^6$ ................................. H04N 5/907
[52] U.S. Cl. .................... 348/719; 345/190; 395/166
[58] Field of Search .......................... 358/21 R, 100; 345/185, 189, 190, 200, 133; 395/164, 166; 348/719, 716, 718; H04N 5/907

[56] References Cited

U.S. PATENT DOCUMENTS

| | | | |
|---|---|---|---|
| 4,646,270 | 2/1987 | Vess | 345/189 |
| 4,716,460 | 12/1987 | Benson et al. | 358/160 |
| 4,800,431 | 1/1989 | Deering | 358/160 |
| 4,847,809 | 7/1989 | Suzuki | 345/190 |
| 4,965,751 | 10/1990 | Thayer et al. | 345/190 |
| 5,124,692 | 6/1992 | Sasson | 358/22 |
| 5,311,211 | 5/1994 | Simpson | 345/189 |

OTHER PUBLICATIONS

DeVos, "VLSI–Architectures for the Hierarchical Block–Matching Algorithm for HDTV Application," *SPIE Visual Communications and Image Processing*, vol. 1360, pp. 398–409, (1990).
"IIT Vision Processor, Single–Chip Microcode–Driven VSP for DCT–based Algorithms, Preliminary Data Sheet," *Integrated Information Technology Inc.*, Sep. 1991.
"Using the IIT Vision Processor in JPEG Applications," *Integrated Information Technology, Inc.*, Sep., 1991.
"Video Compression Processor Handles Multiple Protocols," *Electronic Products*, p. 85, Oct. 1991.
Leonard, M., "Silicon Solution Merges Video, Stills, and Voice," *Electronic Design*, pp. 45–54, Apr. 2, 1992.
"AT&T Chip Set Overview—Competition," *Array Microsystems—Proprietary*, Apr. 7, 1992.
Grunin, L., "Image Compression for PC Graphics," *PC Magazine*, pp. 337–350, Apr. 28, 1992.
"Integrated Vision Module, Advance Information Data Sheet", *Integrated Information Technology, Inc.*, No Date.
Kummerow, et al., "A Multiprocessor Based Low Bitrate Video Codec Architecture and a Well–Adapted Two Phase Software Coding Strategy," *SPIE Visual Communications and Image Processing IV*, vol. 1199, pp. 237–247, (1989).
Yang, et al., "Very High Efficiency VLSI Chip–Pair for Full Search Block Matching with Fractional Precision," IEEE, pp. 2437–2440, (1989).
"Motion Estimation Processor," *STI3220 SGS–Thomson Microelectronics*, Jul., 1990.
"L64720 Video Motion Estimation Processor (MEP) Preliminary", *LSI Logic Corporation*, Jul., 1990.
"Video Compression Chip Set," *LSI Logic Corporation*, Sep. 27, 1990.

*Primary Examiner*—James J. Groody
*Assistant Examiner*—Jeffrey A. Murrell
*Attorney, Agent, or Firm*—Townsend & Townsend Khourie and Crew

[57] ABSTRACT

A video interface unit for transferring image data between video memory and video processing components interfaces with a video bus. The video interface unit has a partionable data buffer. The partionable buffer enables data to be accessed without redundant fetches of image data and for associated processing of data to be interleaved.

25 Claims, 36 Drawing Sheets

ODD FIELDS (1, 3, 5, ...)

EVEN FIELDS (2, 4, 6, ...)

VkLSWP(corgsel) = 0
VkINTLV = 0

VkLSWP(corgsel) = 1
VkINTLV = 0

FIG. 1C

VIDEO DATA BUS # 0

|   | 0 | 1 | 2 | 3 | 4 | 5 | 6 | 7 |
|---|---|---|---|---|---|---|---|---|
| 0 | 00 |   | 02 |   | 04 |   | 06 |   |
| 1 | 20 |   | 22 |   | 24 |   | 26 |   |
| 2 | 40 |   | 42 |   | 44 |   | 46 |   |
| 3 | 60 |   | 62 |   | 64 |   | 66 |   |

VIDEO DATA BUS # 1

|   | 0 | 1 | 2 | 3 | 4 | 5 | 6 | 7 |
|---|---|---|---|---|---|---|---|---|
| 0 | 00 |   | 02 |   | 04 |   | 06 |   |
| 1 | 20 |   | 22 |   | 24 |   | 26 |   |
| 2 | 40 |   | 42 |   | 44 |   | 46 |   |
| 3 | 60 |   | 62 |   | 64 |   | 66 |   |

VIDEO DATA BUS # 1

|   | 0 | 1 | 2 | 3 | 4 | 5 | 6 | 7 |
|---|---|---|---|---|---|---|---|---|
| 0 | 10 |   | 12 |   | 14 |   | 16 |   |
| 1 | 30 |   | 32 |   | 34 |   | 36 |   |
| 2 | 50 |   | 52 |   | 54 |   | 56 |   |
| 3 | 70 |   | 72 |   | 74 |   | 76 |   |

VIDEO DATA BUS # 0

|   | 0 | 1 | 2 | 3 | 4 | 5 | 6 | 7 |
|---|---|---|---|---|---|---|---|---|
| 0 | 10 |   | 12 |   | 14 |   | 16 |   |
| 1 | 30 |   | 32 |   | 34 |   | 36 |   |
| 2 | 50 |   | 52 |   | 54 |   | 56 |   |
| 3 | 70 |   | 72 |   | 74 |   | 76 |   |

VIDEO DATA BUS # 2

|   | 0 | 1 | 2 | 3 | 4 | 5 | 6 | 7 |
|---|---|---|---|---|---|---|---|---|
| 0 | 01 |   | 03 |   | 05 |   | 07 |   |
| 1 | 21 |   | 23 |   | 25 |   | 27 |   |
| 2 | 41 |   | 43 |   | 45 |   | 47 |   |
| 3 | 61 |   | 63 |   | 65 |   | 67 |   |

VIDEO DATA BUS # 3

|   | 0 | 1 | 2 | 3 | 4 | 5 | 6 | 7 |
|---|---|---|---|---|---|---|---|---|
| 0 | 01 |   | 03 |   | 05 |   | 07 |   |
| 1 | 21 |   | 23 |   | 25 |   | 27 |   |
| 2 | 41 |   | 43 |   | 45 |   | 47 |   |
| 3 | 61 |   | 63 |   | 65 |   | 67 |   |

VIDEO DATA BUS # 3

|   | 0 | 1 | 2 | 3 | 4 | 5 | 6 | 7 |
|---|---|---|---|---|---|---|---|---|
| 0 | 11 |   | 13 |   | 15 |   | 17 |   |
| 1 | 31 |   | 33 |   | 35 |   | 37 |   |
| 2 | 51 |   | 53 |   | 55 |   | 57 |   |
| 3 | 71 |   | 73 |   | 75 |   | 77 |   |

VIDEO DATA BUS # 2

|   | 0 | 1 | 2 | 3 | 4 | 5 | 6 | 7 |
|---|---|---|---|---|---|---|---|---|
| 0 | 11 |   | 13 |   | 15 |   | 17 |   |
| 1 | 31 |   | 33 |   | 35 |   | 37 |   |
| 2 | 51 |   | 53 |   | 55 |   | 57 |   |
| 3 | 71 |   | 73 |   | 75 |   | 77 |   |

VkLSWP(corgsel) = 0
VkINTLV = 1

VkLSWP(corgsel) = 1
VkINTLV = 1

*FIG. 1D*

ODD FIELDS (1, 3, 5, ...)

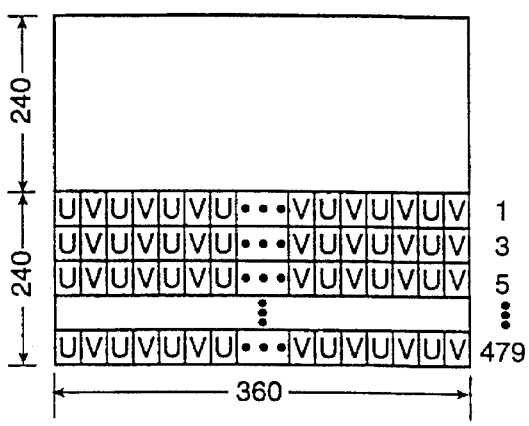
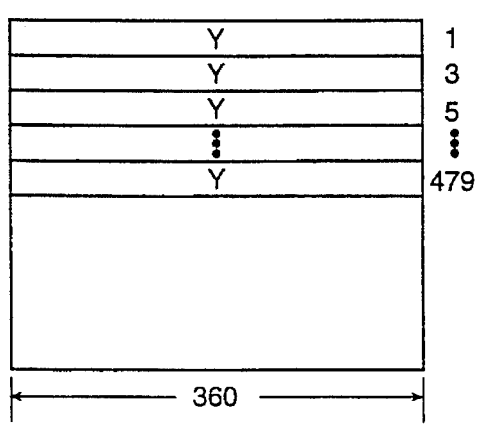
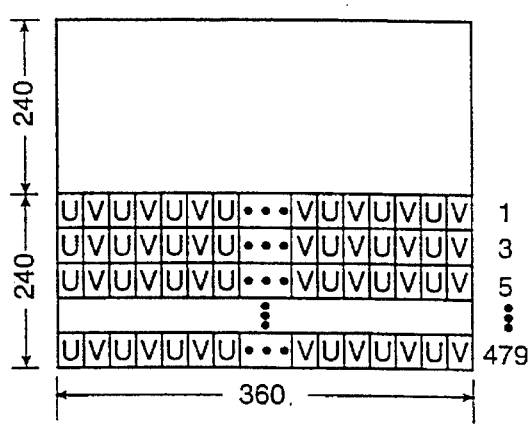
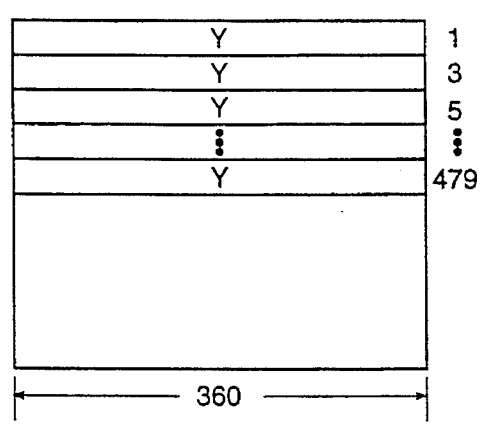
EVEN FIELDS (2, 4, 6, ...)
FIG. 1G
FIG. 1H

|   | 0  | 1  | 2  | 3  | 4  | 5  | 6  | 7  | 8 | 9 | 10 | 11 | 12 | 13 | 14 | 15 |
|---|----|----|----|----|----|----|----|----|---|---|----|----|----|----|----|----|
| 0 | 00 | 01 | 02 | 03 | 04 | 05 | 06 | 07 |   |   |    |    |    |    |    |    |
| 1 | 20 | 21 | 22 | 23 | 24 | 25 | 26 | 27 |   |   |    |    |    |    |    |    |
| 2 | 40 | 41 | 42 | 43 | 44 | 45 | 46 | 47 |   |   |    |    |    |    |    |    |
| 3 | 60 | 61 | 62 | 63 | 64 | 65 | 66 | 67 |   |   |    |    |    |    |    |    |

88

VkLSWP(corgsel) = 0
VkINTLV = 1

VIDEO DATA BUS # (2*MEMSEL(2))

|   | 0  | 1  | 2  | 3  | 4  | 5  | 6  | 7  |
|---|----|----|----|----|----|----|----|----|
| 0 | 10 | 11 | 12 | 13 | 14 | 15 | 16 | 17 |
| 1 | 30 | 31 | 32 | 33 | 34 | 35 | 36 | 37 |
| 2 | 50 | 51 | 52 | 53 | 54 | 55 | 56 | 57 |
| 3 | 70 | 71 | 72 | 73 | 74 | 75 | 76 | 77 |

89

VIDEO DATA BUS # (2*MEMSEL(2) + 1)

|   | 0  | 1  | 2  | 3  | 4  | 5  | 6  | 7  | 8 | 9 | 10 | 11 | 12 | 13 | 14 | 15 |
|---|----|----|----|----|----|----|----|----|---|---|----|----|----|----|----|----|
| 0 | 00 | 01 | 02 | 03 | 04 | 05 | 06 | 07 |   |   |    |    |    |    |    |    |
| 1 | 20 | 21 | 22 | 23 | 24 | 25 | 26 | 27 |   |   |    |    |    |    |    |    |
| 2 | 40 | 41 | 42 | 43 | 44 | 45 | 46 | 47 |   |   |    |    |    |    |    |    |
| 3 | 60 | 61 | 62 | 63 | 64 | 65 | 66 | 67 |   |   |    |    |    |    |    |    |

VkLSWP(corgsel) = 1
VkINTLV = 1

VIDEO DATA BUS # (2*MEMSEL(2) + 1)

|   | 0  | 1  | 2  | 3  | 4  | 5  | 6  | 7  |
|---|----|----|----|----|----|----|----|----|
| 0 | 10 | 11 | 12 | 13 | 14 | 15 | 16 | 17 |
| 1 | 30 | 31 | 32 | 33 | 34 | 35 | 36 | 37 |
| 2 | 50 | 51 | 52 | 53 | 54 | 55 | 56 | 57 |
| 3 | 70 | 71 | 72 | 73 | 74 | 75 | 76 | 77 |

VIDEO DATA BUS # (2*MEMSEL(2))

*FIG. 11*

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| 0 | 00 |   | 01 |   | 02 |   | 03 |   | 04 |   | 05 |    | 06 |    | 07 |    |
| 1 | 20 |   | 21 |   | 22 |   | 23 |   | 24 |   | 25 |    | 26 |    | 27 |    |
| 2 | 40 |   | 41 |   | 42 |   | 43 |   | 44 |   | 45 |    | 46 |    | 47 |    |
| 3 | 60 |   | 61 |   | 62 |   | 63 |   | 64 |   | 65 |    | 66 |    | 67 |    |

VkLSWP(corgsel) = 0
VkINTLV = 1

VIDEO DATA BUS # (2*MEMSEL(2))

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| 0 | 10 |   | 11 |   | 12 |   | 13 |   | 14 |   | 15 |    | 16 |    | 17 |    |
| 1 | 30 |   | 31 |   | 32 |   | 33 |   | 34 |   | 35 |    | 36 |    | 37 |    |
| 2 | 50 |   | 51 |   | 52 |   | 53 |   | 54 |   | 55 |    | 56 |    | 57 |    |
| 3 | 70 |   | 71 |   | 72 |   | 73 |   | 74 |   | 75 |    | 76 |    | 77 |    |

VIDEO DATA BUS # (2*MEMSEL(2)+1)

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| 0 | 00 |   | 01 |   | 02 |   | 03 |   | 04 |   | 05 |    | 06 |    | 07 |    |
| 1 | 20 |   | 21 |   | 22 |   | 23 |   | 24 |   | 25 |    | 26 |    | 27 |    |
| 2 | 40 |   | 41 |   | 42 |   | 43 |   | 44 |   | 45 |    | 46 |    | 47 |    |
| 3 | 60 |   | 61 |   | 62 |   | 63 |   | 64 |   | 65 |    | 66 |    | 67 |    |

VkLSWP(corgsel) = 1
VkINTLV = 1

VIDEO DATA BUS # (2*MEMSEL(2) + 1)

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| 0 | 10 |   | 11 |   | 12 |   | 13 |   | 14 |   | 15 |    | 16 |    | 17 |    |
| 1 | 30 |   | 31 |   | 32 |   | 33 |   | 34 |   | 35 |    | 36 |    | 37 |    |
| 2 | 50 |   | 51 |   | 52 |   | 53 |   | 54 |   | 55 |    | 56 |    | 57 |    |
| 3 | 70 |   | 71 |   | 72 |   | 73 |   | 74 |   | 75 |    | 76 |    | 77 |    |

VIDEO DATA BUS # (2*MEMSEL(2))

*FIG. 1J*

PRIORITY WEIGHTS

| PRIORITY CODE | EXT. REQ/ VSM | REFRESH 116 | SAM-DRAM XFR 118 |
|---|---|---|---|
| 0 | 2 | 1 | 0 |
| 1 | 2 | 0 | 1 |
| 2 | 1 | 0 | 2 |
| 3 | 0 | 1 | 2 |
| 4 | 0 | 2 | 1 |
| 5 | 1 | 2 | 0 |

FIG. 16

VIDEO INTERFACE UNIT FOR MAPPING PHYSICAL IMAGE DATA TO LOGICAL TILES

BACKGROUND OF THE INVENTION

The present invention relates to special purpose image compression coprocessors and in particular to video buffers for transferring video information between video system components.

To represent a picture image digitally, the image area is described as an array of pixels. A digital number describes the color, luminance and chrominance of each pixel. Pixel color information actually consists of three digital values: one digital value for red, one digital value for green and one digital value for blue. Thus, the sheer volume of data needed to describe one single pixel means that digital representations of complete picture images result in exceptionally large data files.

In full motion video, not only are large blocks of data required to describe each individual picture image, but a new image or frame must be presented to the viewer at approximately thirty new images per second to create the illusion of motion. Moving these large streams of video data across digital networks or phone lines is simply infeasible given the available bandwidth.

Data compression is a technique for reducing the number of bits required to send a given message. Data compression utilizes either a single shorthand notation to signal a repetitive string of bits or omits data bits from the transmitted message. The latter form of compression is called "lossy" compression and capitalizes upon the ability of the human mind to provide the omitted data. In still video, the JPEG standard is used for data compression and defines the method by which the still image is to be compressed. In motion video, much of the picture data remains constant from frame to frame. Therefore, the video data may be compressed by first describing a reference frame and describing subsequent frames in terms of the change from the reference frame.

A reference frame can be used in three ways: forward prediction, backward prediction and interpolation. Forward and backward prediction use a single reference frame and describe subsequent or previous frames respectively in terms of the difference from the reference frame. Interpolation uses both forward and backward reference frames. The forward reference frame is located in the data stream at an earlier point in time than the current frame. The backward reference frame is located in the data stream at a later point in time than the reference frame. The current frame is calculated based on averaged differences between the first reference frame and the second reference frame.

Several specific protocols for implementing motion compression exist. Several of these protocols are hardware specific and developed by chip manufacturers in the absence of accepted compression standards. Recently, however, two accepted standards for motion video compression have emerged. The CCITT (International Consultative Committee on Telephone and Telegraph) uses a standard called P×64 (also known as H.261) for video conferencing. The P refers to a multiplier in the range 2 to 30 and the 64 refers to a single 64 Kbps ISDN channel for transmitting the data. However, squeezing even this compressed data over the ISDN telephone line requires drastic compression. Fortunately, the typical video conference does not have much motion from frame to frame, and P×64 utilizes only forward prediction over a single frame time.

To enable higher quality, full motion video, a second standard called MPEG (Motion Pictures Expert Group) has evolved. The MPEG specifications do not define the exact procedure for compressing the video. Rather, the standard defines the format and data rate of the compressed output. The set of compression tools employed by MPEG includes a JPEG-like method for compressing intraframes, various combinations of forward, backward, and interpolated motion compression, and subband coding for audio.

More particularly, operations according to the MPEG standard may be summarized with reference to the following hypothetical in which the video system wishes to describe four sequential image frames. The video processing system first receives the first frame. This first received frame cannot be described in terms of a reference frame and only intraframe (i.e. non-predictive) coding is performed.

The second frame is then received. One possible implementation of the MPEG compression standard describes this frame in terms of the first frame, or intraframe ("I" frame) and a first forward predicted ("P") frame. However, this first P frame is not yet defined and compression of the received second frame is delayed until receipt of the first P frame by the processing system. The third frame also will be described in terms of the first I and P frames.

The fourth frame of this hypothetical example is used to form the first P frame. The P frame is formed by predicting the fourth received frame using the first I frame as a reference. Upon computation of the first P frame, the motion estimation processor can process the second and third received frames as bidirectionally predicted "B" frames by comparing blocks of these frames to blocks of the first I and P frames. To do this processing, the motion estimation processor first obtains a forward prediction of a block in the received frame being processed using the first I frame as a reference. The motion estimation processor then obtains a backward prediction of that same block using the first P frame as a reference. The two predictions are then averaged to form the final prediction for the block.

In current motion estimation devices, an exhaustive full resolution pel by pel search is performed for each block of the I or P frame. This method requires a large bandwidth bus for transfer of the video data. Furthermore, the processing time required to churn through the data slows overall system speed.

SUMMARY OF THE INVENTION

The present invention provides a device, or video interface unit, for accessing video data in a video system using video compression that improves the throughput of the compression operations without requiring corresponding increases in system bus bandwidth.

Digital video images are most commonly stored as an array of pixels having P rows and Q columns. During a block matching search, the search window most commonly moves across a video image in raster scan fashion. Thus adjacent search windows share a common set of pixels and only a single column and/or row of pixels change when the search window moves across an image. The present invention provides a memory architecture for fetching and storing video data that maps the physical video memory to a logical space such that redundant pels need not be fetched for successive search windows.

According to one embodiment of the present invention, the P x Q physical array of image data is logically subdivided into tiles of p rows and q columns. The present invention receives the even rows and columns on a first bus and the odd rows and columns of the tile on a second data bus.

According to another embodiment of the invention the data received on the first bus is stored in a first buffer and the data received on the second bus is stored in a second buffer. Thus, data transfers may be interleaved.

According to yet another embodiment of the present invention, the video data bus is configurable as either a 32 bit or 16 bit data bus. The dimensions of the p x q tile may be adjusted accord to the selected bandwidth of the bus.

According to still another embodiment of the invention the image data may be processed by an interpolater and may also include circuitry to perform a refresh of the video memories.

Other features and advantages of the present invention will be described below.

BRIEF DESCRIPTION OF THE DRAWINGS

FIG. 1C is a diagram showing logical to physical image mapping for 32 bit mode, without pel interleaving according to an embodiment of the present invention;

FIG. 1D is a diagram of logical to physical image mapping for 32 bit mode, with pel interleaving according to an embodiment of the present invention;

FIG. 1G is a diagram of an 8 By 8 pel logical image for 16 bit accesses according to an embodiment of the present invention;

FIG. 1H is a diagram of a logical to physical image mapping for 16 bit mode without pel interleaving according to an embodiment of the present invention;

FIG. 1I and 1J are diagrams of logical to physical image mapping for 16 bit mode, with pel interleaving according to an embodiment of the present invention;

FIG. 16 shows priority rotation for a video bus arbiter according to an embodiment of the present invention;

DESCRIPTION OF THE PREFERRED EMBODIMENT

Video System Overview

Figure 1:
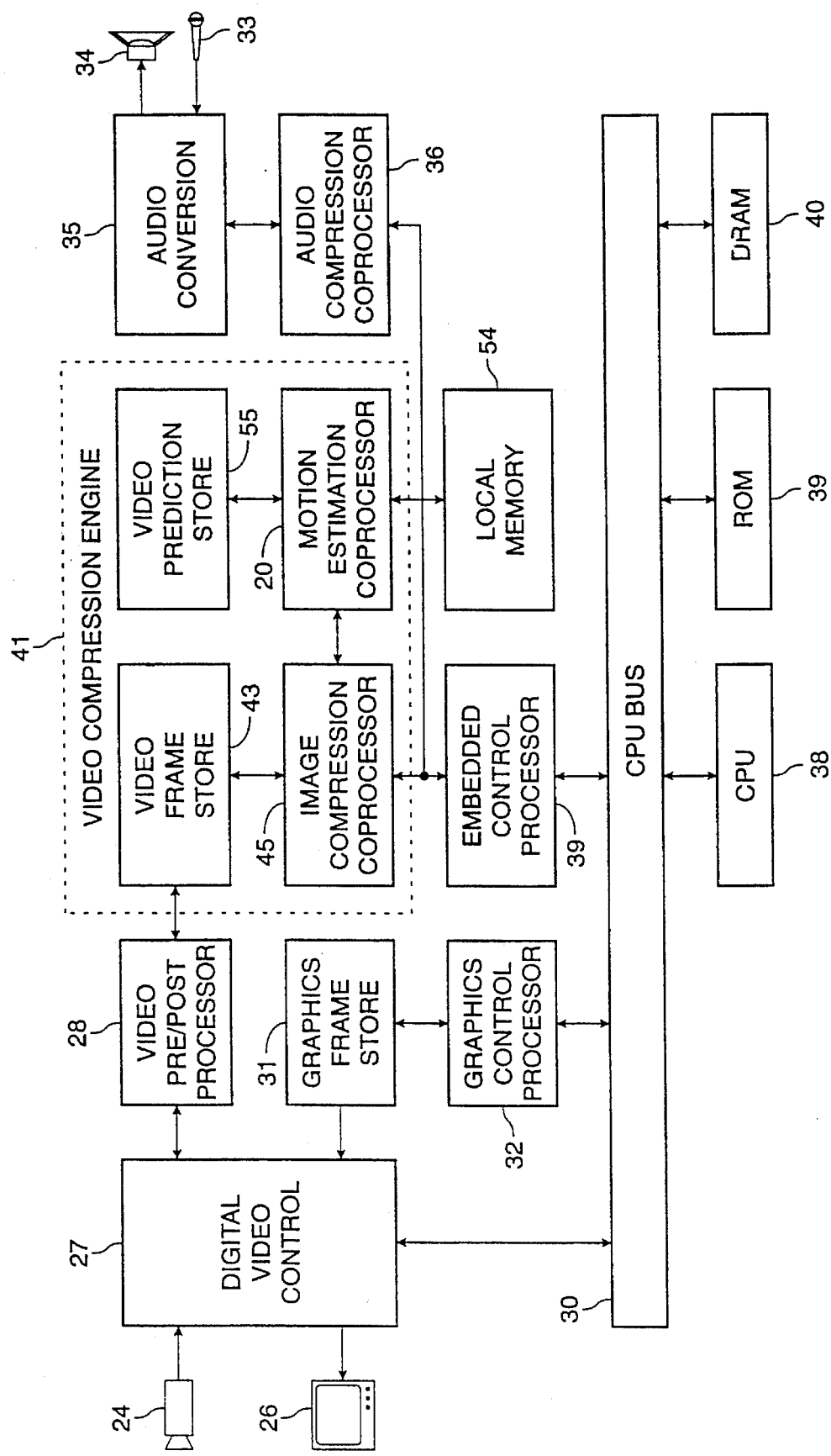
FIG. 1 is a block diagram of a video system in which the video interface system of the present invention may be included according to an embodiment of the present invention.

FIG. 1 illustrates one example of a video system incorporating a motion estimation coprocessor 20 (MEC 20) and an image compression coprocessor. A camera 24 receives video data inputs and a display unit 26 displays video data. A digital video control unit 27 connected to both camera 24 and display 26 coordinates the communication of video data between camera 24, display 26 and a video pre/post processor 28, and a host processor via a bus 30. Digital video control unit 27 also coordinates the display of video graphics data retrieved from a graphics frame store memory 31 operating under the control of a graphics control processor 32.

The video system of FIG. 1 may also include audio. Audio capabilities can be added with a microphone 33 and a speaker 34 connected to an audio conversion circuit 35. An audio compression coprocessor 36 for compression of audio data connects between an embedded control processor 37 and the audio conversion unit 35.

The system of FIG. 1 operates under the control of a host processor 38, which couples to the remaining system components via bus 30. In a preferred embodiment, host processor 38 comprises a RISC processor, such as for example, an Intel i960 family processor manufactured by Intel of Santa Clara, California. Also coupled to bus 30 are a ROM 39 for storing host processor 38 program code and a DRAM 40.

Received video data to be compressed, or uncompressed data to be displayed, are processed by a group of devices working in tandem and known as a video compression engine 41. Included as part of the video compression engine 41 is a video frame store 43 and an image compression coprocessor 45. Video frame store 43 serves as a buffer memory for data input to and output from the video compression circuitry.

The image compression coprocessor 45 performs all video compression functions in a typical system except motion estimation, Huffman encoding and decoding, and bit stream management. An image compression coprocessor usable with the VIU of the present invention is described in copending application Serial No. 08/054-950, titled "Image Compression Coprocessor" and filed the same day herewith and incorporated by reference. Image compression coprocessor 45 connects to bus 30 through the optional embedded control processor 37. Control processor 37 offloads from host processor 38 certain decompression and compression functions not accomplished by coprocessor 45, such as Huffman coding. Alternatively, tasks performed by control processor 37 may be performed by host processor 38.

For motion video, MEC 20 processes compressed motion video data. MEC 20 operates in conjunction with its own local memory 54 and a video prediction store memory 55. An embodiment of MEC 20 is described in greater detail in copending application Serial No. 08/055-711, titled "Motion Estimation Coprocessor," filed the same day herewith and incorporated herein by reference.

Video Interface Unit Overview

The various components of the video system of FIG. 1 may include a video interface unit (VIU) (not shown in FIG. 1) for fetching video data from video memories and/or for transferring information between components. For example, the VIU may generate transfer cycles to move data between a serial access memory (SAM) and the DRAM of video random access memories (VRAMs). The VIU writes and reads a token of image pels to and from the external video memories via a video bus as a series of page mode transfers. In a preferred embodiment, the video bus comprises a 4-pel (32-bit) bi-directional data bus and 11 bit address bit which physically accesses a two row by two column image "tile" with each 32 bit access. In another preferred embodiment, the video bus comprises a 2-pel (16 bit) bidirectional data bus and 11 bit address bus which physically accesses a two row by one column image "tile" with each 16 bit access. In the 32 bit bus mode a 16×16 block of image pels is accessed as an 8 row by 8 column tile array which is physically accessed as 8-DRAMs of 8 words each. In the 16 bit bus mode, the same 16×16 block of image pels is accessed as an 8 row by 16 column tile array which is physically accessed as 8 DRAM rows of 16 words each.

The VIU contains several user-loadable timing parameters which are used by the VIU to generate the proper video memory interface timing. Information concerning the configuration of the video memory system is loaded by host processor 38 into the VIU.

To support motion prediction on a half-pel resolution as required by MPEG, the VIU may also perform an interpolation function on the image pels read from the video memory. Bilinear interpolation is computed on either the horizontal or vertical axis or both.

The VIU may also integrate a refresh function which may be enabled, for example, by host processor 38 of FIG. 1. A CAS-before-RAS refresh cycle generated by the VIU refreshes the external VRAMs or DRAMs. Contained in the refresh logic is a refresh timer. The period of refresh timer is loaded by the user via a host interface.

An arbiter function arbitrates video bus requests by the page-mode pel fetch function, the refresh function, the SAM-DRAM transfer function, and an external bus request source. Each VIU can be programmed as the arbitration master or a slave for the video bus. In the slave mode operation, a daisy-chained priority scheme is also supported for the external bus request source.

The Video Bus

According to a preferred embodiment of the invention, luminance images, each consisting of up to 4096 by 4096 pels, may be accessed by the VIU using either 16 or 32 bit page mode data transfers. The data width of the video memory bus may be dynamically configured as either 32 or 16 bits as determined by the video memory instruction executed by the VIU. If the bus is configured as being 16 bits wide, pels are accessed on data busses 0 and 1; or 2 and 3 again, as determined by the instruction. Logical to physical address translation of the image pels is described below. An overview of pel transferring the 32 bit and 16 bit bus modes is also provided below.

Pels within each video component are accessed using a logical grid of component coordinates indexed by a hpos and a vpos descriptor field of the token being processed by the video memory instruction. An example of a code useful for converting logical component coordinates to logical pel coordinates is contained in Table XIII. The commands and fields of Table XIII are referred to throughout the discussion below.

Figure 1A:
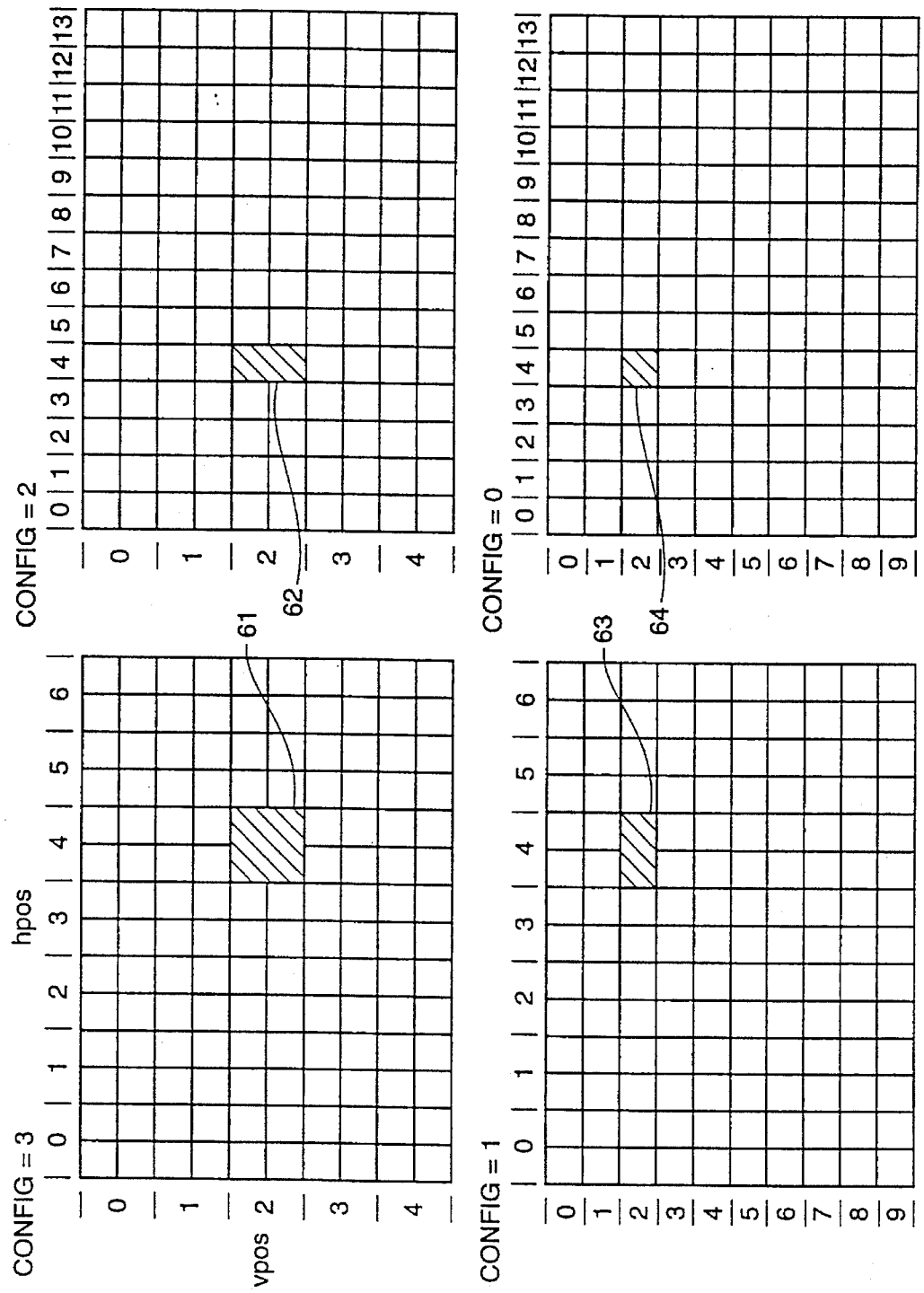
FIG. 1A is a diagram showing component grid layouts for a (hpos, vpos) coordinate system according to an embodiment of the present invention.

The horizontal and vertical axis resolutions (in pels) of the logical grid corresponding to a component "k" are determined by the contents of a component configuration register (CONFIGk). Register CONFIGk holds the geometric configuration of component "k" in the data tokens to be processed. FIG. 1A shows an example grid layout 61–64 for each of the four possible component configurations, and each grid highlights the pels corresponding to hpos=4 and vpos=2.

The location of a component at logical coordinates (hpos, vpos) may also be offset using full or half-pel resolution motion vectors stored in the sfield (43:0) field of the operand token's descriptor. Motion vectors are used by the read memory instructions RDV16FMV, RDV32FMV, RDV16BMV and RDV32BMV prior to accessing a component in physical memory, therefore the logical component coordinates (hpos, vpos) which are possibly offset by a motion vector are converted into a set of logical pel coordinates which can then be translated into physical memory addresses.

The system executes instructions to determine whether a motion vector needs to be extracted from the operand descriptor. For RDVxFMV instructions ("x"=16 or 32), the 11 bit horizontal and vertical components of the forward vector are obtained from sfield (43:22) of the descriptor and copied into variable xvect and yvect respectively; for RDVxBMV. These components are obtained from sfield (21:0). The fullpel variable is set to "1" if motion vectors have full pel resolution and "0" if vectors have half pel resolution and may possibly require pel interpolation. Video memory instructions other than RDVxFMV and RDVxBMV do not reference motion vectors and are treated as using a full pel motion vector of (0,0).

The next operation scales the motion vector components based on a comparison of the resolution of image component "k" with the resolution of component 0. The contents of registers CONFIGk and CONFIG0 are used to make this comparison. A horizontal or vertical motion vector component is halved if the corresponding horizontal or vertical dimension of component "k" is half that of the corresponding dimension of component 0. This scaling is consistent with the relative treatment of motion vectors for luminance and chrominance components by the MPEG and H.261 standards. For example, assume CONFIG0=3 and CONFIGk=0; then the dimensions of components 0 and "k" are 16 by 16 pels and 8 by 8 pels, respectively. The size ratio of component 0 to component k is two for both horizontal and vertical dimensions, so both motion vector components are halved.

Some additional special handling is required for half pel resolution motion vectors. The procedure used in the code is consistent with the MPEG standard which treats half pel motion vector components as fractional two's complement integers. The xhalf and yhalf variables flag whether pel interpolation is required and are respectively copied from the least significant bit of xvect and yvect. If xhalf=1, horizontal interpolation is needed; if yhalf=1, vertical interpolation is needed. xvect and yvect are then each right-shifted by one bit with sign extension to give them resolution consistent with full pel vectors.

The logical origin of the block of pels which the VIU needs to physically access is delivered in the firstrow and firstcol variables. The number of logical rows and columns in this block is given by numrows and numcols, respectively. Note that this logical pel block includes all the pels which may have to be fetched to perform horizontal or vertical pel interpolation. For example, if a logical 16 by 16 pel image component must be fetched using both horizontal and vertical interpolation, numrows and numcols will both equal 17.

In the 32 bit access mode, four 8 bit video memory data busses are used to simultaneously read or write four pels on every memory cycle, requiring the storage for one logical image to be physically spread across memories connected to the four data busses. These four pels form a two by two pel square in the logical image space. Thus the 32 bit access mode segments a logical image into non-overlapping two by two pel tiles, and each physical memory address selects one of these tiles.

Figure 1B:
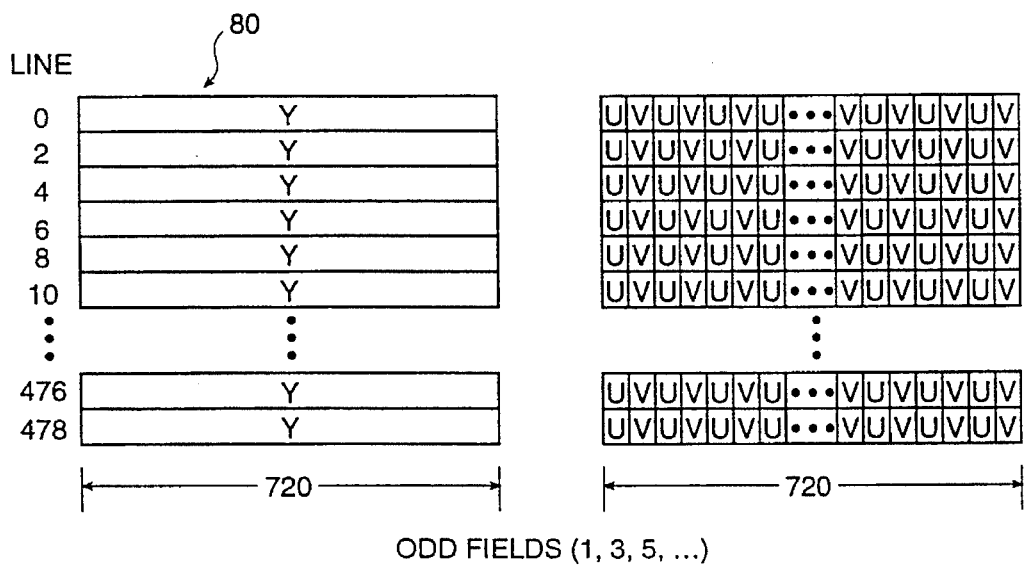
FIG. 1B is a diagram showing an 8 by 8 pel logical image for 32 bit accesses according to an embodiment of the present invention.

In 32 bit mode, a block of pels at logical coordinates (firstcol, firstrow) is physically accessed as an array of two by two tiles. Pels are individually labeled with their row:column locations as shown in FIG. 1B. The 32 bit access mode segments this 64 pel image into a four row by four column grid of tile. Pels from even numbered image columns are accessed on data busses 0 or 1 and pels from odd numbered columns are always accessed data busses 2 or 3. Pels from even numbered image rows are accessed on data busses 0 or 2 while pels from odd numbered rows are accessed on data buses 1 or 3. In another preferred embodiment, pels from even numbered image rows are accessed on data buffers 1 or 3 while pels from odd numbered rows are accessed on busses 0 or 2. VIU 100 simultaneously accesses the four pels making up a tile by outputting off-setted versions of the tile's row and column coordinates on the video address bus.

Thus, the VIU accesses a num_tile_rows by num_tile_cols array of tiles beginning at row address first tile row and column address first tile col. The tiles are accessed in a left-to-right, top-to-bottom raster scan fashion. Row addresses are incremented by one from one row of tiles to the next; column addresses are incremented by one within a row. The tiles within each row are accessed using a series of page mode accesses where VIU 100 outputs the tile row number on the video address bus followed by a succession of tile column addresses.

When required, the RDVxFMV and RDVxBMV instructions perform pel interpolation using the conventions established, for example, by the MPEG specification. The interpolation is performed on pels in the logical image domain. As an example, consider the following 3 by 3 array of pels on a logical grid with half pel spacing:

| P1 | H | P2 |
|----|---|----|
| V  | B | X  |
| P3 | X | P4 |

Pels P1, P2, P3, and P4 are located at full pel coordinates; pels H, V, and B are located at half pel coordinates and need to be interpolated from P1, P2, P3 and P4. The bilinear interpolation formulas are as follows:

| | |
|---|---|
| H = (P1 + P2)//2 | (horizontal interpolation only) |
| V = (P1 + P3)//2 | (vertical interpolation only) |
| B = (P1 + P2 + P3 + P4)//4 | (bidireactional interpolation) | where "//" indicates integer division with rounding to the nearest integer, with half-integer values rounded away from zero (e.g., 1.5 rounds to 2).

Video memory instructions have four parameters which are used in conjunction with internal registers and various token descriptor fields to translate logical coordinates into physical memory addresses for the memory chips connected to the video bus. These parameters are memsel, horgsel, vorgsel and corgsel.

The three bit memsel parameter is the primary means for selecting separate image memories or memory "banks". For video memory instructions using the 32 bit access mode, memsel is output unmodified on pins VMSEL (2:0) during a memory access. For video memory instructions using the 16 bit access mode, the least significant two bits of memsel are output on pins VMSEL (1:0) and VMSEL (2) is set "high". The most significant bit of memsel is used to select which half of the 32 bit video data bus is to be used for transferring data. The horgsel and vorgsel (parameters are used to select a sub-image within memory memsel. The physical (x, y) coordinates of the upper left corner of the sub-image are given by X=128* horgsel, and Y=128 , vorgsel.

The corgsel parameter selects one of four groups of memory address offset and control registers which are initialized by host processor 38. Each of these four groups comprise nine registers divided into three subgroups of three registers each, with each subgroup corresponding to one of three video components. The registers in each group and subgroup are defined as follows (corgsel=0, 1, 2, 3; k=1, 2):

vkX[corgsel](10:0) - Group corgsel, Component k Horizontal Offset

VkY[corgsel](10:0) - Group corgsel, Component k Vertical Offset

VkLSWP[corgsel] - Group corgsel, Component k Line Swap

The VkX and VkY registers corresponding to corgsel= 0 and k=0, 1, and 2 are defined to contain the value zero; the contents of the other 30 registers are user-definable. The contents of the VkX and VkY registers are used to arbitrarily offset physical pel coordinates for each component within the sub-image selected by horgsel and vorgsel. The "line swap" register, VkLSWP, indicates if even and odd video lines (i.e., rows) are swapped on the video busses they are accessed on.

Three single bit registers permit pels from different image components to be physically interleaved in the same memory. Pel interleaving is especially useful for storing UV chrominance components from YUV imagery since these components are generally sampled from analog video in a multiplexed fashion. These three registers are as follows:

| C0INTLV-Component | 0 | Interleave | Register |
| V1INTLV-Component | 1 | Interleave | Register |
| V2INTLV-Component | 2 | Interleave | Register |

Setting the interleave bit to "1" for a particular component enables interleaving for that component. Generally, if pel interleaving is enabled for one component, it is also enabled for at least one other. For example, interleaving of UV pels in YUV images requires that the interleave bits be set for both of the U and V components.

If bit corgsel in the VkLSWP register is "0" the VIU accesses even numbered rows from the component k logical image on video data busses 0 and 2 and odd numbered rows on video busses 1 and 3. If the bit is "1," even rows are accessed on busses 1 and 3 and odd rows on busses 0 and 2. Line swapping allows pels to be stored in memory in a fashion compatible with the way in which they are sampled by a digitizer or read out for display purposes.

The video memory instructions which use the 32 bit access mode are RDV32, RDV32FMV, RDV32BMV, WRV32, and WR32.S. In this mode, the four 8 bit video memory data busses are used to simultaneously read or wrote four pels on every memory cycle, requiring the storage for one logical image to be physically spread across memories connected to the four data busses. These four pels form a two by two pel square in the logical pel coordinate space. That is, the 32 bit access mode segments a logical image into non-overlapping two by two pel tiles, and each (row, column) memory address pair output by the VIU selects one of these tiles.

In 32 bit mode, a component at logical pel coordinates (firstcol, firstrow) is physically accessed as an array of two by two tiles. As an example, FIG. 1B shows an eight by eight pel logical image 69. Pels are individually labeled with their row:column locations; tile coordinate axes are shown along the top and left sides of figure. The 32 bit access mode segments this 64 pel image into a four by four grid of tiles; tile (0,0) is shown shaded in the figure.

FIG. 1C shows how the pels in FIG. 1A are physically mapped to memories on the four video data busses with pel interleaving disabled. Line swapping is disabled (i.e. VkLSWP =0) for the mappings 71 shown on the left side of FIG. 1C and enabled for the mappings 72 shown on the right. Pels from even numbered columns in FIG. 1B are always accessed on data busses 0 and 1 and pels from odd numbered columns are always accessed on data busses 2 and 3. Row accesses depend on the value of VkLSWP (corgsel).

The four pels corresponding to the tile at logical pel coordinates (0,0) in FIG. 1B are highlighted in each half of FIG. 1C. The VIU simultaneously accesses the four pels making up a tile by outputting offsetted versions of the tile's row and column coordinates on the video address bus.

FIG. 1D shows the effects of pel interleaving on 32 bit accesses. Note that the column address of a pel in FIG. 1C is multiplied by two in order to arrive at the column address 75 of the same pel in FIG. 1D, the row addresses are the same. That is, only columns are interleaved, not rows. In an actual application, the missing columns in FIG. 1D are filled in with the columns from another component.

Figure 1E:
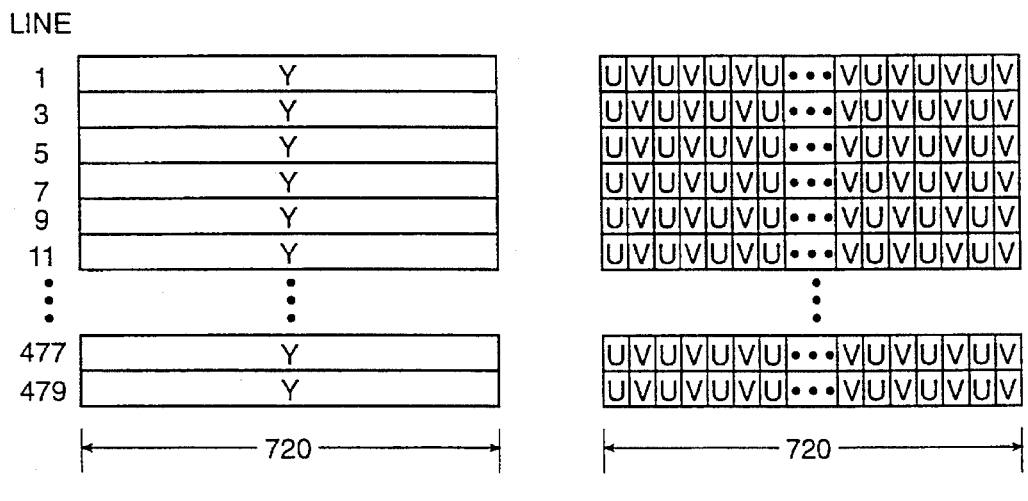
FIG. 1E is a diagram showing 480 line CCIR 601 scan line formats according to an embodiment of the present invention.
Figure 1C:
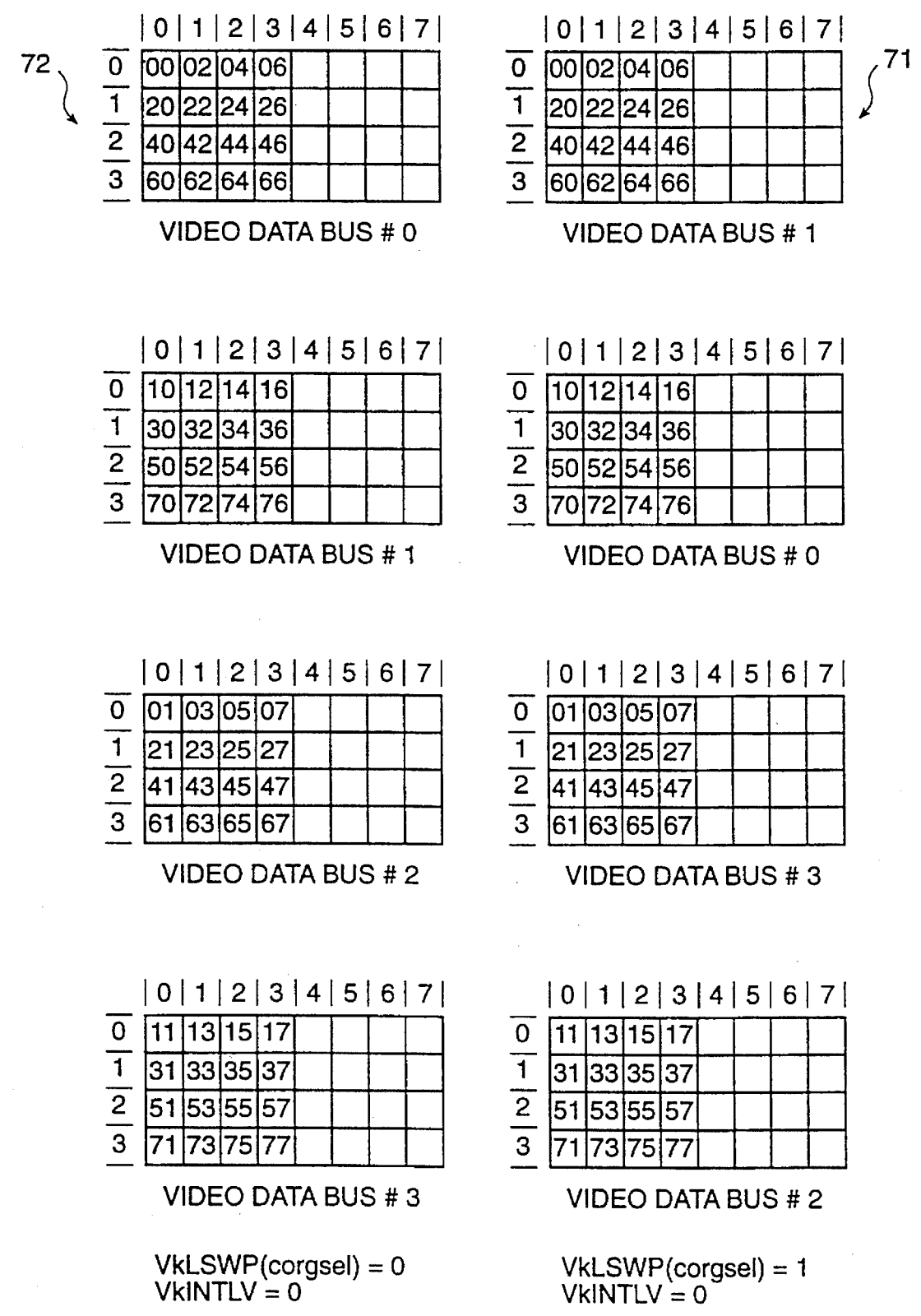
Figure 1F:
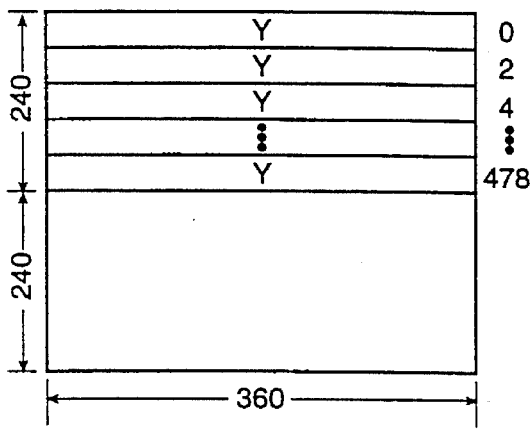
FIG. 1F showing 480 line CCIR-601 image storage according to an embodiment of the present invention.
Figure 1F:
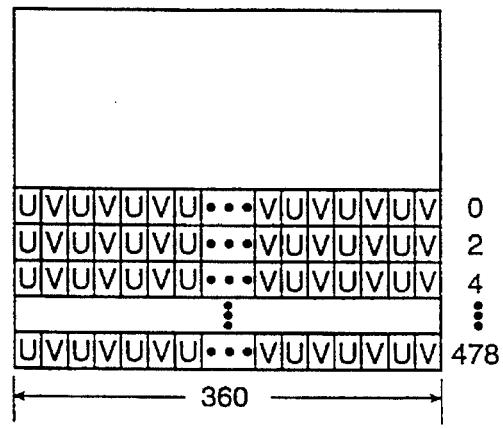
Figure 1F:
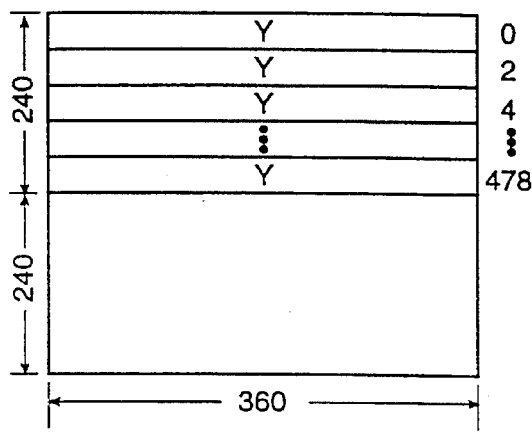
Figure 1F:
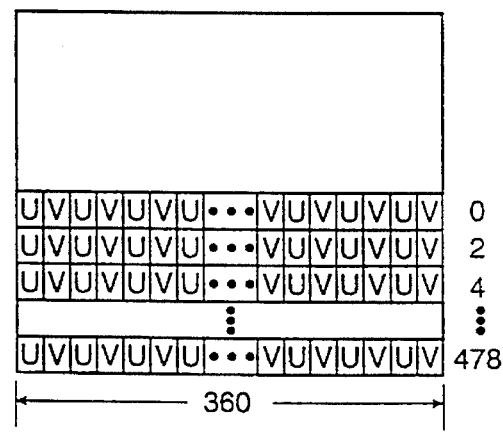

To better see the usefulness of both pel interleaving and line swapping, consider the examples shown in FIG. 1E and 1F. FIG. 1E shows the order in which lines of luminance (Y) 80 and chrominance (UV) pels are structured in each of the interlaced fields which make up a 480 line CCIR-601 image. Within each horizontal scan line in each of the fields, 720 luminance pels and 720 interleaved UV pels are sampled in a spatially co-sited fashion.

FIG. 1E shows how these lines are stored in four 480 row by 360 column video memories for each of the two interlaced fields. Each memory stores a quarter of the total number of pels in the image. In order for the video system to properly access the chrominance pels using the 32 bit bus mode, the UV components must have pel interleaving enabled. In addition, these components must be accessed with line swapping enabled since even numbered rows of UV pels are stored on busses 1 and 3 and odd numbered rows are stored on busses 0 and 2.

The VIU addresses a num_tile_rows by num tile cols array of tiles beginning at row address first tile row and column address first_tile_col. The tiles are accessed in a left-to-right, top-to-bottom raster scan fashion. Row addresses are incremented by one from one row of tiles to the next; column addresses are incremented by one within a row if pel interleaving is disabled and two if pel interleaving is enabled. The tiles within each row are accessed using a series of page mode accesses; that is, the VIU addresses a row by outputting the tile row number on the video address bus followed by a succession of tile column addresses.

Motion vector offsets may result in memory fetches which do not use all the pels in the tiles read using the latter formulas; that is, a logical block of pels might not map evenly onto the grid of tiles. In such cases, any unused pels are discarded internally by the VIU.

In the 16 bit access mode, two video memory data busses, i.e. either bus 0 and bus 1 or bus 2 and bus 3, are used to simultaneously read or write two 8 bit pels on every memory cycle, requiring the storage for one logical image to be physically spread across two data busses. These two pels form a one pel by two row array in the logical image space. That is, the 16 bit access mode segments a logical image into non-overlapping one pel by two row tiles, and (row, column) memory address pair output by the ICC selects one of these tiles.

The data bus pair selected for reading or writing is determined by the most significant bit of the memsel parameter in the video memory instruction If this bit is "0" busses 0 and 1 are used; otherwise, busses 2 and 3 are used.

In 16 bit mode, each component at logical pel coordinates (firstcol, firstrow) is physically accessed as an array of one pel by two row tiles. FIG. 1G shows an eight by eight pel logical image. Pels are individually labeled with their row 83 and column locations 84. Tiled coordinate axes are shown along the top and left sides of figure. The 16 bit access mode segments this 64 pel image into a four row by eight column tile grid; tile (0,0) is shown shaded in the figure.

FIG. 1H shows how the pels in FIG. 1G are physically mapped to memories on two video data busses with pel interleaving disabled. Line swapping is disabled (i.e. VkLSWP(corgsel)=0) for the two mappings 88 and 89 shown on the top of FIG. 1H and enabled for the two mappings shown on the bottom. The two pels corresponding to the tile at logical coordinates (0,0) in FIG. 1G are highlighted in each half of FIG. 1H. The VIU simultaneously accesses the two pels making up a tile by outputting offsetted versions of the tile's row and column coordinates on the video address bus.

In FIG. 1H, the 16 bit access mode splits an image row-wise between memories on two video busses; that is, one memory stores all the pels from odd numbered logical rows and the other stores all the pels from even numbered rows.

FIG. 1I shows the effects of pel interleaving of 16 bit accesses. Note that the column address of a pel in FIG. 1H is multiplied by two in order to arrive at the column address of the same pel in FIG. 1-I; the row addresses are the same. As in the 32 bit mode, only columns are interleaved, not rows.

As in the 32 bit mode, the VIU accesses a num_tile_rows by num_tile_cols array of tiles beginning at row address first_tile_row and column address first tile col. The tiles are accessed in a left-to-right, top-to-bottom raster scan fashion. Row addresses are incremented by one from one row of tiles to the next; column addresses are incremented by one within a row if pel interleaving is disabled and two if pel interleaving is enabled. The tiles within each row are accessed using a series of page mode accesses. That is, the video system addresses a row by outputting the tile row number on the video address bus followed by a succession of tile column addresses.

Motion vector offsets may result in memory fetches which do not use all the pels in the tiles read using the latter formulas; that is, a logical block of pels might not map evenly onto the grid of tiles. In such cases, any unused pels are discarded internally.

The tiling features of the VIU enables the present invention to be capable of fetching new image data, while its current contents are being used for performing block comparisons.

VIU Hardware Overview

Figure 2:
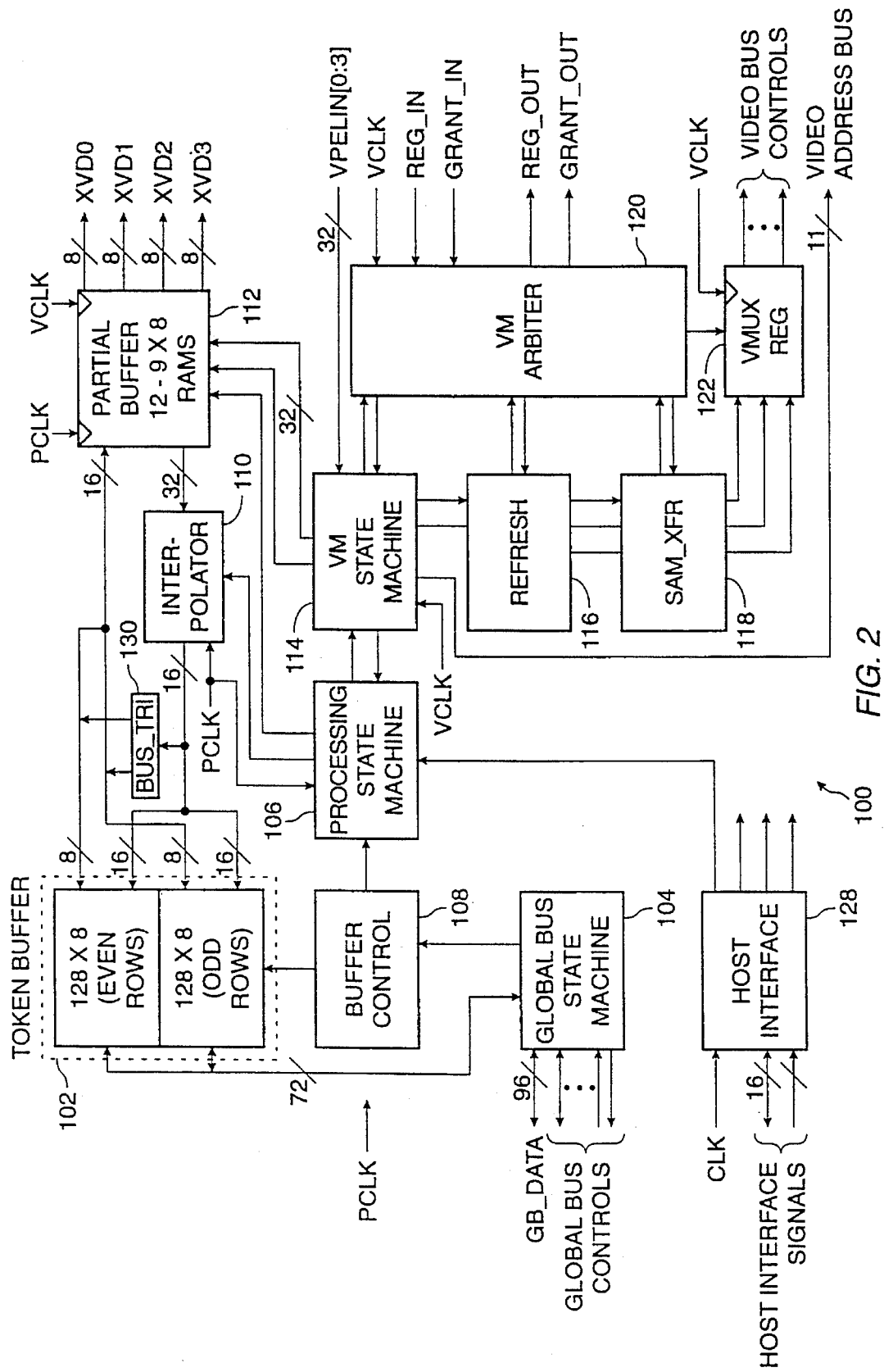
FIG. 2 is a block diagram of a video interface unit according to an embodiment of the present invention.

FIG. 2 shows a block diagram of a VIU 100 according to an embodiment of the present invention. VIU 100 includes a data token buffer 102 for storing a group of image pels to be written to or read from video memory. A global bus interface state machine 104 acts as the main sequencer for VIU 100 operations while, a processing state machine 106 serves as an instruction sequencer. VIU 100 also includes a buffer control 108 for generating address and control signals for token buffers 102. An interpolator 110 maybe included to interpolate image data. A bus_tri block 130 is included to isolate the interpolator output data bus from the token buffer output data bus. A partial buffer 112, a video interface state machine 114, refresh sub-unit 116, SAM-DRAM transfer sub-unit 118, a video bus arbiter 120, a video bus register sub-unit 122 are also included. A host interface sub-unit 128 serves to transfer signals between a host processor and VIU 100.

The instruction and the data token to be processed by the VIU are received from a controlling device usually other than the device containing VIU 100, via the global bus interface. The controlling device may be any coprocessor, host processor or bus master device directing data transfers. The device containing VIU 100 may then further process the received data. For example, in the video system of FIG. 1, the VIU associated with image compression coprocessor 45 receives the instruction and data token from control processor 39. The VIU associated with MEC 20 may receive instruction and data tokens from image compression coprocessor 45 operating under the direction of host processor 38. MEC 20 then performs block matching of received image data.

The 96-bit, bi-directional global data bus contains the eight 8-bit pels to be written to or read from the video memory. According to one embodiment of the invention, when transferring data to the controlling device, each 8-bit pel is padded with zeroes in the most significant positions to form a 12-bit, positive two's-complement number. When receiving image data from the controlling device, an 8-bit pel is extracted from lower 8 positions of each 12-bit two's complement number.

The data token to be written to the video memory is saved in token buffer 102. The 8-bit pels in the token are then passed to the video memory via partial buffer 112. For read from video memory instructions, a token with a read-type instruction is received from the controlling device. Image pels read from the video memory are buffered in partial buffer 112, passed to interpolator 110, and stored in the token buffer 102. At the completion of the instruction execution, a data token is sent to the controlling device for read-type instructions and the signal BUSY is reset to indicate VIU's 100 availability to process the next request. For write instructions, pels from token buffer 102 are copied into partial buffer 112 before being output on the video bus. At the completion of the write, the BUSY status is reset.

The components identified in FIG. 2 are described in greater detail in the following sections. An example set of VIU and external signals and associated VIU operations are described. For the reader's convenience, the signals are listed in tables at the end of the specification. However, the VIU of the present invention is not limited to operating with the specific signals discussed herein.

Global Bus Control State Machine

Figure 3:
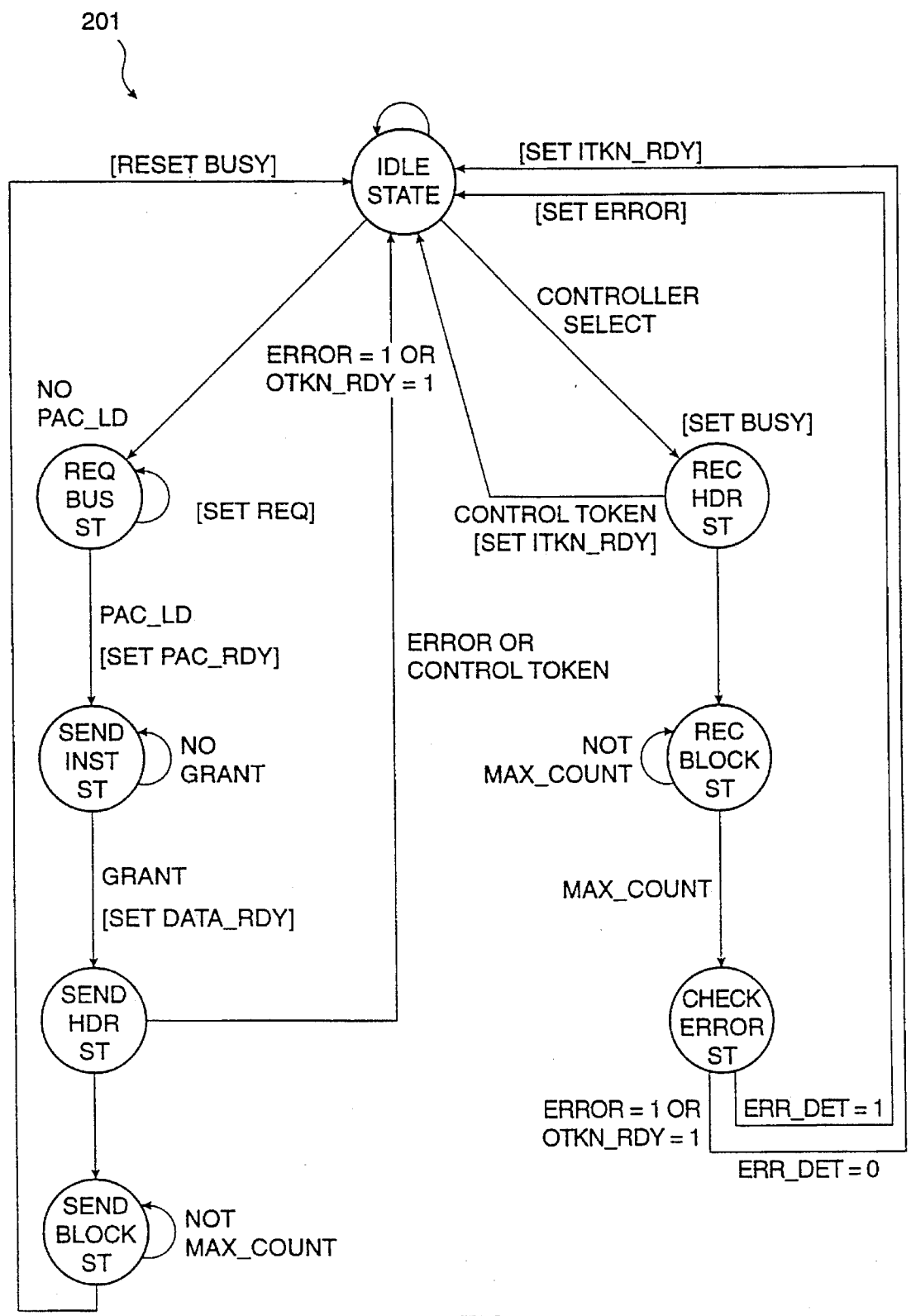
FIG. 3 is a state transition diagram for a VIU global state machine according to an embodiment of the present invention.

Global bus control state machine 104 acts as the main sequencer in VIU 100. State machine 104 implements in hardware the global bus operations. Global bus couples VIU 100 to other components through the video system. This sub-unit also contains the storage registers for the instruction and the token descriptor as well as containing token descriptor error-checking logic. FIG. 3 shows one possible state transition diagram of global bus control state machine 104 according to a preferred embodiment of the present invention. Eight states support the interface protocol. The global state machine variables are described and listed in Table I.

Global bus control state machine 104 starts at the idle-state after reset (RSTALL). At this state, state machine 104 monitors the global bus for an input sequence by the controlling device and the internal status flags OTKN_RDY and ERROR for an output sequence. When the GB_DATA_RDY_ lines are driven to an active level, an input sequence is initiated. The instruction and its parameters contained in the global data bus are saved in a first register before state machine 104 transitions to the receive-header-state. The receive-header-state causes a second register to be loaded with the token descriptor contained in the global data bus. For read-type instructions, either type of token is acceptable. For write instructions, a data token is the only proper type allowed. The number of data blocks being transferred by the controlling device is contained in the NBLOCKS field in the token descriptor. For a control token, NBLOCKS is ignored and no data transfer cycle is expected.

On the next clock cycle, state machine 104 transitions to the receive-block-state. While in this state, for example, a 6-bit transfer cycle counter (GB_CYC_CNT) is enabled to count starting from 0. The NBLOCKS field in the token descriptor is modified by appending a 7 to the least significant position to provide the upper count for the GB_CYC_CNT. With each clock, the global data bus is strobed into the pipeline register R_GB_DATA. Only eight 8-bit pels are saved in R_GB_DATA. This pipeline register on the data path matches the pipeline latency through the address register in the token RAM. GB_CYC_CNT is therefore used in the buffer control block to generate the token RAM address. The eight 8-bit pels in R_GB_DATA are transferred to the token RAM on the next clock cycle. A delayed global bus write transfer signal (Pi_GB_WXFR_IP) is output to match the data path pipeline.

When the counter GB CYC CNT reaches the maximum count, state machine 104 transitions to the check-error-state, where the token is verified against the instruction type. A write instruction must have a data token. However, a read-type instruction is executed regardless of the token type received. An error is detected when a write instruction is received with a control token. The ERROR status flag is set and the state machine returns to the idle-state. An active ERROR flag causes the state machine to return the unprocessed token to the controlling device in the form of a control token. Zero data transfer cycles are made. If no error was detected while in the check-error-state, the status flag ITKN_RDY is pulsed high for one clock cycle to indicate that a valid instruction has been received and is ready for processing. State machine 104 then returns to the idle-state.

In the idle-state, state machine 104 also monitors the CTKN_RDY status flag. The OTKN_RDY, which is activated for 1 clock cycle by the processing state machine 106, signals that the instruction has been executed. That is, for a written instruction, the data token has been transferred to the video memory. Furthermore, for WRV16_S and WRV32_S instructions, OTKN_RDY causes the state machine to return the token descriptor (modified to indicate a control token) to the controlling device to signal the completion of the instruction. The state transition is the same as that for read-type instruction, with the maximum data transfer cycle count being reset to zero.

For a read-type instruction, OTKN_RDY indicates that an output data token of image pels is ready to be transferred to the controlling device. State machine 104 transitions to the request-bus-state when an active OTKN_RDY is detected. At the same time, state machine 104 asserts the GB_REQ line to the controlling device to request bus access. State machine 104 remains in this state until the controlling device activates the GB_PAC_LD signal to signal the unit to send the instruction packet. At that time, state machine 104 transitions to the send-instruction-state. The unit places the instruction previously received by the controlling device on the global data bus and asserts the GB_PAC_READY signal. State machine 104 remains at this state until the GB GRANT line is activated by the controlling device. State machine 104 then transitions to the send-header-state and GB_DATA_RDY_ line is asserted by state machine 104. The signal GB_PAC_READY is deasserted and the token descriptor, modified to indicate a data token, is output on the global bus.

The signal GB_CYC_CNT is enabled to count from 0 to the maximum count based on the NBLOCKS field in the token descriptor. GB_CYC_CNT is used in the buffer control block to pre-fetch the set of image pels from the token RAM. The first set of 8 image pels from the video RAM is loaded into R_GB_DATA pipeline register. On the next clock, the state changes to the send-block-state. The 8-bit values in R_GB_DATA, after padding the most significant position with zeroes, are then driven onto the global data bus. When the maximum data transfer cycle is reached, state machine 104 returns to the idle-state. The bus request line and GB_DATA_RDY_ are also de-asserted on the same clock cycle.

State machine 104 also generates a BUSY status signal to the controller 108. State machine 104 becomes set when a controller-initiated sequence is started. For read-type instructions, it is reset after the image data token is sent to the controlling device. For write instructions, state machine 104 is reset when an active OTKN RDY is detected. For write and signal instructions (WRV16_S and WRV32_S), state machine 104 is reset after the token descriptor is returned to the controlling device.

Figure 4A:
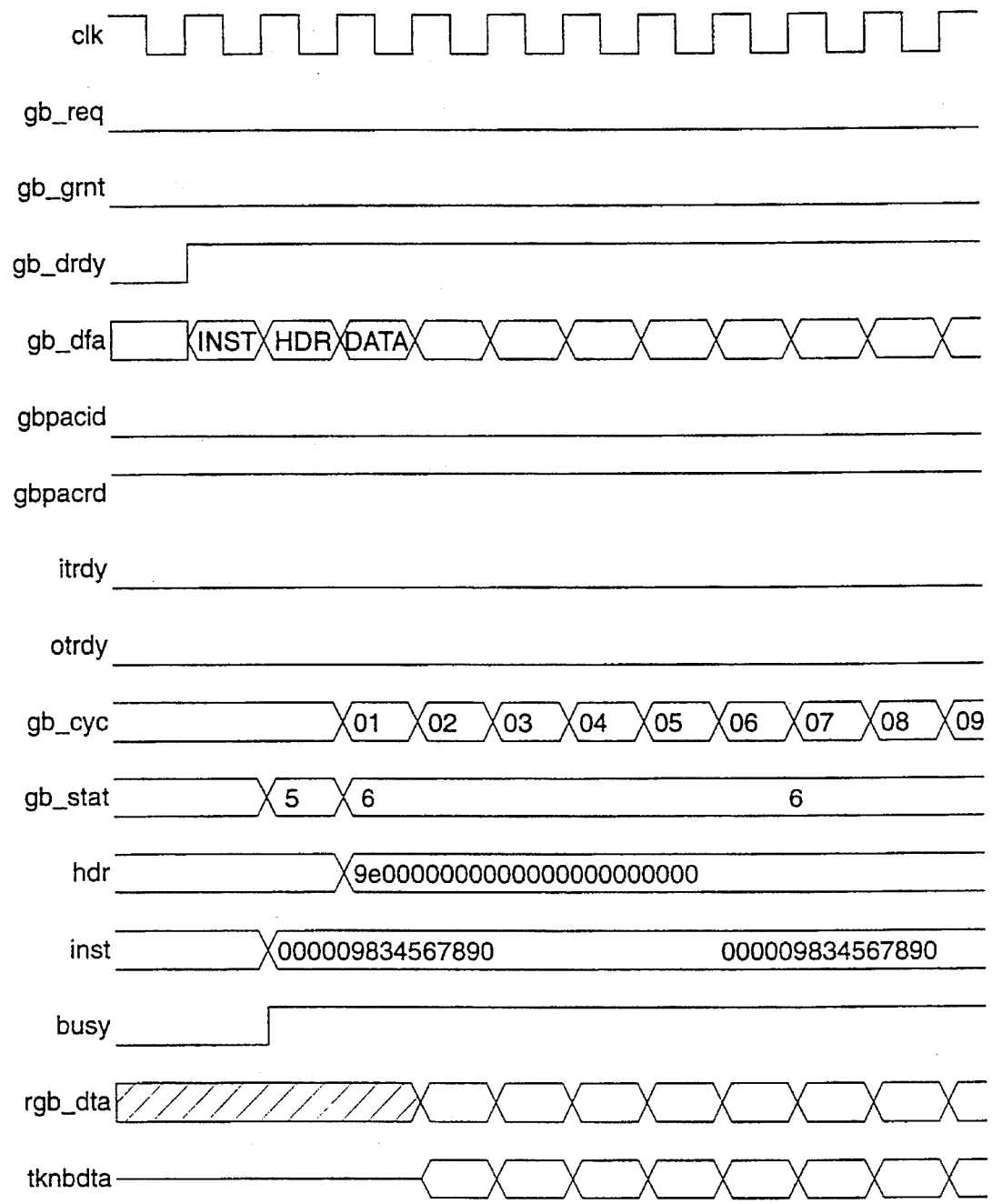
FIGS. 4A and 4B are a timing diagram for the global state machine of FIG. 3 according to an embodiment of the present invention.
Figure 4B:
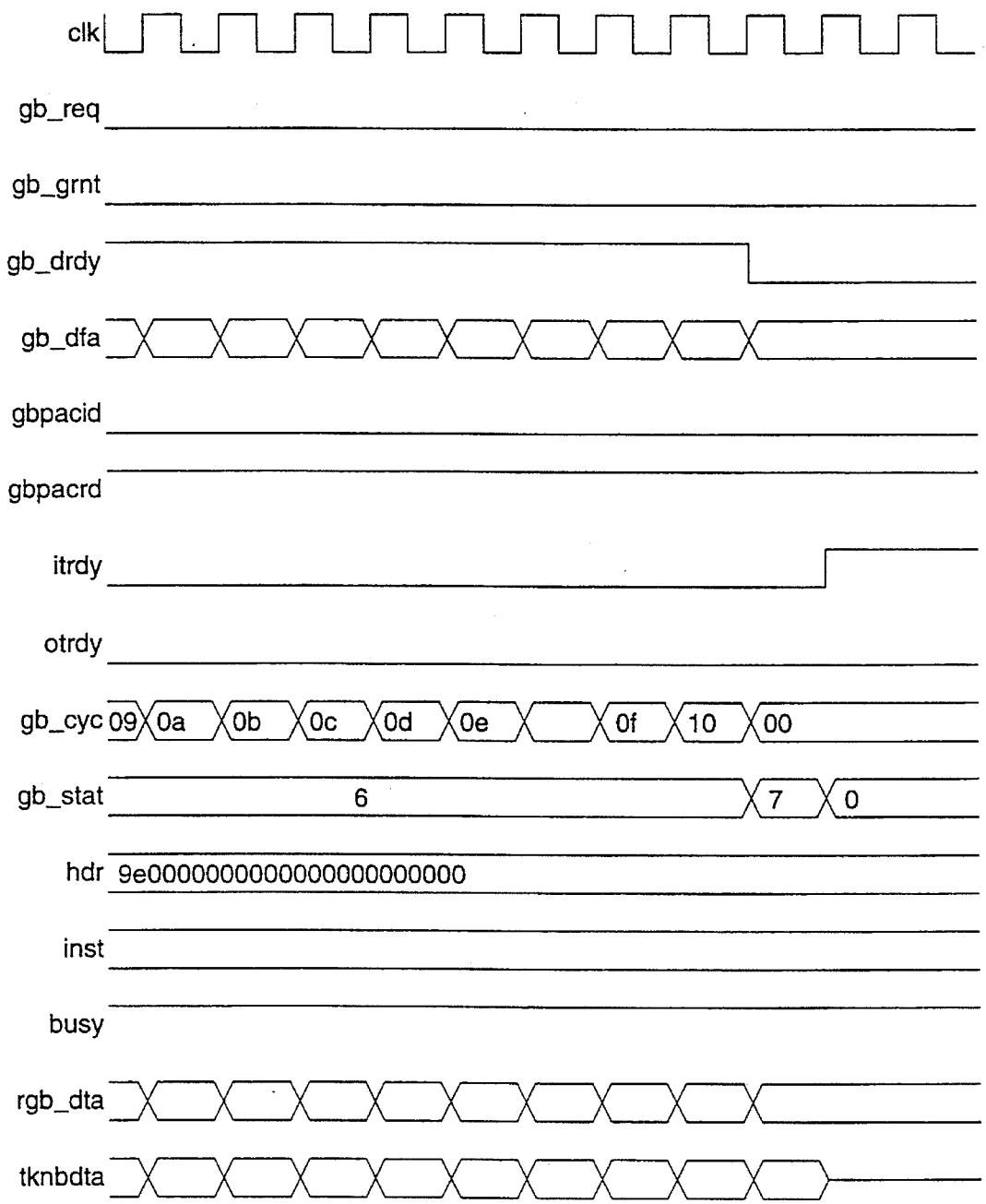
Figure 5A:
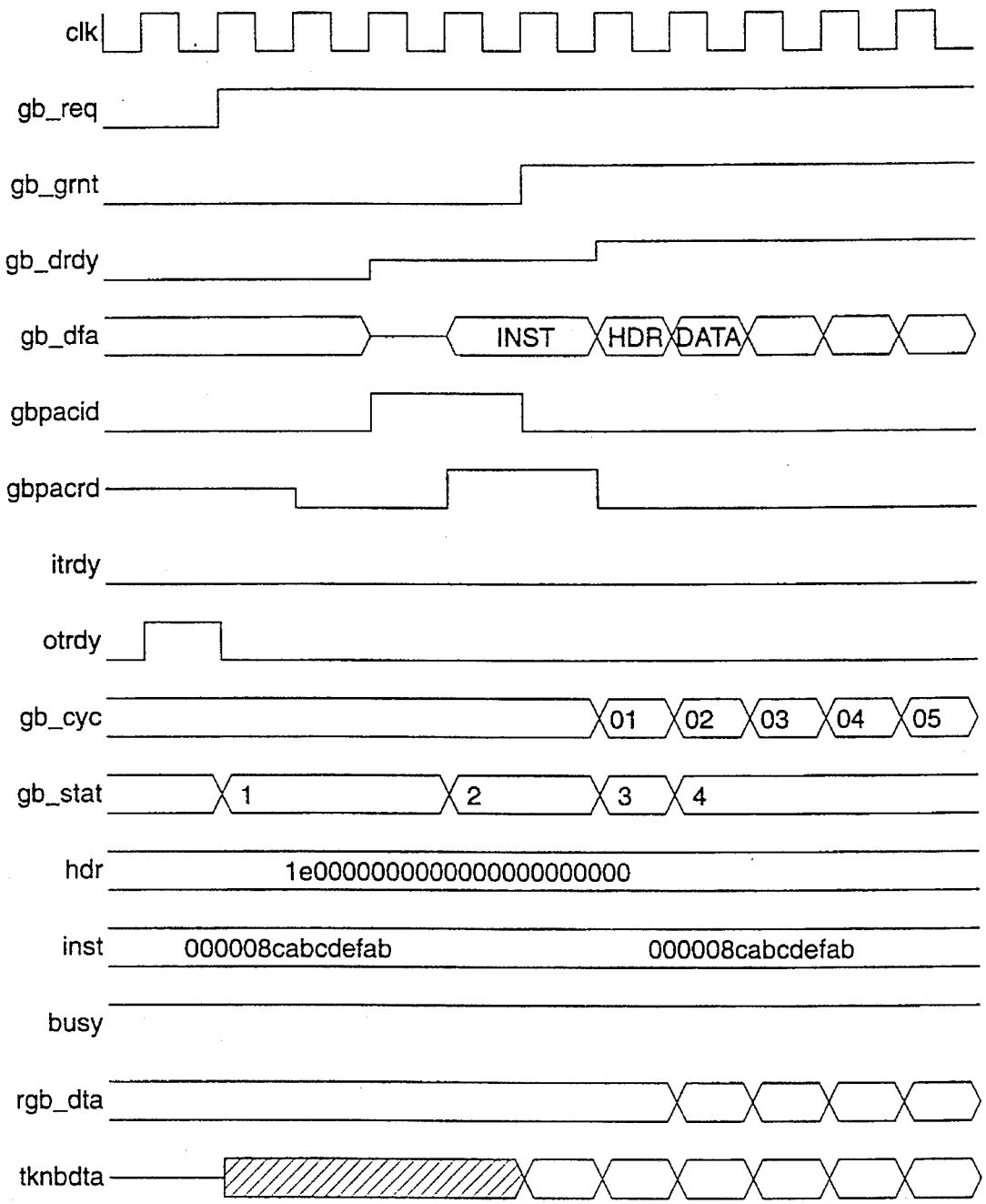
FIG. 5A–5C shows an output token data transfer according to an embodiment of the present invention.
Figure 5B:
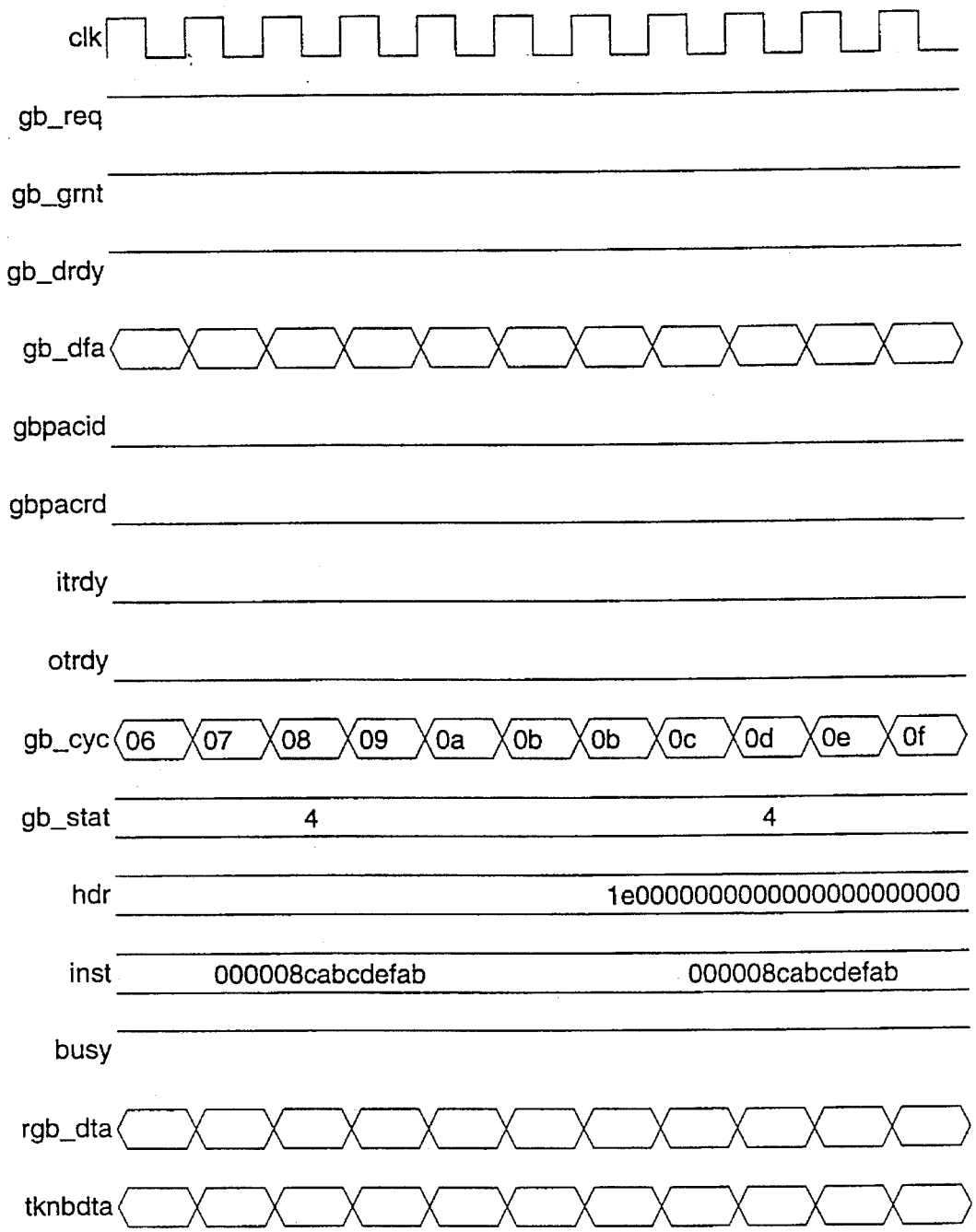
Figure 5C:
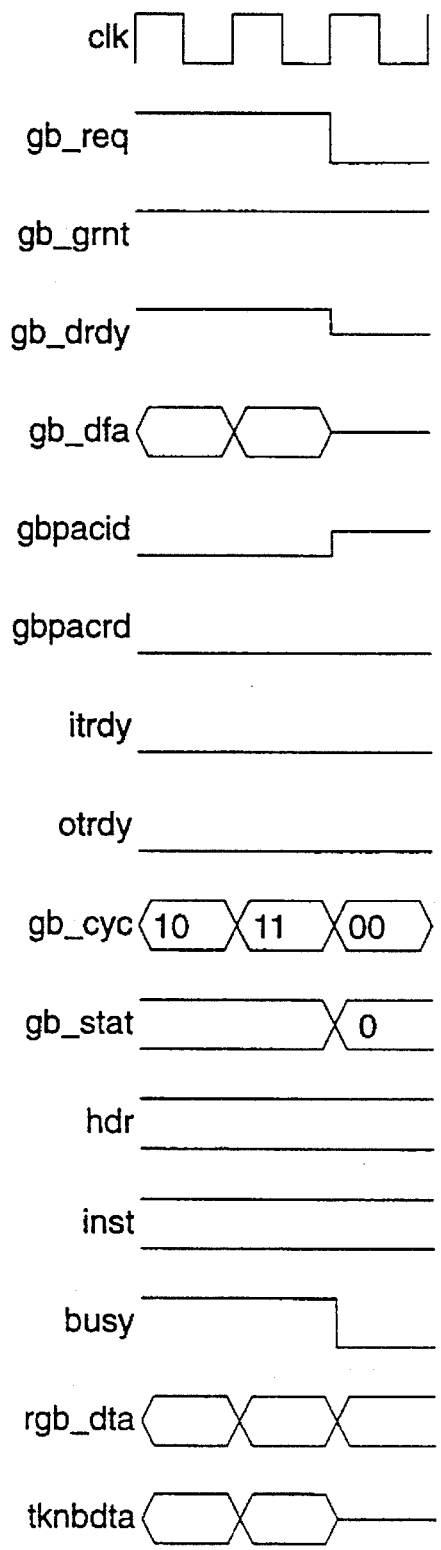
Figure 6:
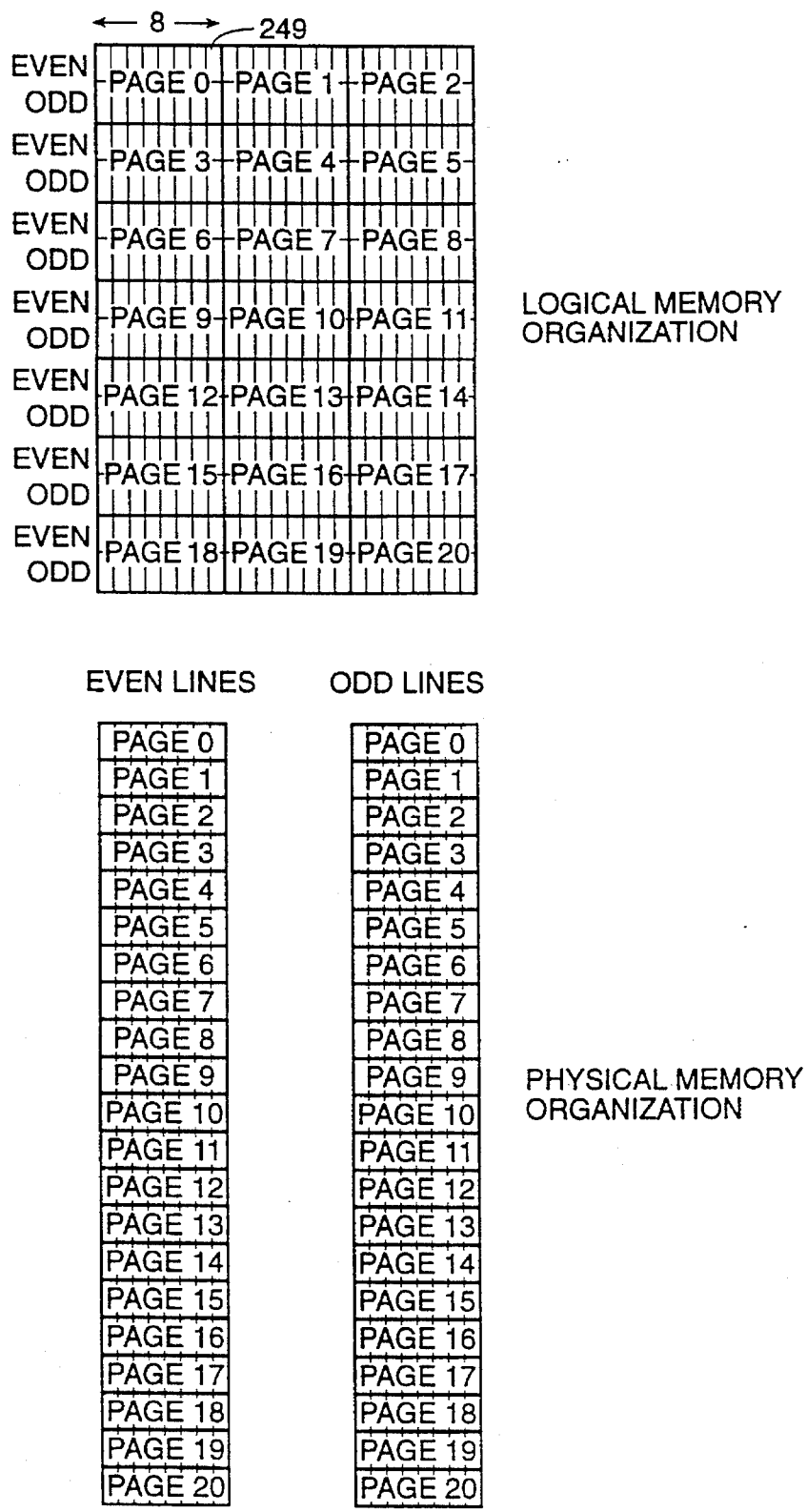
FIG. 6 shows the logical segment to physical storage mapping of the video interface buffer according to an embodiment of the present invention.

The timing diagram of FIGS. 4A and 4B show the global bus interface during an input data token transfer from the controlling device. FIGS. 4A and 4B also show some of the internal control signals and counts. FIGS. 5A–5C show an output data token transfer.

Data Token Buffer

Data token buffer 102 stores the group of image pels to be written to or read from the video memory. Data token buffer 102 comprises two 128×8 token RAMs. The VIU is capable of loading the image data from the off-chip DRAM with or without 2:1 horizontal and vertical decimation. The decimation filter is a simple averager which operates on non-overlapping 2×2 blocks of pels. If the four 8 bit unsigned pel values making up a 2×2 block are given by a, b, c, and d, the output of the filter y is given by:

$$y=(a+b+c+d)//4$$

where "//" means integer division rounded to the nearest integer, with half values rounding up.

When loading full-resolution image to buffer 102, 2 pels are written to each bank of buffer RAMs at a time for 32-bit video data bus or 1 pel each for 16-bit video data bus. When loading quarter-resolution image to buffer 102, only 1 pel is written to buffer 102 at a time. When copying images from the buffer 102 to the search memory unit, a full row of 8 pels are read out from each buffer 102 bank and written to a search memory. One token RAM is used to store the even-ordered rows and the other is used to store the odd-ordered rows in the token. When writing to the video memory, the controller loads a data token containing up to four 8×8 data blocks into data token buffer 102. When executing a read-type instruction, the image pels read from the video memory, or interpolated image pels are stored in the token buffer 102 to form up to four 8×8 data blocks. To enable the token RAM to function at high clock rates, the incoming addresses, as well as the control inputs are pipelined. The addresses and the various control signals are provided by buffer control 108.

Figure 7:
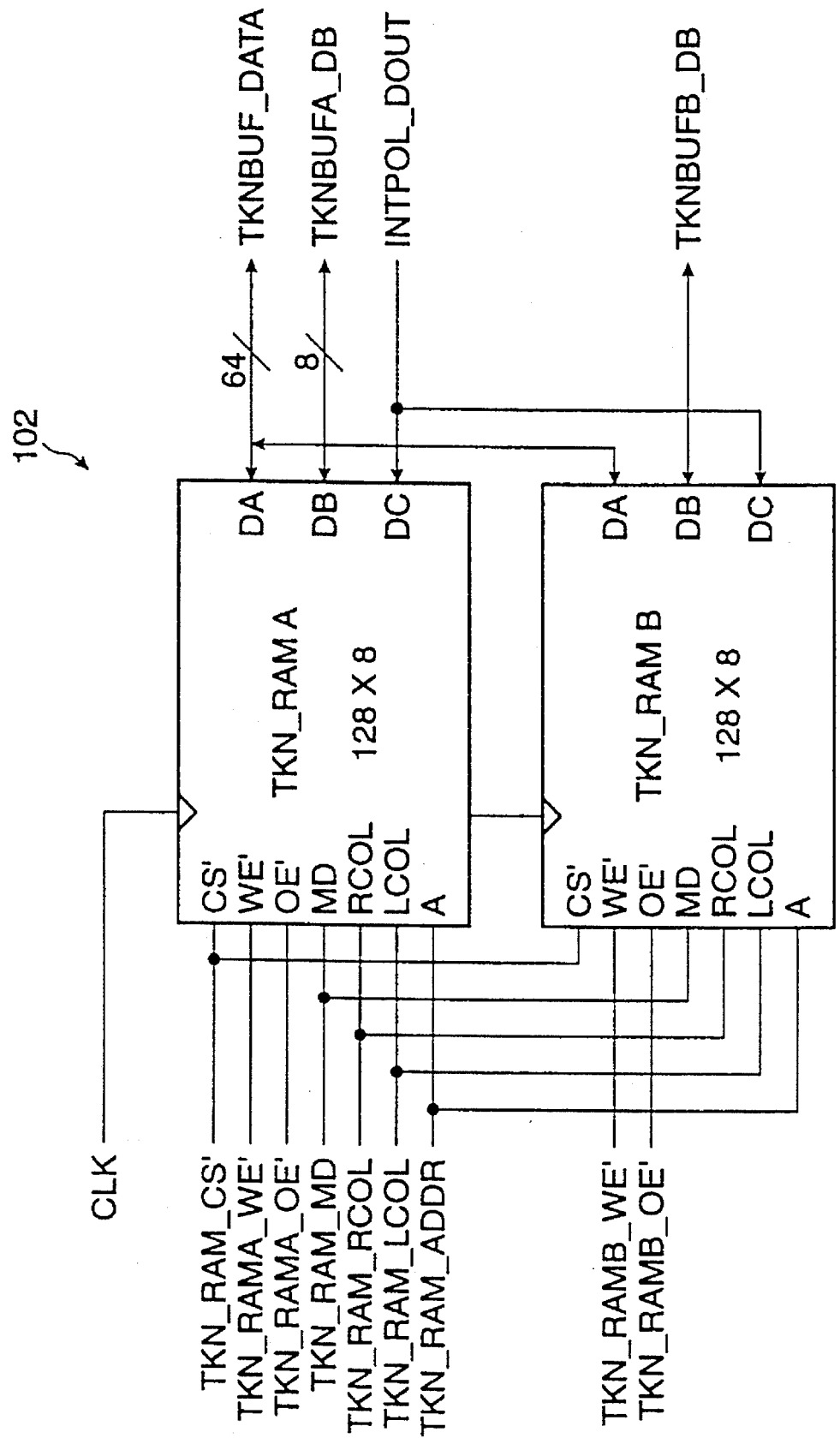
FIG. 7 is a block diagram of a data token buffer according to an embodiment of the present invention.

FIG. 7 shows the block diagram of token buffer 102. Each token RAM comprises three data buses (DA, DB, and DC). Data bus DA is a 64-bit bus used for passing data token between the controlling device and VIU 100, via global bus state machine 104. Data bus DB is an 8-bit bus used for passing data to and from the video memory via the circular partial buffer 112. Data bus DC is an input 16-bit bus used for writing two columns within a row. Data bus DC is used for writing y interpolated or xy interpolated images to token buffer 102. The CLK input is used to strobe various pipeline registers in the RAM.

The 2-bit MODE input configures the access mode of the RAM. Like the addresses, it is also pipelined. When the pipelined MODE (RMODE) is 00, the RAM is operated in the "long mode." Accesses are made via the 64-bit data bus DA. The row address is provided by the 4-bit pipeline of the A input. The LCOL and RCOL inputs do not affect the operation of the RAM in this mode. This mode is used by VIU 100 for passing data to and from the controlling device.

When RMODE is 01, the RAM is operated in the "double mode." This mode is used for writing y interpolated or xy interpolated images to the token RAMs. The row address is provided by the registered A input. The registered LCOL and RCOL define the locations in the rows to be written.

When RMODE is 10, the RAM is operated in the "single left mode." An 8-bit data value is accessed via data bus DB. The row address is provided by the 6-bit pipeline of the A input. The pipelined values of LCOL provides the column address and allows access to any column between 0 and 7. The RCOL input does not affect the operation of the RAM in this mode. This mode is used for transferring image pels to partial buffer 112 and for receiving uninterpolated or x interpolated image pels. In a preferred embodiment of the invention, RMODE 11 is illegal in the VIU token RAM.

Partial Buffer

Figure 8:
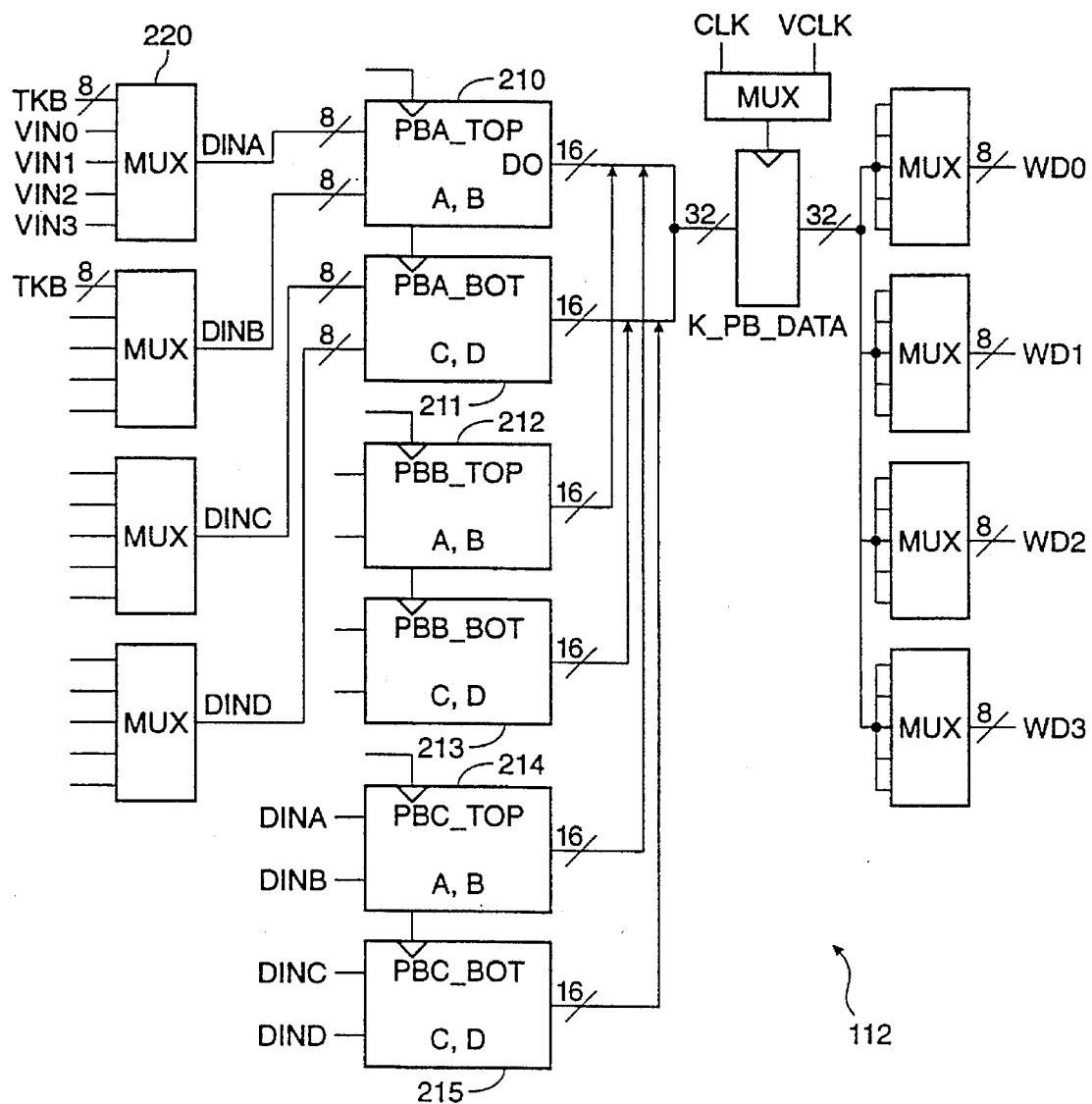
FIG. 8 is a block diagram of a partial buffer according to an embodiment of the present invention.
Figure 9A:
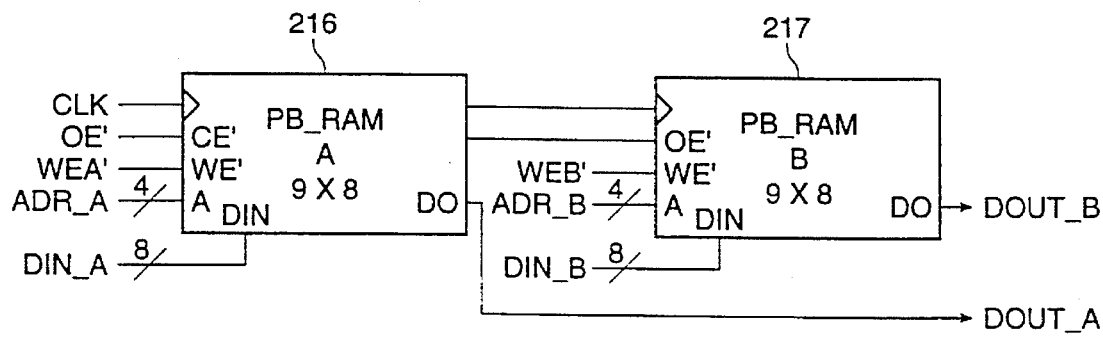
FIG. 9A is a diagram further illustrating the architecture of the buffer of FIG. 8.

Partial buffer 112 serves as a speed matching buffer between token buffer 102 and the external video memory. As shown in the block diagram of FIG. 8, partial buffer 112 comprises six one-row buffers 210–215. Each one-row buffer is made up of two 9×8 PB_RAMS 216, 217 as shown in FIG. 9A. One PB_RAM is used to store the even-column pels and the other is used to store the odd-column pels. Two separate RAMs are used to allow reading and writing of 2 column-adjacent pels in one clock cycle. Separate data input and data output ports are designed into the PB_RAM to allow the 2-pel data output from each of the six one-row buffers, to be connected such that only a single 32-bit pipeline register (PPB_DATA) is needed to fetch the RAM outputs.

The six one-row buffers 210–215 (PBA_TOP, PBA_BOT, PBB_TOP, PBB_BOT, PBC_TOP, PBC_BOT) are arranged to form a 6deep circular buffer. Two adjacent rows each are accessed by the token buffer and video interface state machine 114 simultaneously. The extra two rows of storage assures video interface state machine continuous access to partial buffer 112.

Each row buffer has its own address and memory controls to allow independent accesses of the circular buffer. Logic to generate the different addresses and memory controls are contained in partial buffer 112. Separate row selects for read and write of the circular buffer are maintained for both read from video memory and write to video memory operations. Each row select counts from 0 to 5 and back to 0.

During write to video memory execution, 2-pel vertical strips are written to two adjacent row buffers. The write cycles alternate between the even-column storage (A or C) and the odd-column storage (B or D). The pels are written into the selected row buffers using the processing clock CLK. For 4-pel write (WR32 and WR32_S), 4 pels are read out of the selected two rows of storage. At the end of each double-line write from the token buffer (TKB_DONE), the write row select is incremented by 1. One pel each is read from the even and the odd PB_RAMs in each row buffer. For 2-pel write (WR16 and WR16_S), 2 pels are read out of the selected two rows of storage. The even PB_RAMs are enabled alternately with the odd PB_RAMs. At the end of each double-line read (V_ACCS_DONE) of the circular buffer to the video memory, the read row select is incremented by 1.

During a read from video memory, excess pels fetched are not saved in partial buffer 112. Excess pels are fetched if the desired sub-image is not aligned to the 2×2 or 2×1 boundary of the video memory tiling configuration. As an example, if the desired sub-image starts on an odd image row address, the entire first row (even row address) fetched is discarded.

On boundary-aligned reads, 4 pels (top-even, top-odd, bottom-even, bottom-odd) are written to the circular buffer per write cycle for 4-pel type reads (RDV32, RDV32FMV, RDV32BMV); 2 pels (top and bottom) are written to the circular buffer per write cycle for 2-pel type reads (RDV16, RDV16FMV, RDV16BMV). These pels are written to the PB_RAMs using the video bus clock VCLK.

For sub-images that start on an odd row address, the first page-mode access by video interface state machine 114 will cause the second row fetched to be stored in PBA_TOP and the first row stored in PBC_BOT, which will be overwritten with pels from later rows before it is used. This action has the effect of discarding the first row fetched. The row select is incremented by 1 to point to the next pair of row buffers (PBA_BOT and PBB_TOP).

Figure 9B:
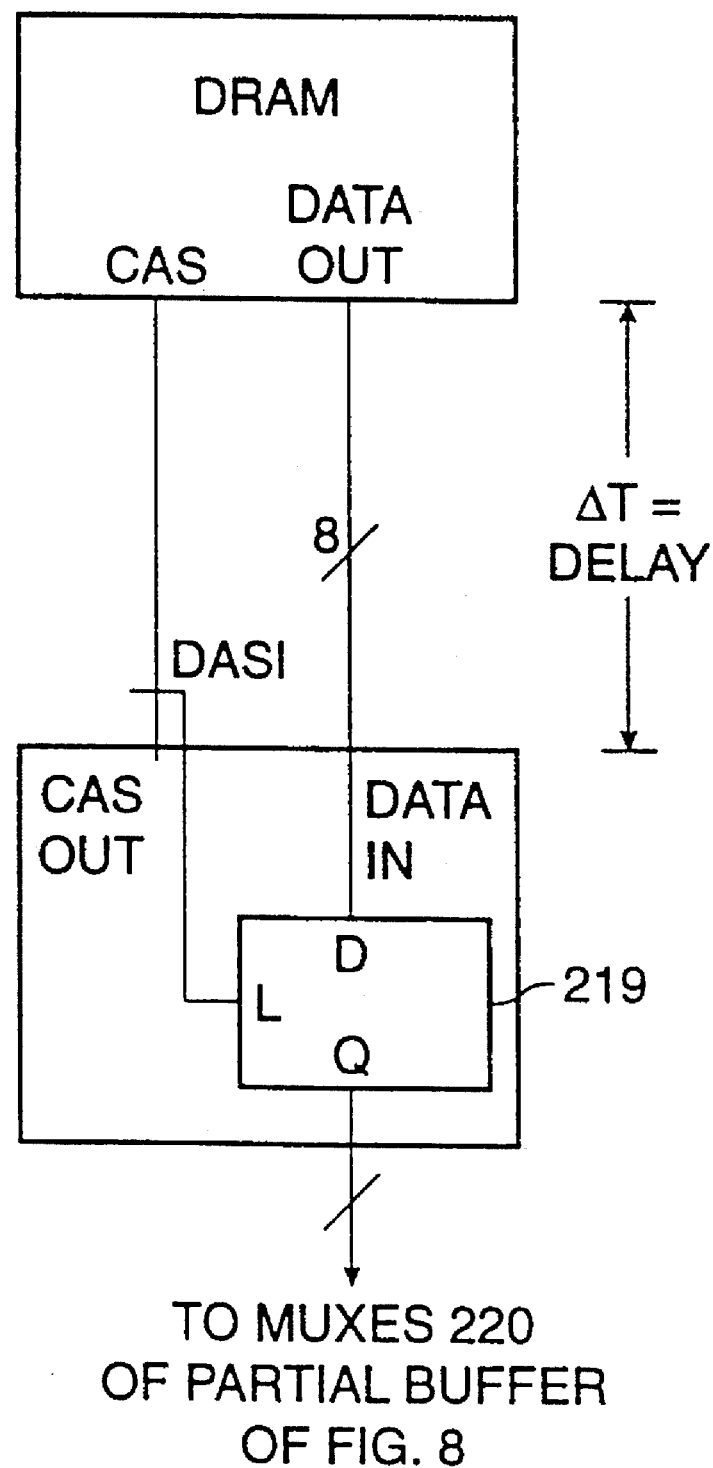
FIG. 9B is a block diagram of a DRAM data latch according to an embodiment of the present invention.

Partial buffer 112 may also include a transparent latches as shown in FIG. 9B, for ensuring that valid data is received from the DRAM memory. Many conventional DRAM memories do not guarantee the hold time for data output from the memory after the CAS pulse transitions to the "high" state.

In FIG. 9B, signals passing between the external memory and the VIU have an inherent transmission delay due to the geometry and multilayer capacitance of the board layout. Thus, the CAS strobe reaches the memory a short time after the pulse output from the requesting device. A separate pin, called CASI, may then be used to trigger a transparent latch 219. When latch 219 is activated, the data is held in the latch before being output to partial buffer 112. Another advantage of using a separate pin for CASI is that the latching feature may be easily disabled for use with, for example, hyper-page mode DRAMs not having the delay problems described above. When CASI is not asserted or disabled, latch 219 is transparent.

For sub-images that start on odd column address in a 4-pel video memory configuration, the left-most pels fetched for each page-mode access of the video memory are always discarded. That is, only the right-most pel(s) is (are) written to the circular buffer on the first write cycle of each page access of the video memory. The succeeding write cycles will cause a pair of pels to be written to the even and the odd PB_RAMs. In a 2-pel video memory tiling configuration, the sub-image may start on even or odd column address and still not cause extra unused pels to be fetched on the left side of each page access.

Two rows are always enabled in the circular buffer to feed interpolator 110. For xy and y interpolation, an even and an odd pel are read out of the even PB_RAM and the odd PB_RAM, respectively, for each row selected. A total of 4 pels are input to interpolator 110. For x interpolation and no interpolation, one pel each is read from each selected row buffer. The pair of pels alternate between the even and the odd PB_RAMs every processing clock cycle.

If line swap mode is in effect for a read from video memory, the lines of pels are swapped before being stored in the circular buffer. For write to video memory, the swapping of the lines are performed after the circular buffer.

A single 32-bit register (R_PB_CUT) is used to pipeline the output of the circular buffer. During write to video memory operation, R_PB_OUT is strobed using VCLK. The registered value is then distributed to WD0, WD1, WD2, WD3 as needed based on the video memory configuration and the lineswap mode in effect. During read from video memory operation, R_PB_OUT is strobed using the system clock CLK. The value latched is distributed between PB_DOUT_TOP[15:0] and PB_DOUT_BOT[15:0].

Processing state machine 106 ensures that no overrun or underrun on the circular buffer occurs. The signals output by partial buffer 112 are listed in Table II.

Interpolator

Interpolator 110 performs the bi-linear interpolation of the image segment to a half-pel resolution. Interpolation in either the horizontal (x) or the vertical (y) axes, or both axes is supported by interpolator 110. The interpolator supports fetching of pels from image memory relative to half-pel motion vectors as required by the MPEG standard.

Figure 10:
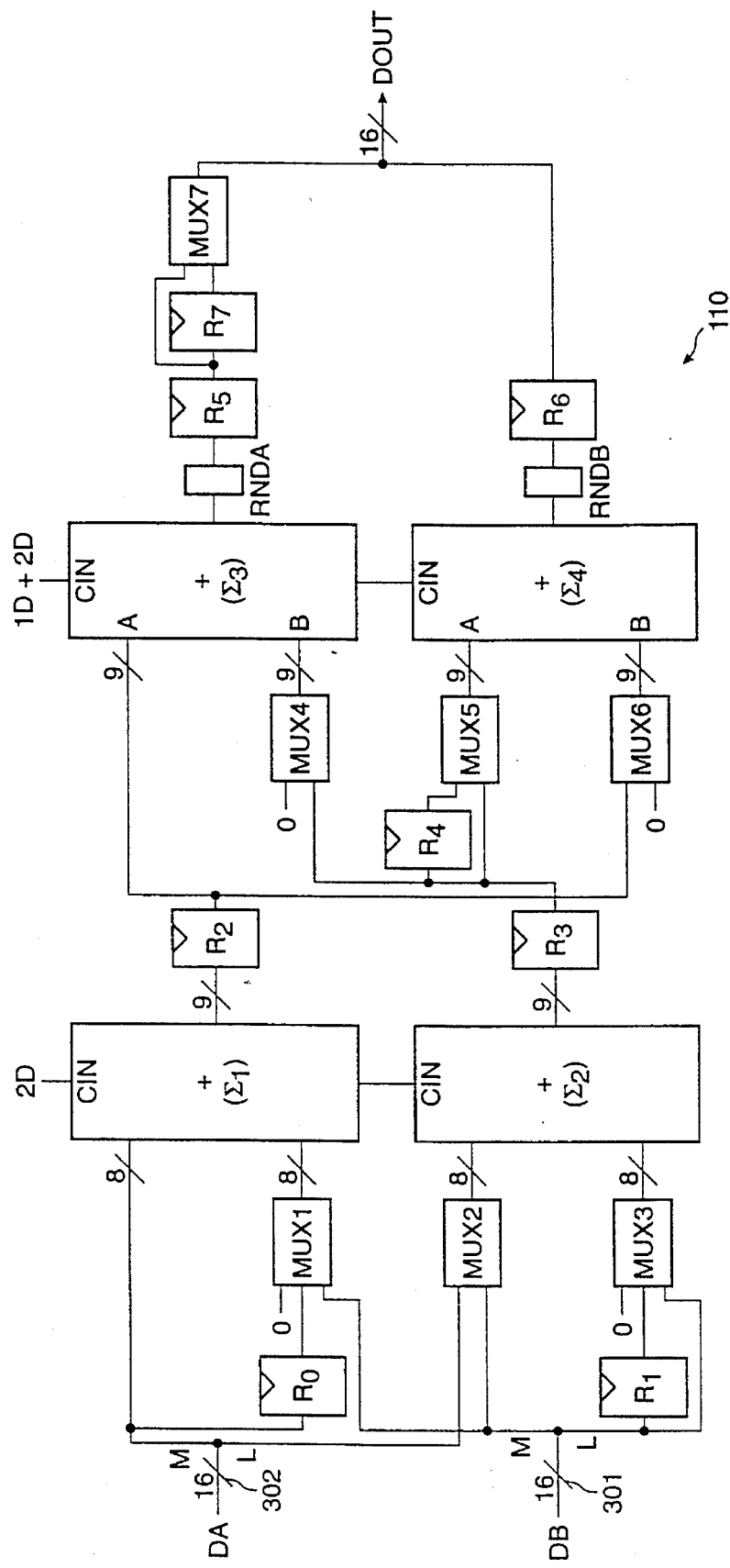
FIG. 10 is a block diagram of an interpolator according to an embodiment of the present invention.

Interpolator 110 can also pass image pels read from the video memory without any interpolation. FIG. 10 shows a block diagram of interpolator 110. Four 8-bit pels are received via the DA and DB input ports 300 and 301. Two 8-bit pels are output via the DOUT port. The control inputs XHALF, YHALF determine what type of interpolation is to be performed. If XHALF is high, interpolation in the horizontal axis is executed. If YHALF is high, interpolation in the vertical axis is executed. If both XHALF and YHALF are low, no interpolation is necessary, in which case, the most significant bytes at DA and DB are passed to R7 and R6, respectively, unaltered, after the processor latency.

To circulate x axis only interpolation, two adjacent pels in the row in the logical image segment are interpolated to form one 8-bit pel. Interpolator 110 includes 2 parallel arithmetic elements 304 and 306 to compute two x interpolated pels every clock cycle. The inputs at DA and DB each contain one significant pel each in the most significant byte position. These 2 pels in DA and DB alternate between the even and the odd columns in the partial buffer every clock cycle. Two adjacent rows are represented in the input ports. The incoming pels are registered in R0 and R1. On the next clock cycle, the value in R0 is added to the incoming pel in DA and the intermediate result stored in R2. This intermediate result is then passed through SUM3 unaltered before its value is divided by 2 to form one interpolated pel for the top row. In parallel, the value in R1 is added to the incoming pel in DB and the intermediate result stored in R3. This intermediate result is then passed through SUM4 unaltered before its value is divided by 2 to form the interpolated pel for the bottom row.

To calculate y axis only interpolation, one pel each from the same column but from two adjacent rows in the logical image segment are interpolated to form one 8-bit pel. Two parallel arithmetic elements in the interpolator compute 2 y interpolated pels per clock cycle. DA input contains 2 adjacent pels for the top row and DB input contains 2 adjacent pels for the bottom row. The most significant pel in DA is added to the most significant pel in DB using SUM1 and the intermediate result is saved in R2. This result is then passed through SUM3 unaltered before its value is divided by 2 to form one y interpolated pel. In parallel, the least significant pel in DA is added to that in DB using SUM2 and the intermediate result saved in R3. The intermediate result R3 is then passed through SUM4 unaltered before its value is divided by 2 to form the next y interpolated pel. When all 8 or 16 pels have been interpolated for one row, the bottom row of fetched pels fed via DB will be passed to interpolator 110 again as the top row in DA to compute the next row of interpolated pels.

To calculate a 2-dimensional (both x axis and y axis) interpolation, four adjacent pels forming a 2-pel square in the logical image segment are interpolated to form one 8-bit pel. The interpolation is computed as in the y interpolation, with the exception that the second stage adders (SUM3 and SUM4) are now used to add the intermediate sums in R2 and R3 and the value in R2 to the previous value of R3 in (in R4). The two sums are each divided by 4 to form the two adjacent, xy interpolated pels. As described previously for y interpolation, the current bottom row of fetched pels are fed to the interpolation as the top row to compute the next row of interpolated pels.

Processing State Machine

Processing state machine 106 serves as the instruction execution sequencer in VIU 100. Processing state machine 106 is tightly coupled to video interface state machine 114 to access a token of pels from the external video memory. Processing state machine 106 is started by global bus state machine 104 after a valid input token is received. In a preferred embodiment state machine 106 operates on the image compression coprocessor 45 clock processing clock or other system clock. Processor state machine 106 outputs the signals listed in Table III.

Processing state machine 106 breaks up the execution of the instruction into access tasks for video interface state machine 114. Each task consist of two rows of pels in the logical image segment being processed. For write-type instructions, the number of columns (NCOLS) to be written to the video memory in each page-mode access cycle is extracted from the configuration (CFIG) of the component being written and the organization of the video memory. The WRV32 and WRV32 S instructions write video data to two columns per write cycle; NCOLS is 4 for a configuration with 1 8×8 block across the horizontal axis and 8 for a configuration with 2 8×8 blocks across the horizontal axis. Since WRV16 and WRV16_S write to one column per write cycle, NCOLS can be either 8 or 16 for these cases. The number of page-mode accesses (MAX_RAS_CNT) is half the vertical dimension of the component configuration.

For 4-pel read instructions, when the column for each page-mode access starts on an odd address, one extra column is fetched from the video memory to make up 9 or 17 pels across each row. This action also provides the extra pel required if x or xy interpolation is needed. For 2-pel read instructions, one extra column is fetched from the video memory when xy or xy interpolation is needed. Otherwise, only 8 or 16 columns are fetched. The number of page-mode accesses (MAX_RAS_CNT) made is normally half the vertical dimension of the component configuration. A 1 is added if the sub-image starts on an odd row address or if interpolation in the y axis is needed.

Processing state machine 106 computes the row address and the starting column address for the video memory access. The "effective" motion vector is computed as part of the row and column address calculation. This "effective" motion vector is based on the configuration of the current component (CFIG), and the configuration of component 0. For forward motion vector reads, HEADER[43:33] and HEADER[32:22] contain the x and y coordinates of the motion vector. HEADER is the 969 bit token description sent to the VIU 100. For backward motion vector reads, HEADER[21:11] and HEADER[10:0] contain the x and y coordinates of the motion vector. The FULLFMV and FULLBMV bits in the instruction processor packet indicates the pel resolution of the respective motion vectors. XHALF, YHALF are decoded during the "effective" motion vector computation.

Figure 11A:
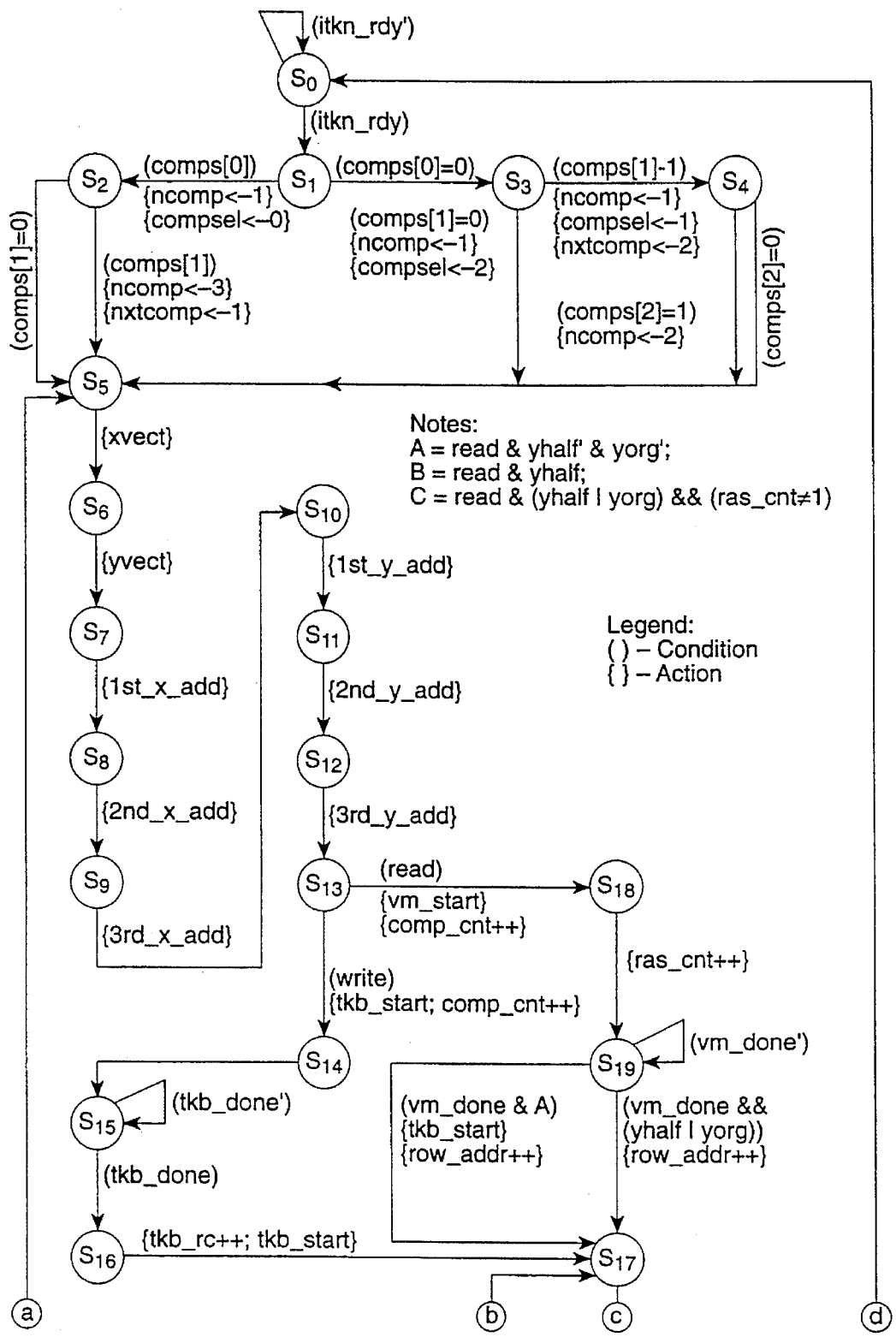
FIGS. 11A and 11B are state transition diagrams for a processing state machine of the VIU according to an embodiment of the present invention.
Figure 11B:
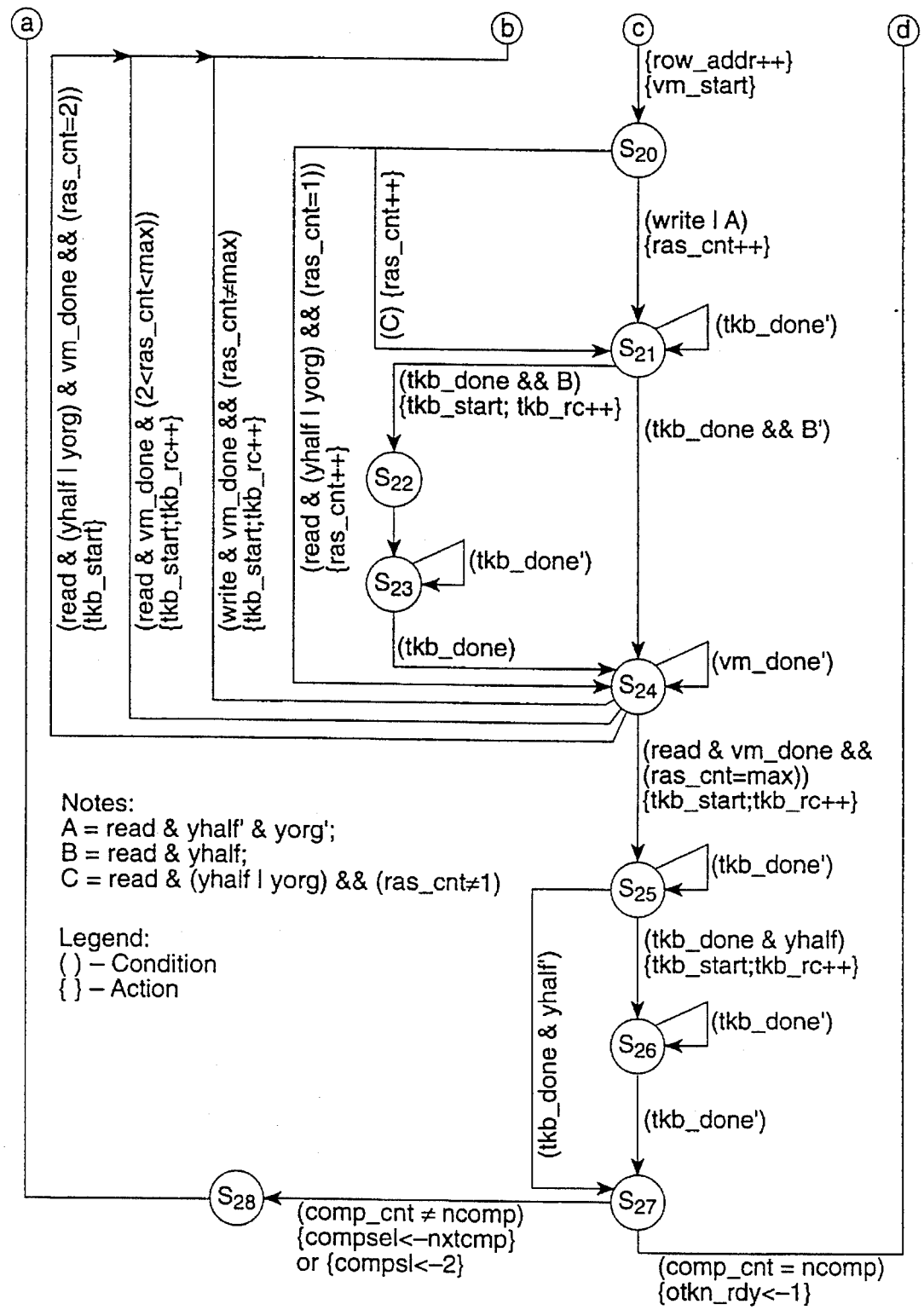

FIG. 11A and 11B show the transition diagram 400 for processing state machine 106. After reset (RSTALL), the state machine remains at the idle state (state 0) until an active ITKN_RDY is detected. State machine then transitions to state 1. At states 1 to 4, state machine 106, determines the number of components (NCOMP) represents in the token. State machine 104 also initializes the COMP_SEL and NXT_COMP with the first and the next component IDs, respectively. At the end of this initialization, state machine 114 goes to state 5. At states 5, 6, 7, 8, 9, 10, 11, 12 the row address and the starting column address of video memory access are calculated. The 11bit row address is output on VM_START_ROW; the 11-bit starting column address is output on VM_START_COL. The address computation completes M eight clock cycles. At completion of the address computation, state machine 114 transitions to state 13. At state 13, the processed component counter (COMP_CNT) is incremented.

If a write instruction is being executed, state 13 causes TKB START to be activated. This action initiates the transfer of two rows of pels from token buffer 102 to partial buffer 112. During the next 2 clock cycles, state machine 114 transitions to states 14 and 15. At state 15, state machine 114 waits for the transfer from token buffer 102 to partial buffer 112 to be completed, as indicated by TKB_DONE. State machine 114 then transitions to state 16. At state 16, another TKB_START is issued and the state transitions to state 17.

If a read-type instruction is being executed, state 13 issues a VM_START to video interface state machine 114, which causes two rows of pels to be read from the selected video memory. On the next two clock cycles, state machine 114 makes transitions to states 18 and 19. At state 19, state machine 114 waits for the page-mode read access to be completed as indicated by VM_ACCS_DONE. When an active VM_ACCS_DONE is detected, the video memory row address (VM_START_ROW) is incremented for the next page-mode access. In addition, if no y axis interpolation is needed and if the sub-image starts on an even row address, TKB_START is activated to start the write to token buffer 102 via interpolator 110. State machine 114 transitions to state 17 for either case.

At state 17, a VM_START is issued and state machine 114 transitions to state 20. At state 20, the number of page-mode accessed register (RAS_CNT) is incremented. If the read execution involves y interpolation or discard of first row fetched, and only one page-mode access has been done, state machine 114 transitions directly to state 24. Otherwise, the state changes to state 21, where it waits for TKB_DONE. State machine 114 then transitions to state 24 on write to video memory or on read from video memory which does not require interpolation in the y axis. Otherwise, state machine 114 transitions to state 22, increments the token row transfer counter TKB_RCNT, and restarts another transfer between token buffer 102 and partial buffer 112 by activating TKB_START. On the next clock cycle, state machine 114 transitions to state 23 where it waits for TKB_DONE. Once TKB_DONE is detected, state machine 114 transitions to state 24. State machine 114 remains at state 24 until VM_ACCS_DONE is received. At state 24, the current RAS_CNT is checked against MAX_RAS_CNT to determine if all the required rows in the component have been accessed (written to or read from the video memory). A single, 11-bit adder is used to form the row and column addresses, and to increment COMP_CNT, TKB_RCNT, RAS_CNT. If not all rows have been accessed, the state transitions to state 17. TKB_RCNT is incremented and TKB_START is activated.

If all rows in the sub-image have been accessed during a write to video memory, state machine 114 transitions to state 27. During read from video memory execution state machine 114 transitions to state 25. At the same time, TKB_RCNT is incremented and TKB_START is activated. At state 25, state machine 114 waits for the partial buffer 112 to token buffer 102 transfer to be completed. When complete, state machine 114 transitions to state 27 directly if no y interpolation is required. Otherwise state machine 114 increments TKB_RCNT, activates TKB_START, and transitions to state 26, where it again waits for TKB_DONE. Once an active TKB_DONE is detected, state machine 114 goes to state 27.

At state 27, the number of components processed (COMP_CNT) is checked against the total number of components (NCOMP). If all have been processed, OTKN_RDY is pulsed high and state machine 114 returns to state 0. If not all components have been processed, the selected component indicator (COMP_SEL) is updated to point to the next component and the state returns to state 5.

Since the video interface state machine 114 operates on the video bus clock VCLK, VM_START is held high until it is clocked into video interface state machine 114 on VCLK. The latched signal, ACK_VM_START, resets VM_START. The access completion indicator VA_ACCS_DONE from video interface state machine 114 is resynchronized to the system clock to form F_VM_ACCS_DONE.

Video Interface State Machine

Video interface state machine 114 accesses a row of pels to or from the video memory. This state machine is operated with the video bus clock VCLK and uses the signals listed in Table IV. State machine 114 produces the various video interface signals to access the video memory in a page-mode cycle. The timing of the video interface signals is controlled by the user via the programmable timing counts in the host block 128 of VIU 100. These counts are used to tailor the cycle timing produced by state machine 114 to the speed of the external DRAMs or VRAMS. Two counters (TM1_CNT and TM2_CNT) are used to time these parameters.

To reduce the propagation delays of the video bus control signals from VCLK, the actual registers for CAS[3:0], RAS[3:0], VWE, VOE are contained in the video bus register sub-unit. This placement allows the control signals generated by refresh unit and 116 SAM-DRAM transfer unit 118 to be combined with those generated by video interface state machine 114 before the registers. Set and reset signals are output by the video interface state machine instead. The video bus address and the memory select are registered however. These signals will be combined with those generated by the refresh unit 116 and SAM_DRAM transfer unit 118. This arrangement is acceptable since the timing requirements on these video bus outputs are less stringent than those of the control signals.

For 4-pel video bus operation, all CAS and RAS registers are set or reset together. For 2-pel video bus operation, the selected BUS_SEL dictates whether CAS[3:2] and RAS [3:2] or CAS[1:0] and RAS[1:0] are set or reset VIU 100 can be programmed by the user to be the master of the video bus connected to it. The master mode allows the video interface state machine to gain control of the video bus as long as the bus is not currently busy. VIU 100 does not need to make a request for bus access, unlike the other functions connected to this video bus. If not configured in the master mode, video interface state machine 114 is forced to make a bus request and wait for the request to be granted before it can gain access to the video bus.

A column counter (PRE_COL_CNT) in state machine 114 keeps track of the number of pels accessed in the row. This count and its pipelines are provided to partial buffer 112 to form its read or write addresses. The number of pels to be accessed for each row is given by NCOLS from processing state machine 106.

Figure 12:
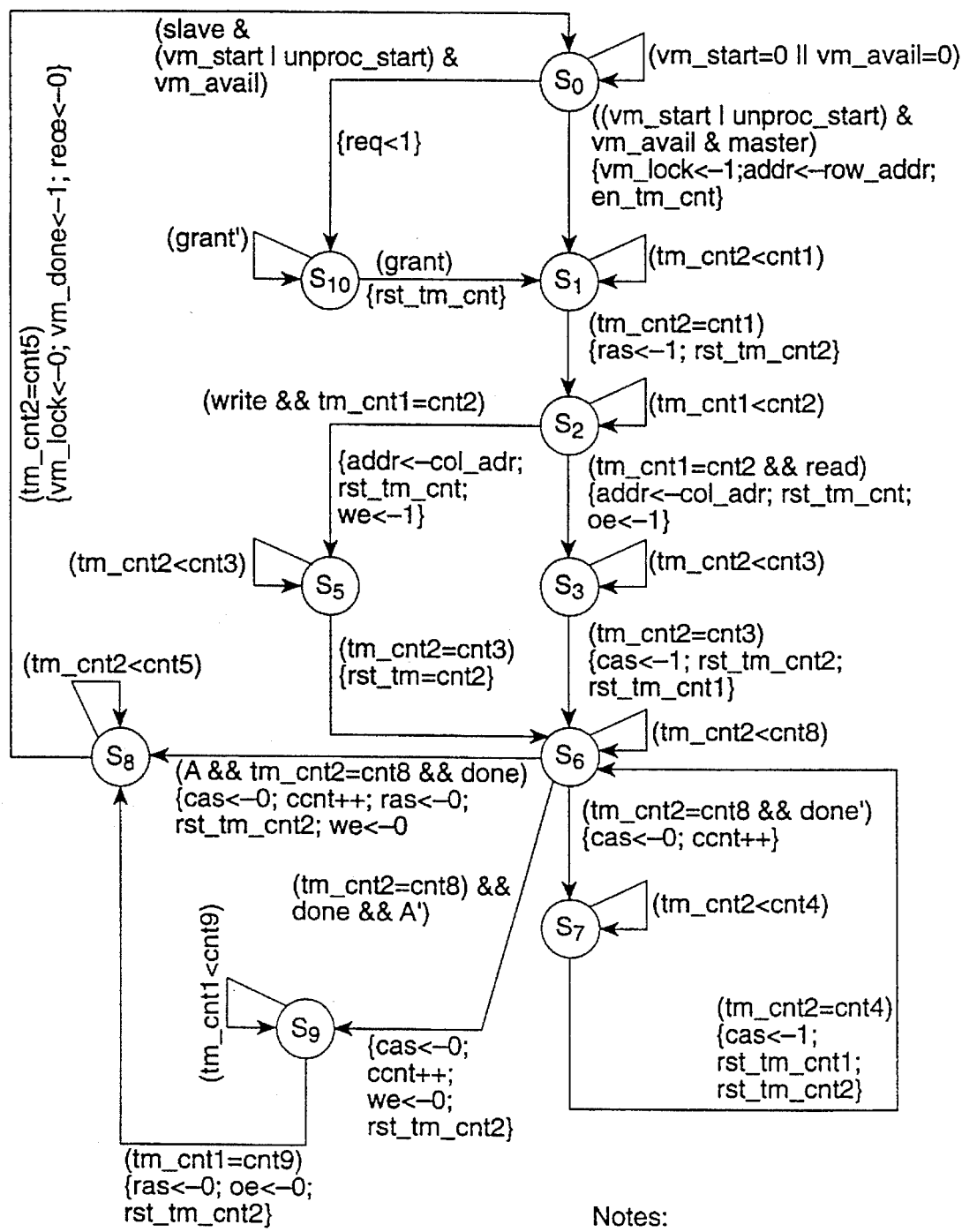
FIG. 12 is a state transition diagram for a video interface machine according to an embodiment of the present invention.

FIG. 12 shows the state transitions 402 of video interface state machine 114. Video interface state machine 114 remains at idle state (state 0) upon reset (hardware or software reset) and is started by processing state machine 106 by pulsing the VM_ACCS_START (VM_START in processing state machine description) signal. If configured as the master of the video bus, the activation of F_VM_ACCS_START (ACK_VM_START in the processing state machine) causes state machine 114 to transition to state 1 of the video bus in not busy (VRAM_BUSY is low). If the video bus is busy (VRAM_BUSY is high) at F_VM_ACCS_START time, the start condition is held in a flip-flop (UNPROC_START) for later processing. State machine 114 remains at the idle state. When the video bus becomes available, state machine 114 then transitions to state 1. For either case, the video bus is locked by state machine 114 after transitioning to state 1.

At state 1, the video memory row address contained in VM_START_ROW is selected to drive the video bus address XVM_ADDR. Both timing counters (TM1_CNT and TM2_CNT) are enabled to count at this state. When TM2_CNT reaches CNT1 (Row address to RAS delay), SET_RAS is asserted and TM2_CNT is reset immediately to start timing the next parameter. State machine 114 transitions to state 2. State machine 114 remains at state 2 until TM1_CNT reaches CNT2 (Row address hold time). If a read cycle is being performed state machine 114 then selects the starting column address in VM_START_COL to drive XVM_ADDR. SET_OE is also asserted before transitioning to state 3. State machine 114 remains at state 3 until TM2_CNT reaches CNT3 (RAS TO CAS delay). When the count is reached, SET_CAS is asserted and both timing counters are reset. State machine 114 then transitions to state 6. If a write cycle is being performed at state 2 when TM1_CNT reaches CNT2, state machine 1a goes to state 4. At state 4, it waits for TM2_CNT t reach or exceed CNT6 (RAS to WE active delay) before transitioning to state 5. SET_WE is asserted at the same time. At state 5, state machine 114 waits for TM2_CNT to reach CNT3 (RAS to CAS delay) before transitioning to state 6. SET_CAS is asserted then and TM2_CNT is reset. CNT7, which has the value CNT3–1, is used in state 4 or 5 to cause the column counter PRE_COL_CNT to increment to account for the pipelining latency through partial buffer 112.

As state 6, state machine 114 waits until TM2_CNT reaches CNT8 (CAS pulse width). RST_CAS is asserted when the condition is met. PRE_COL_CNT, as well as the column address, is incremented at this time. TM2_CNT is reset to start the timing of the CAS inactive time. If more pels need to be accessed from the video memory (i.e., COL_CNT<NCOLS), state machine 114 goes to state 7, where it waits for the CAS inactive time to be satisfied (TM2_CNT reaches CNT4). SET_CAS is re-asserted and both timing counters are reset. The state returns to state 6.

When the CAS pulse width is satisfied in state 6 and all pels in the row have been accessed, RST_WE is asserted. If CNT9 (RAS hold time) is no more than CNT8 (CAS pulse width), the state machine transitions to state 8. RST_RAS is asserted at the same time as RST_WE. If CNT9 is more than CNT8, state machine 114 transitions to state 9, where it waits for TM1_CNT to reach CN9. Then RST_RAS is asserted and the state changes to state 8. At state 8, the state machine waits until TM2_CNT reaches CNT5 (RAS precharge time). When this condition is met, RST_OE is asserted, the video bus is unlocked, and VM_ACCS_DONE is pulsed. State machine 114 then returns to the idle state.

If VIU 100 is configured as a slave on the video bus, state machine 114 transitions to state 10 when an active F_VM_ACCS_START is detected. At the same time, a bus access request (BUS_REQ) is made to the video bus arbiter 120. State machine 114 remains at state 10 until the bus request is granted. When an active level on GRANT is detected, state machine 114 locks the video bus by activating VM_LOCKED and proceeds to state 1. The video memory is accessed in the same manner as in master mode. The bus request is reset at the end of the access cycle.

The CAS-return signals CRET[3:0] are used to latch the respective incoming video pels into transparent latches in this sub-unit to reduce the CAS cycle time in the VRAM due to read access. The latched values (L_VDO, L_VD1, L_VD2, L_VD3) are then pipelined into registers VM_DATA_REG[0:3]. These register values are output as RDPEL[0:3] for use in partial buffer 112.

Figure 13A:
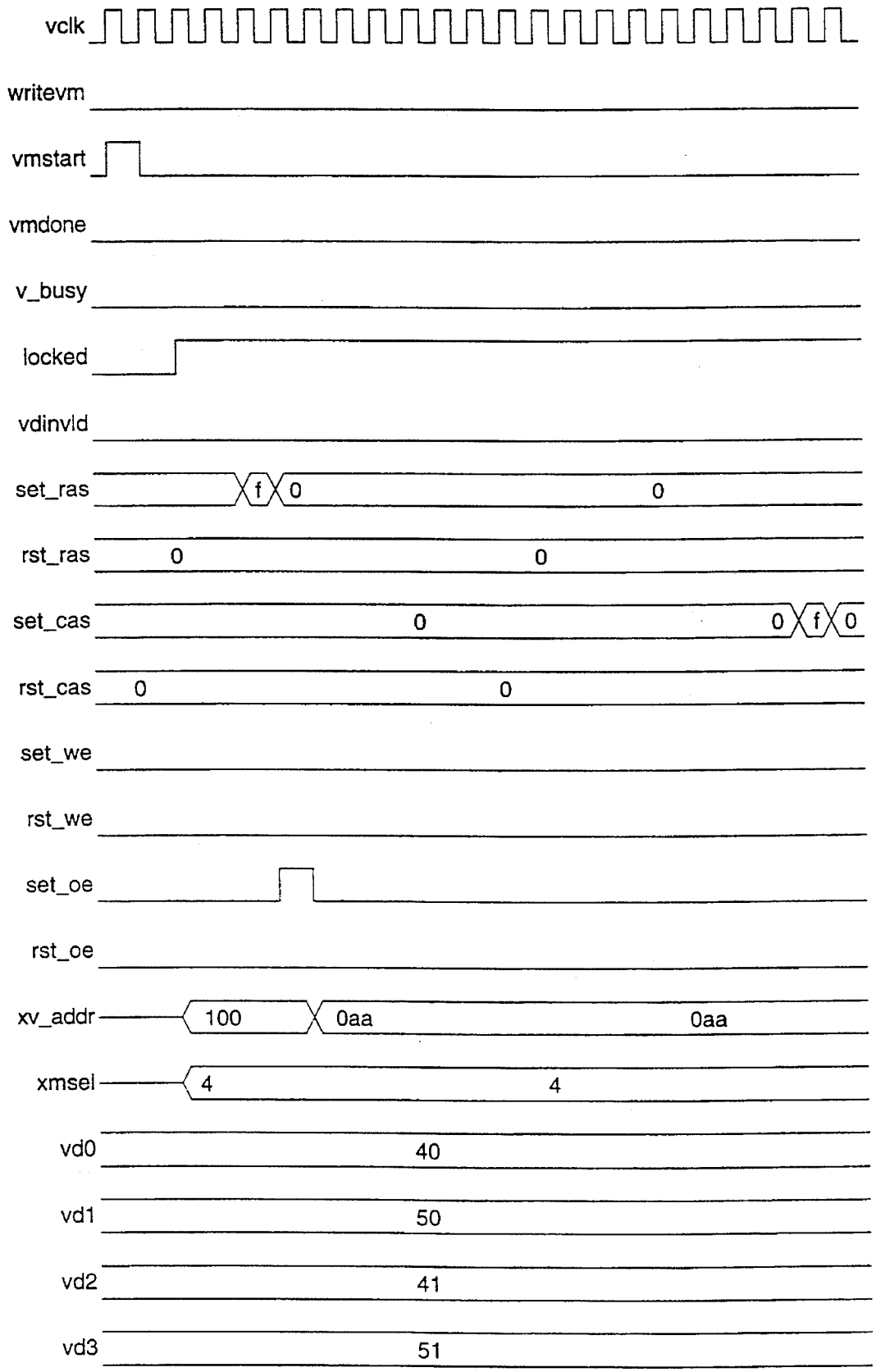
FIGS. 13A–13C show a page mode read cycle timing according to an embodiment of the present invention.
Figure 13B:
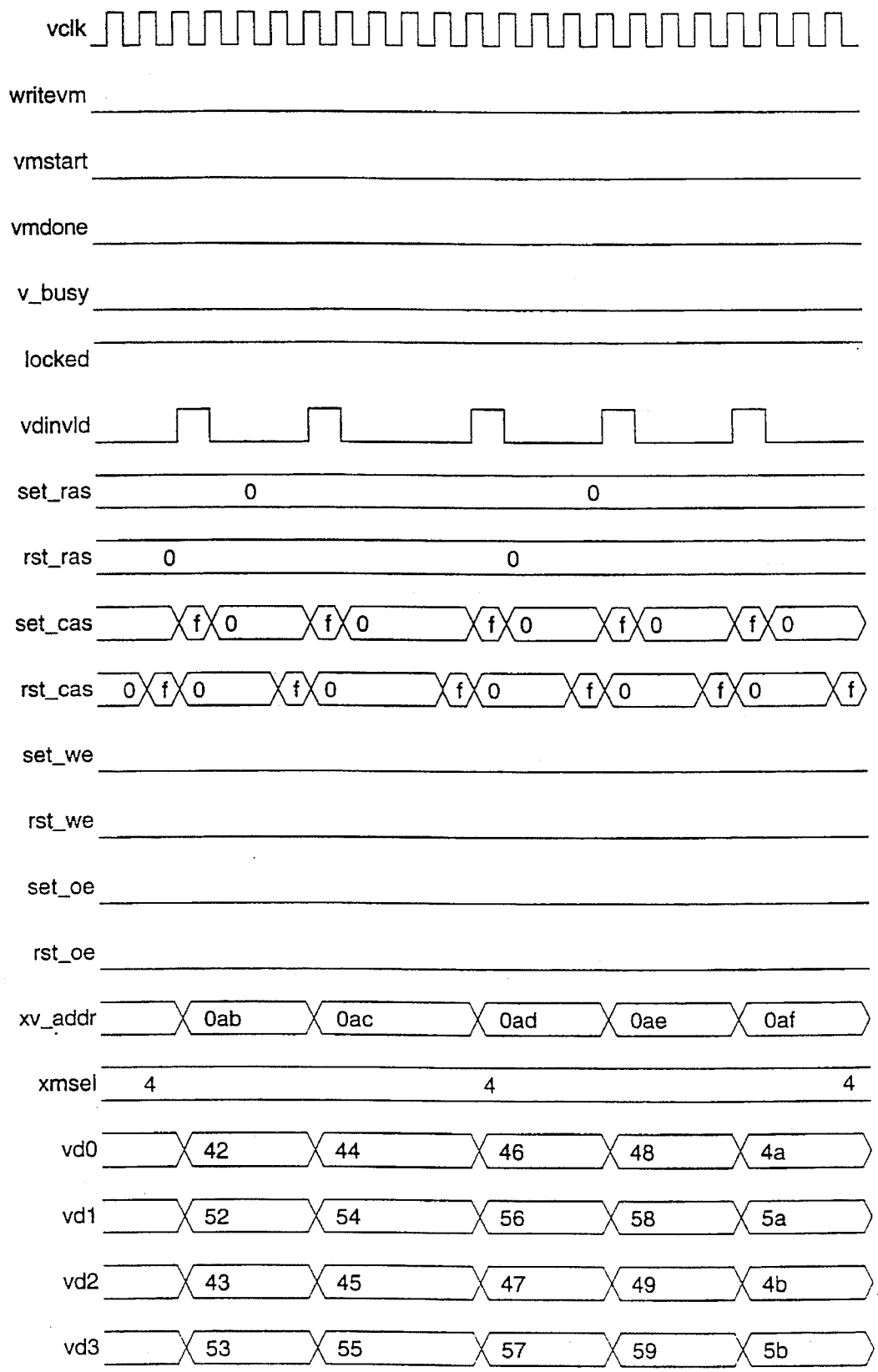
Figure 13C:
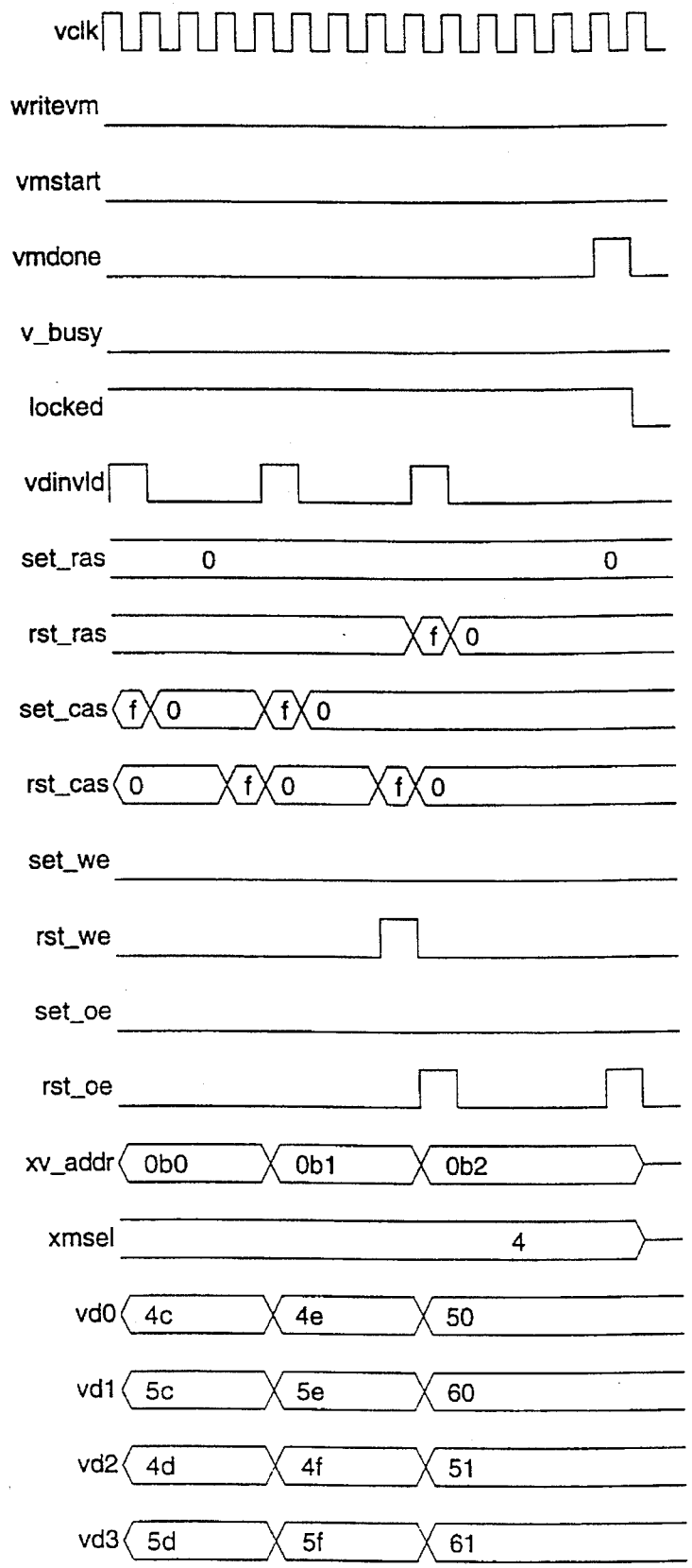
Figure 13D:
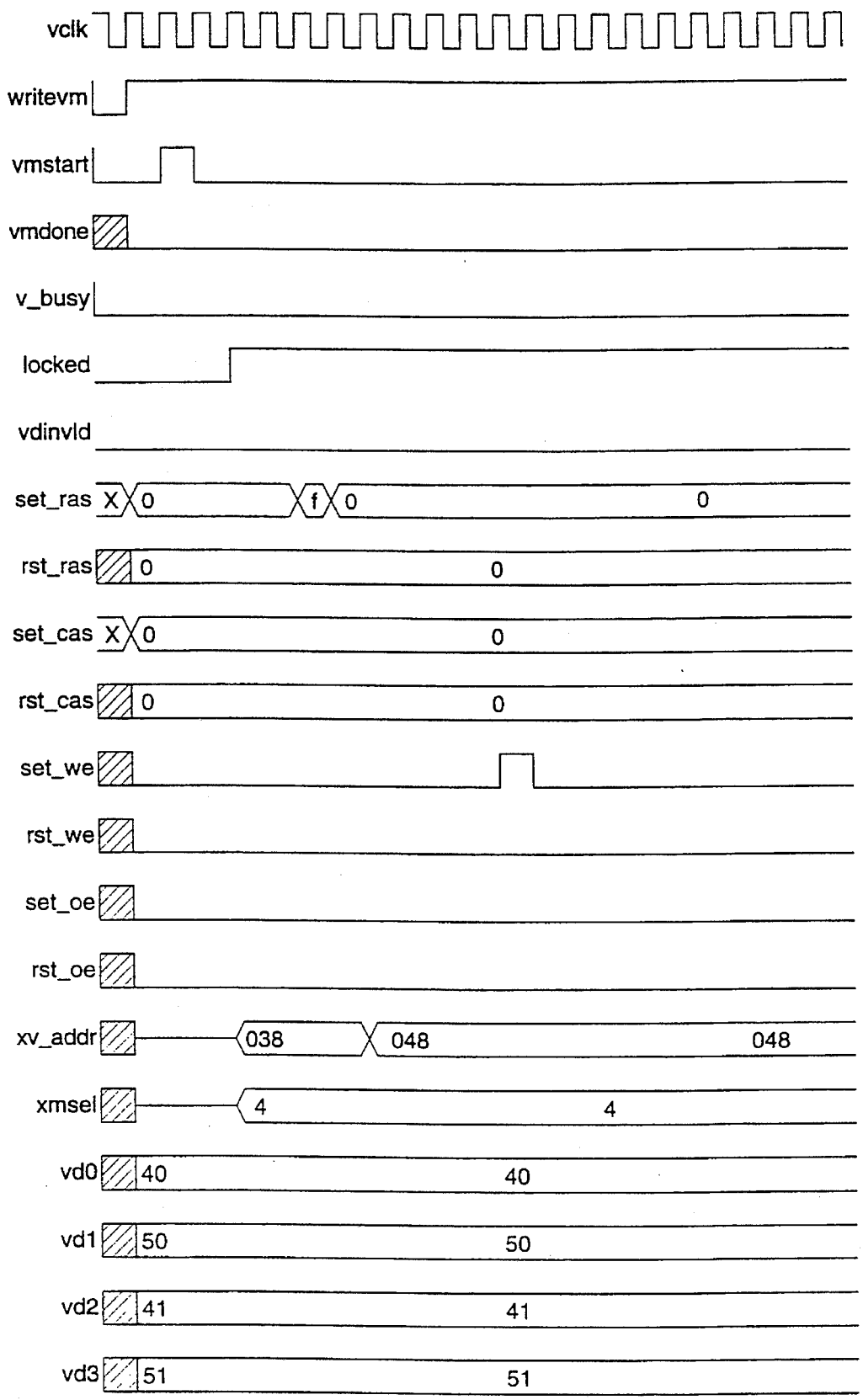
FIGS. 13D–13F show the page-mode write cycle 499 timing according to an embodiment of the present invention.
Figure 13E:
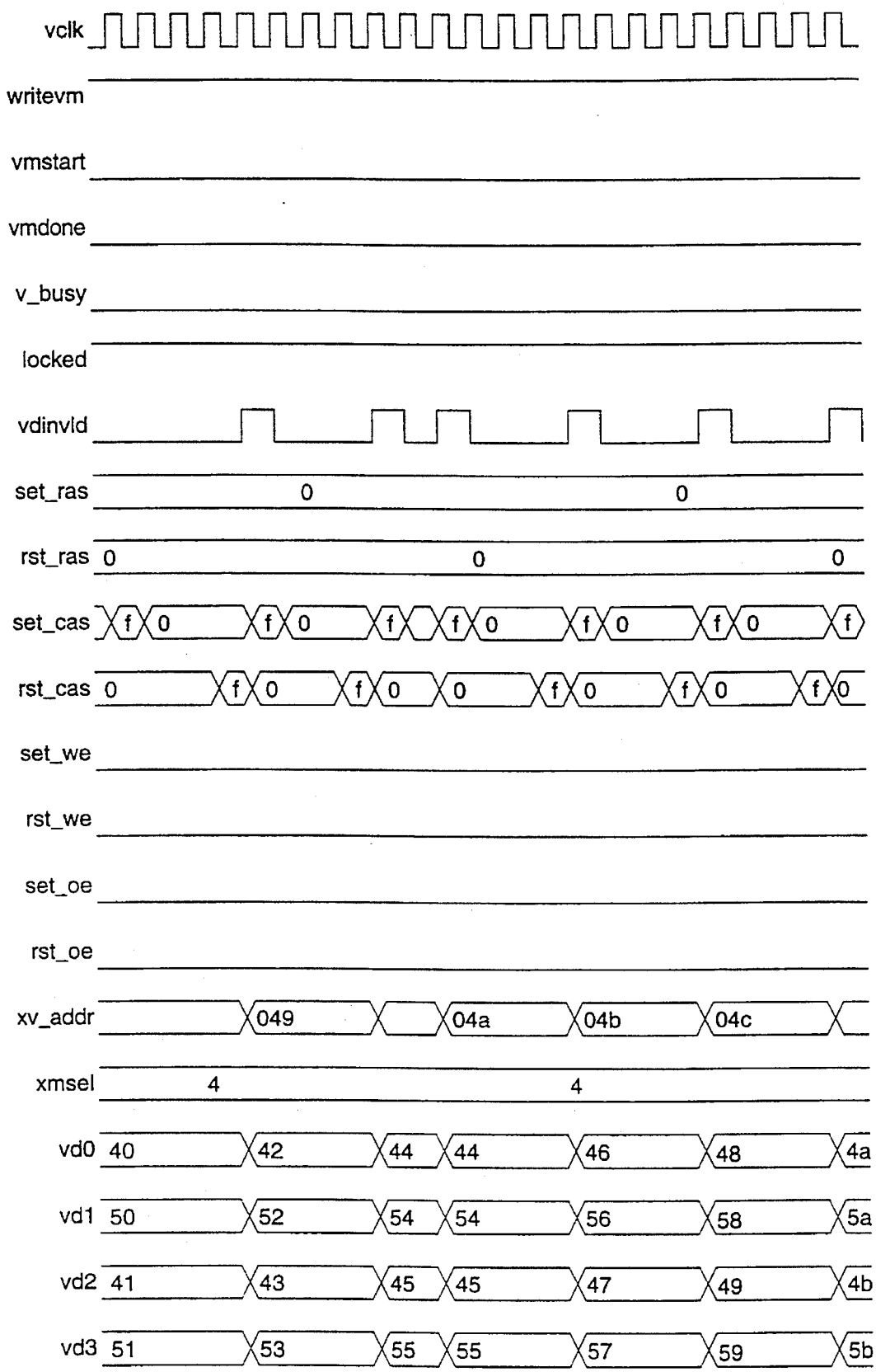
Figure 13F:
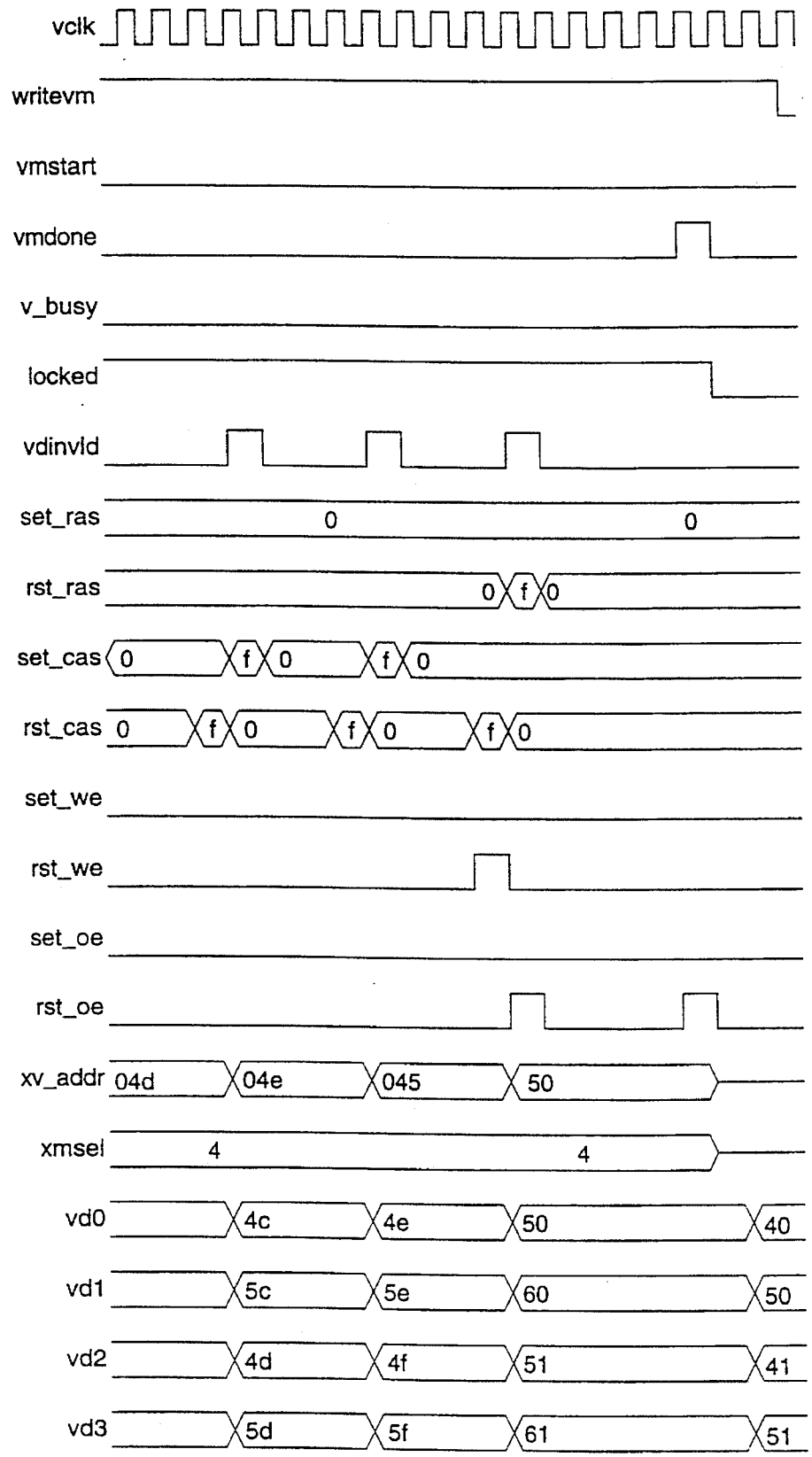

FIGS. 13A1–13A3 shows the page-mode read cycle 498 timing for the video memory. FIGS. 13B1–13B3 show the page-mode write cycle 499 timing for the video memory.

Refresh Unit

Refresh unit 116 provides the capability to refresh the external DRAM-based video RAMs at a user-defined time interval. The refresh logic is operated using the video bus clock VCLK. The refresh function can be enabled by the user by loading a 1 to the RFSR_IN via the host interface. While the function is enabled, the refresh timer keeps counting until it reaches the user-defined time interval count, RFSH_CNT. At this time, a refresh cycle is requested and the refresh time is reset to start timing the next refresh interval. By writing 1 to RFSH_EN the host also causes a refresh cycle to be generated. This host request is indicated by DO_RFSH resynchronized to VCLK.

The actual CAS, RAS, VWE registers are contained in the video bus register sub-unit. The set and reset signals from this sub-unit are combined with those from video interface state machine 114 and SAM-DRAM transfer unit 118 before being registered.

Figure 14:
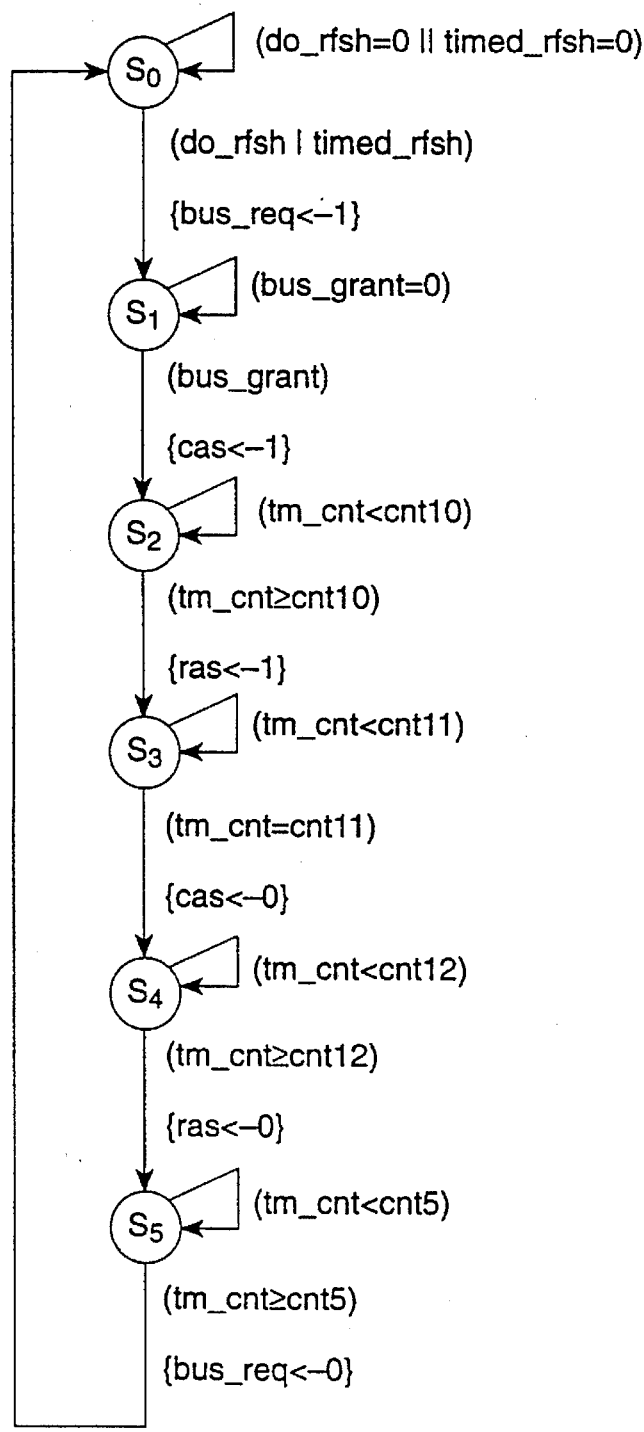
FIG. 14 shows a state transition diagram for a refresh state machine according to an embodiment of the present invention.

A state machine is employed to request access to the video bus and to generate the CAS-before-RAS refresh cycle timing. FIG. 14 shows the state transitions 500 of the refresh state machine. Upon hardware reset, the state machine remains at state 0. When a refresh cycle is requested, either by the refresh timer or implicitly by host processor 38, the state machine activates the video bus request and transitions to state 1. The state machine remains at state 1 until the refresh video bus access request is granted by the video bus arbiter. At that time, SET_CAS is asserted and the state transitions to state 2. The timing counter TM_CNT is enabled to time the CAS-to-RAS delay (CNT10). When the timing delay is met, SET_RAS is asserted and the state machine transitions to state 3. TM_CNT is also reset to start timing the next parameter. When the CAS hold time (CNT11) is satisfied, RST_CAS is asserted and the state machine transitions to state 4. The state machine remains at state 4 until the RAS pulse width (CNT12) is satisfied. At that time, RST_RAS is asserted and the video bus request is de-activated and a transition to state 5 is made. TM_CNT is again reset to start timing the RAS pre-charge time (CNT5). When CNT5 timing is met, the state machine transitions back to state 0. RST_WE is asserted throughout the CAS-before-RAS refresh cycle. A value of 0 is output on XMEM-SEL during refresh cycle.

SAM Transfer Sub-Unit

The SAM transfer unit 118 provides the capability to move image pels between the serial access memory (SAM) and the DRAM within the VRAMs used to form the video memory system. This feature, together with the refresh function, facilitates the integration of the user's video memory system with, for example, image compression coprocessor 45 by reducing the logic around the video memory to a minimum.

In the embodiment described herein, a SAM-DRAM transfer operation request may come from either an external video timing generator via the 4-bit VSAMD input or from host 38 via the HSAMD. Each is qualified by VSAM_RQ and HSAM_REQ, respectively. The lower 2 bits of HSAMD or VSAMD select the row address register to be operated on. The upper 2 bits select one of 4 operations to be performed, namely reset, increment row address register, SAM transfer, and SAM transfer with increment on row address register. The sub-unit is capable of accepting 1 request each (REQO, REQ1, REQ2, REQ3) for the row address registers. These 4 requests are presented to the REQ_STATE state machine.

Two state machines are employed to support the operations required of this block. One state machine, REQ_STATE, resolves requests for the four row address registers. The other state machine, STATE, generates the SAM-to-DRAM or DRAM-to-SAM video bus cycle timing.

SAM Request State Machine

Figure 15A:
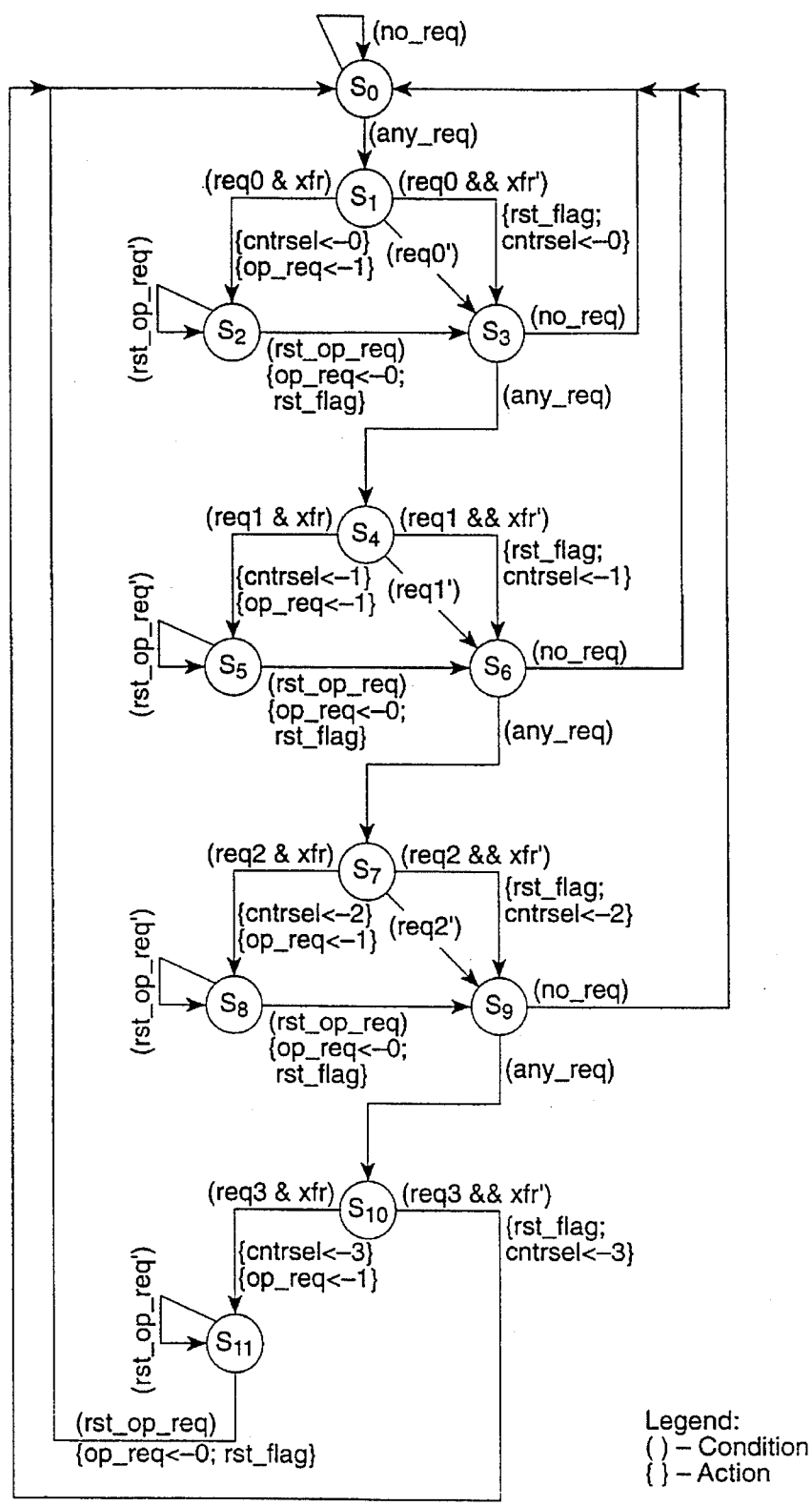
FIG. 15A shows a transition diagram of a request state machine according to an embodiment of the present invention.

FIG. 15A shows the transition diagram 550 of the request resolver state machine. This state machine implements a fairness algorithm by checking for all four requests each time it transitions out of the "idle" state, state 0. This scheme prevents REQ0 and REQ1 from locking out REQ2 and REQ3. The state machine starts at state 0 after reset. At state 0, CNTR_SEL is always set to 0 to select row address register 0. If any request is active, the state machine goes to state 1 where it checks for a request for row address register 0. If no request is pending for register 0 or if a reset or increment operation is found for register 0, the state transitions to state 3 and the requested operation is executed. If the request for register 0 requires a SAM transfer cycle, OP_REQ is asserted and the state machine transitions to state 2. OP_REQ is sent to the bus cycle state machine STATE to request for a video bus cycle. The request state machine remains at state 2 until the SAM transfer bus cycle has been completed by the STATE state machine, as indicated by the RST_OP_REQ flag. It then resets OP_REQ, REQ0 and transitions to state 3. If an increment of the row address register is required, the increment is also done at this time.

At state 3, CNTR_SEL is updated to point to row address register 1. If any other request is pending, the state machine goes to state 4, otherwise, it returns to state 0. At state 4, it looks for a request for register 1. If none is found, the state machine proceeds to state 6. If a request for register 1 is pending while at state 4, the state machine transitions to state 6, if the operation does not require a SAM bus cycle, and the operation is completed. If the operation does require a SAM bus cycle, the state transitions to state 5 and OP_REQ is asserted to request for a video bus cycle. The state machine remains at state 5 until the requested bus cycle is completed, as indicated by RST_OP_REQ. The state machine then resets OP_REQ and REQ1, and transitions to state 6.

At state 6, CNTR_SEL is updated again to select row address register 2. The processing is as done for REQ1 with the state transitioning from states 6 to 7 to 9 or from state 6 to 7 to 8 to 9. At state 9, CNTR_SEL is updated to select row address register 3. If no request is outstanding at state 9, the state machine returns to state 0. Otherwise it transitions to states 10 to 0 or to state 10, 11 and 0.

SAM Bus Cycle State Machine

The STATE state machine receives the OP_REQ from the request resolver state machine and makes a bus request to the video bus arbiter on its behalf. Once the bus request is granted, the state machine proceeds to do a SAM transfer cycle on the video bus.

Figure 15B:
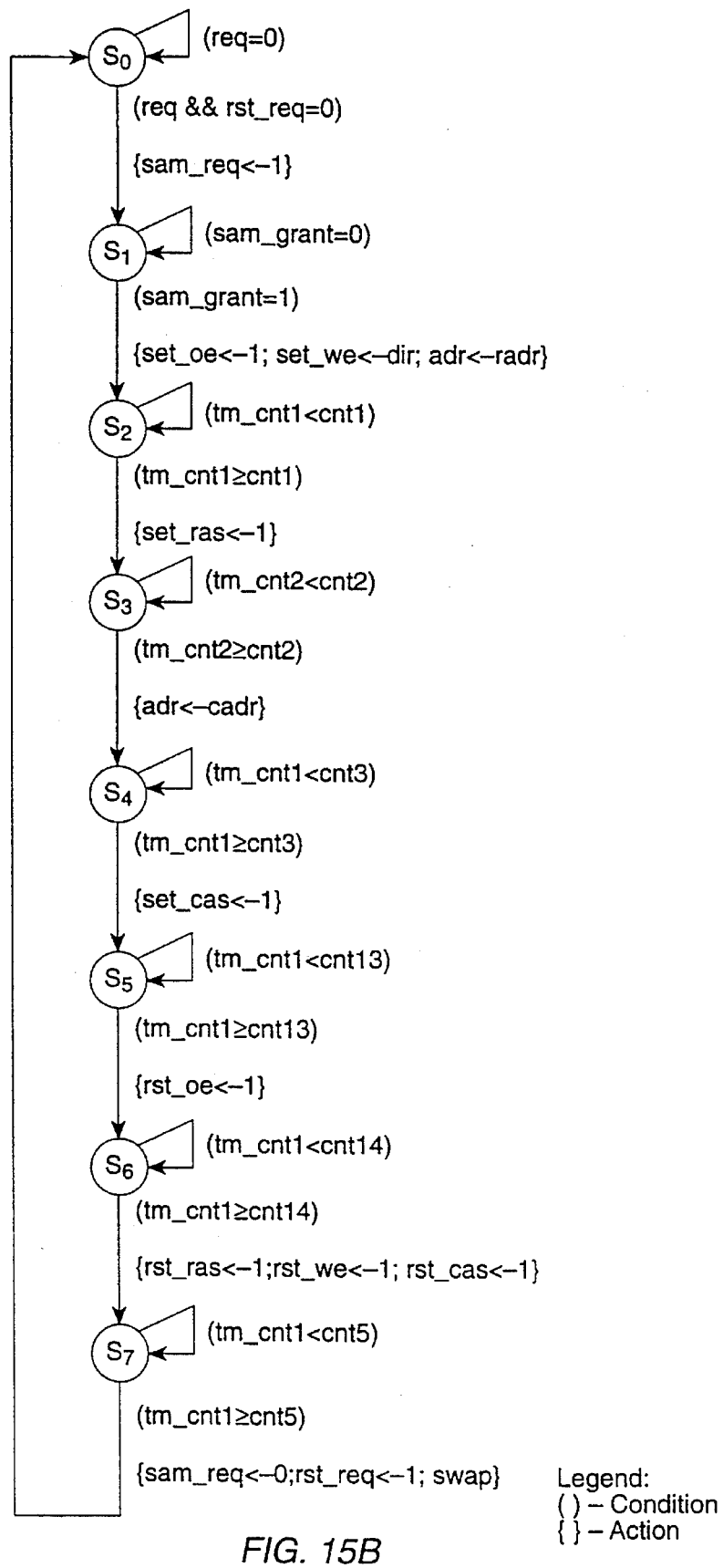
FIG. 15B shows a transition diagram for a serial memory access state machine according to an embodiment of the present invention.

FIG. 15B shows the transition diagram 600 of the SAM bus cycle state machine. After reset, the state remains at 0 until an OP_REQ is received. At that time, a SAM_BUS_REQ is asserted and the state transitions to state 1, where it waits for the video bus access request to be granted by the video bus arbiter. Once granted, the state machine asserts SET_OE and the selected row address register is strobed into the video bus address register ADDR. SET_WE is also asserted if a SAM-to-DRAM transfer is being executed. Both bus timers TM1_CNT and TM2_CNT are started at this time. The state machine then transitions to state 2 on the next clock cycle. At state 2, the state machine times the row-address-to-RAS delay in timing CNT1. When the delay is met, SET_RAS is asserted and the state transitions to state 3. Timer 1 is also reset to start timing the RAS-to-CAS delay. At state 3, the state machine continues to time the row-to-column-address delay in timer CNT2 using counter TM2_CNT. When the delay is met or has been met, the selected column address in CADRx is strobed into ADDR and the state transitions to state 4. The state remains at state 4 until timer 1 reaches or exceeds CNT3. SET_CAS is asserted then and the state transitions to state 5. Timer 1 is reset to be used to time the transfer command to CAS hold time (CNT13). The state remains at 5 until CNT13 is satisfied. At that time, RST_OE is asserted and the state transitions to state 6. Timer 1 is reset to start timing the transfer command to RAS/CAS lead time (CNT14). When the delay is satisfied, RST_RAS, RST_CAS, RST_WE are asserted, and the state transitions to state 7. At state 7, timer 1 is used to time the RAS precharge time (CNT5). When the delay is satisfied, SAM_BUS_REQ2 is de-asserted, RST_OP REQ is asserted, SWAP flip-flop is toggled and the state machine returns to state 0. SWAP is used to select between the first and the second SWAP bank selects. These selects are used to appropriately enable the RAS and CAS set reset signals.

The SAM transfer block outputs the signals listed in Table VI.

Video Bus Arbiter

Video bus arbiter 120 arbitrates requests for video bus access by the various functional at blocks in VIU 100 and an external resource. If VIU 100 is configured as the arbitration master of the bus, video bus arbiter 120 arbitrates requests among video interface state machine 114, the refresh function, the SAM-DRAM transfer function 118, and an external source (XVREQ_IN). Video interface state machine 114 always has top priority and gains access to the video bus immediately as long as the video bus is available. Video interface state machine 114 is not required to make a bus request to arbiter 120. On the other hand, the other functional blocks connected to the video bus must request for bus access and wait for it to be granted by arbiter 120. Bus access is granted to the refresh function, SAM transfer function, or the external unit when video interface state machine 114 is not using the bus.

Arbiter 120 implements a rotating priority scheme for the three sources of bus request. When multiple bus requests are received, the request with the highest priority weight is granted bus access. The priority rotation is shown in FIG. 1.12. Six assignment codes 650 are implemented to prevent one requesting source from gaining exclusive control of the video bus. The request with the highest weight for each assignment code gets the top priority. When the top priority is used up, the priority assignment changes to the next even-numbered assignment code. If no bus request is present for the unit with top priority and the bus is granted to the unit with a priority weight of 1, the priority assignment code toggles between even and odd code. If bus is granted to the unit with lowest priority weight, the priority assignment code is not changed.

If VIU 100 is configured as an arbitration slave on the video bus, video bus arbiter 120 arbitrates bus requests among the video interface state machine (VSM_REQ), the refresh block (RFSH_REQ), and the SAM-DRAM transfer (SAM_REQ). The same rotating priority assignment shown in FIG. 16 is employed. The prioritized bus request competes with the external daisy-chain bus request at XVREQ_IN on a first-come, first-served basis. A bus request is made to the external bus arbiter next on the daisy-chain by asserting XVREQ_OUT. The SERV_EXT flip-flop keeps track of whether an internal VIU or an external bus request from another slave is being made. A high level on this flip-flop indicates that request is being made by asserting XVGRANT_IN, and arbiter 120 passes this grant signal to the XVGRANT OUT. This completes the slave-mode, delay-chain priority scheme implemented for external bus request.

If SERV_EXT is low and a bus grant XVGRANT_IN is received arbiter 120 will then grant the video bus access to one of the sub-units in VIU 100 with the highest priority. When the video cycle is completed, the priority assignment code is updated as needed.

Figure 17:
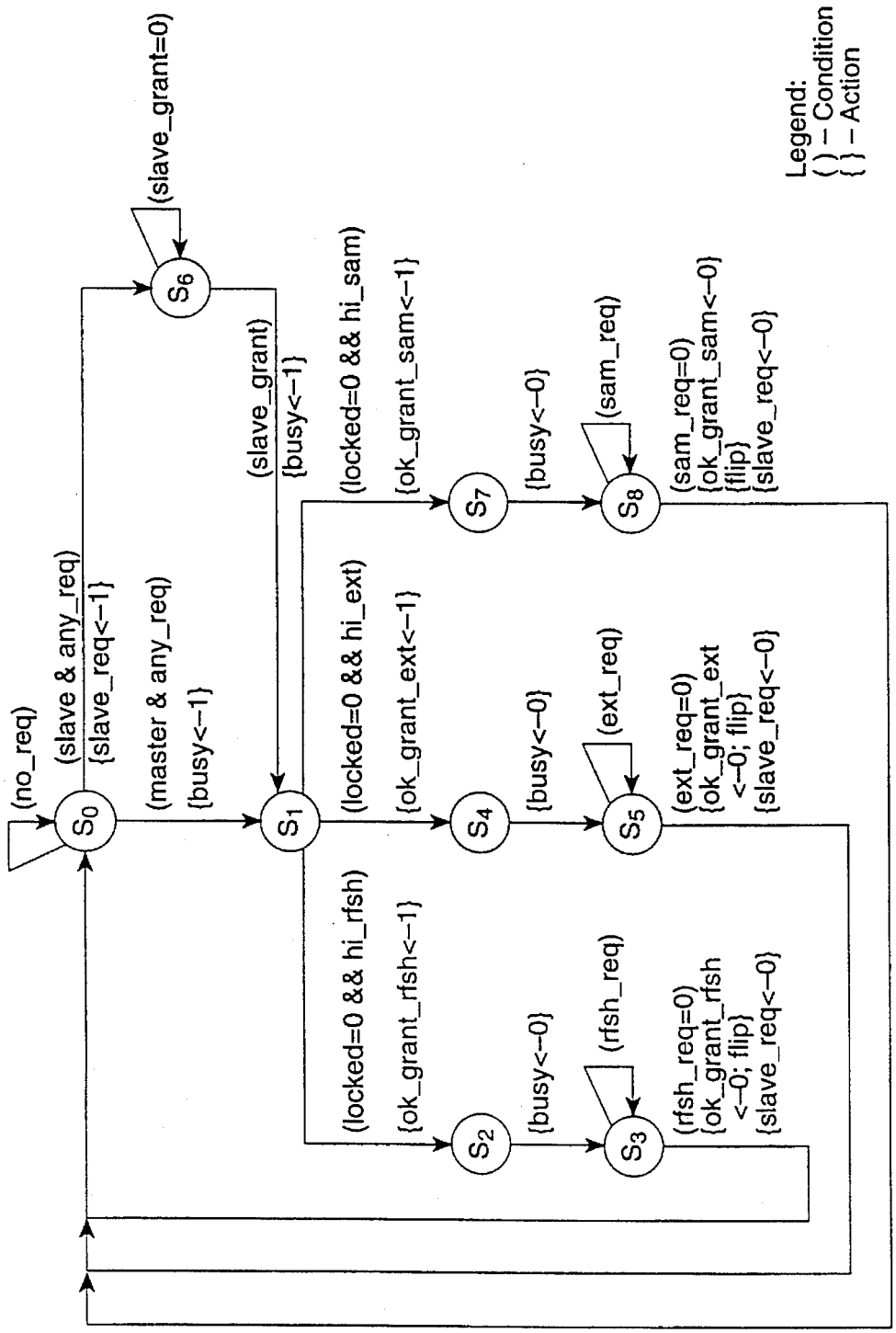
FIG. 17 is a state transition diagram of a video bus arbiter according to an embodiment of the present invention.

FIG. 17 shows the state transition diagram 660 of the video bus arbiter. Table VII lists the signals output by video bus arbiter 120.

Buffer Control

Buffer control 108 is responsible for generating the addresses and control signals for the token RAMs. Buffer control 108 uses the various counts from the other blocks to generate row and column addresses for the token RAM. TKB_RCNT is a row count of the logical image segment for the component being accessed. The logical sub-image width may be 8 or 16 based on the component configuration (CFIG). PEL_CNT is a column count within the logical row that is being accessed. GB_CYC_CNT is a transfer cycle count during data token transfer between the VIU and the controller.

Figure 18:
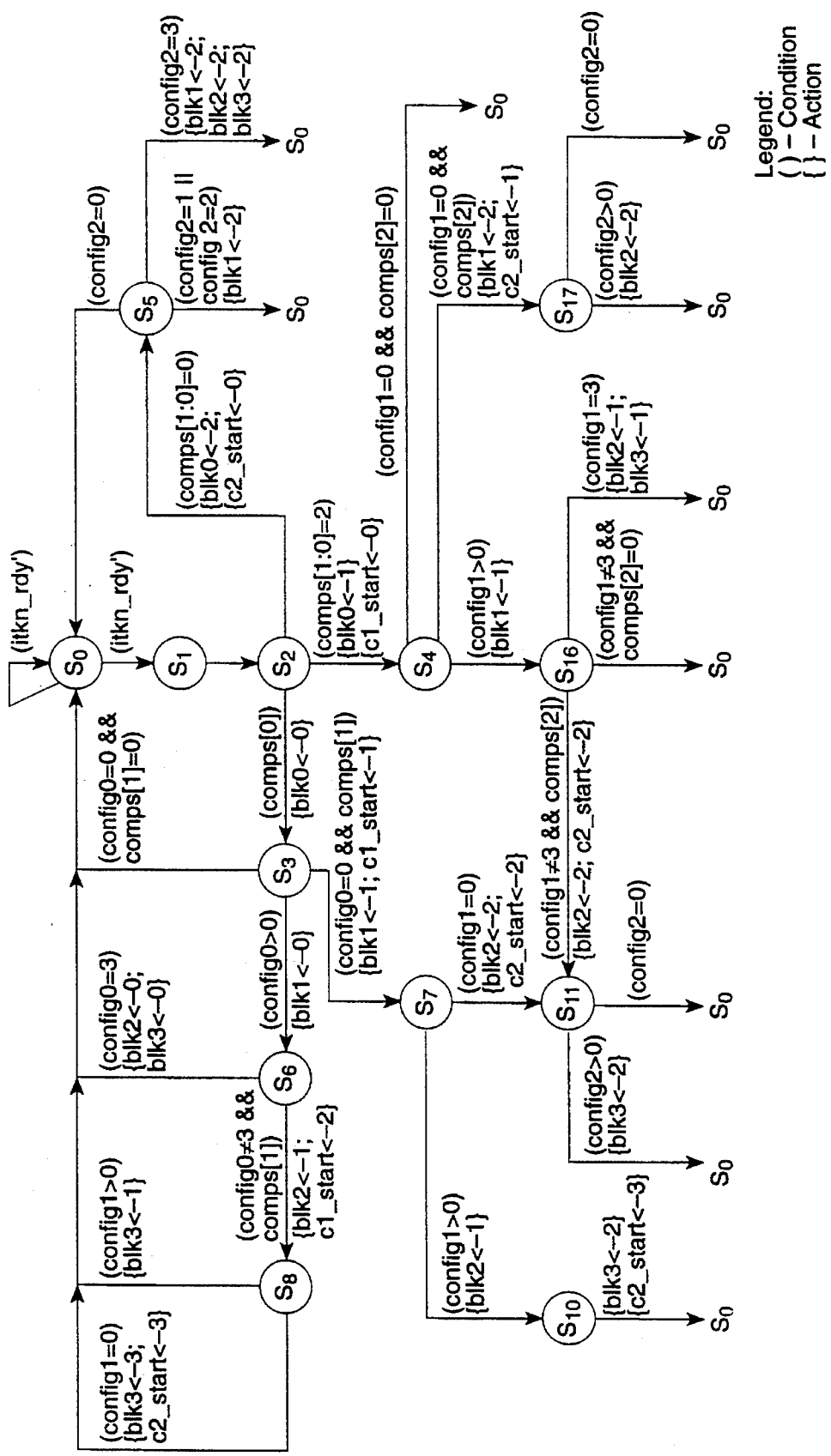
FIG. 18 is a state transition diagram for a buffer control state machine according to an embodiment of the present invention.

Buffer control 108 also includes a state machine which determines the starting block positions for components 1 and 2 in the token. The state machine starts when ITKN_RDY is detected and takes approximately 6 clock cycles to complete the initialization of these 2 values. FIG. 18 shows the transition diagram 700 of this state machine.

During data token transfer between VIU 100 and the controlling device, the token RAMs are operated in the "long mode". GB_CYC_CNT, or its pipeline, is used to generate the token RAM row address. TKN_RAMA is selected on even counts of GB_CYC_CNT or its pipeline. TKN_RAMB is selected on odd counts of GB_CYC_CNT or its pipeline.

During instruction execution, token buffer 102 is operated either in the single-pel mode or the double-pel mode. The double-pel mode (mode 1) is to write the results of y or xy interpolated images to token buffer 102. Pels are alternately written to TKN_RAMA and TKN_RAMB. The single-pel mode (mode 2) is used both to transfer pels to partial buffer 112 and to write x interpolated or un-interpolated images to token buffer 102. TKB_RCNT and PEL_CNT, or its pipeline, are used to form the ROW_INDX to an 8×8 block. This ROW_INDX is then added to the starting block position of the component being processed to form the row address (ROW_ADDR) for each token RAM. The column addresses (TKN_RAM_LCOL and TKN_RAM_RCOL) are generated from PEL_CNT or its pipeline.

Buffer control unit 108 outputs the signals listed in Table VIII.

Video Interface Register Unit

Video interface resister 122 contains the registers that drive the RAS_, CAS_, WE_, VOE_ lines of the video bus. The various set and reset signals from video interface state machine 114, refresh unit 116, and SAM transfer unit 118 are combined before registers. The selection of the signals are based on which VIU sub-unit has control of the video bus. The registers are strobed every VCLK.

Video interface resister 122 outputs the signals given in Table IX.

Host Interface

Host interface 128 includes the logic to handle communications with the host interface unit in, for, example, the video compression coprocessors or host processor 38 of FIG. 1. The host interface 128 also contains various user-programmable configuration registers defining the video memory system connected to VIU 100. Table XII shows the memory map of the registers in host interface 128. Host interface 128 outputs the signals listed in Table X.

Instruction Processing

Instruction processing is started when an input token is received. For write instructions, a data token is received. For read-type instruction, either type of token received is processed. When a valid token is received by the global bus state machine, it pulses ITKN_RDY to initiate the instruction execution. The VIU busy status is set as soon as the controller-initiated transaction is started.

ITKN_RDY causes the state machine in buffer control 108 to sequence and initialize the starting block positions for components 1 and 2 in token buffer 102. ITKN_RDY also starts the sequencing of the processing state machine.

If the refresh function is enabled on VIU 100, as well as if any SAM-DRAM operation is requested, these functions are executed in parallel with the instruction processing. These cycles are normally interleaved as needed with the page-mode cycles of instruction execution.

Write Instruction Execution

A data token resides in token buffer 102 for write instruction. At the start of the instruction execution, processing state machine 106 determines the number and type of components represented in the data token. The dimension of the logical sub-image is determined with the configuration of each component. The logical column size may be, for example, 8 or 16.

The video memory row address is computed based on VORGSEL from the instruction, VPOS from the token descriptor, the selected component offset origin, and the logical image dimension. The starting column address is computed based on HORGSEL, HPOS, the selected component offset origin, and the logical image dimension. These values are passed to video interface state machine 114. Two logical rows of pels are transferred from token buffer 102 to partial buffer 112 processing state machine 106 to take the rows of pels from the partial buffer and write them to the video memory using a page-mode write cycle. The starting column address from processing state machine 106 is incremented by video interface state machine 114 for each CAS cycle.

While video interface state machine is active, a second pair of logical rows of pels is being transferred from the token buffer 102 to partial buffer 112. At the completion of both the video memory write cycle and the token buffer 102 to partial buffer 112 transfer, the number of rows written to the video memory is checked against the maximum number (based on logical image dimension). If not all rows for the component have been written to the video memory, the video memory row address is incremented and the next rows of pels are taken out of the partial buffer and written to the video memory. More logical rows of pels are transferred from the token buffer to the partial buffer in parallel. This process is repeated until all the rows for the component have been written to the video memory.

After all pels in the component are written to the video memory, the component count is checked to see if all components contained in token buffer 102 have been written to the video memory. If not all components have been written yet, the next component is selected. The dimension of the logical image segment is determined, and the row address and starting column address of the video memory for the new component are computed. Two logical rows of pels are copied from token buffer 102 to partial buffer 112. After which, the page-mode write cycle to the selected video memory is started. The execution flow proceeds as in previous component.

If all components have been processed, OTKN_RDY is pulsed high. For WRV16 and WRV32, an active OTKN_RDY causes the BUSY status signal to become reset. For WRV16_S and WRV32_S, an active OTKN_RDY causes a control token to be returned to the controller. The busy status is reset after the global bus transfer. VIU 100 is now ready to accept another token.

Read-Type Instruction

Any token received is valid for a read-type instruction. The instruction is executed regardless of the token type received. That is, the error checking is inhibited for read-type instructions. At the start of the instruction execution, processing state machine 106 determines the number and type of components to be read from the video memory. The dimension of the logical sub-image is determined from the configuration of each component.

The calculation of the video memory row and column addresses is dependent on the type of instruction being executed. For RDV16 and RDV32 instructions, the row and column addresses are computed as for write instruction. For RD16FMV, RD32FMV, RD16BMV, and RD32BMV, the row and column address computations described for write instruction are used as base addresses. The "effective" motion vector is added to the base addresses to form the video memory row and column addresses. For RD16FMV and RD32FMV, the motion vector contained in HEADER[42:22] is selected. For RD16BMV and RD32BMV, the motion vector contained in HEADER[21:0] is selected. This motion vector is modified to form the "effective" motion vector based on the following: whether the motion vector resolution is full-pel or half-pel, the configuration of the current component compared against the configuration of component 0.

After the video memory row address and starting column address are computed, video interface state machine 114 is initiated to fetch a pair of logical rows of pels from the video memory. If the sub-image starts on an odd row address, the first row of pels are discarded and only the second row is stored in the partial buffer. If the sub-image starts on an even row address, both rows of pels are stored in the partial buffer. The appropriate counters are updated and the video memory row address is incremented to start fetching the next rows of pels. Video interface state machine 114 is instructed to fetch another pair of rows from the video memory. Once two rows of pels are stored in partial buffer 112, two rows of pels are read out of partial buffer 112 and passed to interpolator 110. Interpolator 110 either passes the pels unchanged when interpolation is not called for, or performs the required interpolation. Data are available to be written to token buffer 102 after the latency through interpolator 110.

In parallel with the writing of the token RAMs, the next rows of pels are being fetched from the video memory. When both are complete, the number of rows read from the video memory is checked against the logical row size. If not all rows have been fetched, more rows of pels are read from the video memory and previous rows of interpolated pels are written into token buffer 102. When all the rows have been fetched, the last 2 rows of pels in the partial buffer are passed through the interpolator and written to the token buffer 102. At the end of this transfer, the number of components read is check against the number of components required in the token. If not all components have been read, the next component is selected. The dimension of the logical image segment for the component is determined. The video memory row and column addresses are computed for the new component. Rows of pels are read from the video memory and written into the token RAM via interpolator 110, as in the previous component.

If all components have been processed, OTKN_RDY is pulsed. This causes global bus state machine 104 to request for access to the global bus. When the request is granted, global bus state machine 104 proceeds to send the data token to the controller. The BUSY status is reset after the data token transfer is completed.

A preferred embodiment of the present invention has been described. Various modifications will be readily apparent to those of skill in the art. For this reason, the invention should be interpreted in light of the claims.

TABLE I

| Global State Machine Signals | |
| --- | --- |
| ITKN_RDY: | Valid input token received |
| GB_WXFR_IP | Input data token write in progress |
| GB_RD_TKNFAM_XFR: | Read transfer from token RAM in progress |
| GB_INPUT: | Not an output sequence to the controller device |
| LONG_MD: | Transfer with controller started; Used as mode control for the token |

TABLE I-continued

Global State Machine Signals

| | |
|---|---|
| GB_CYC_CNT: | RAM Data token transfer cycle count |
| P1_GB_CYC_CNT: | Pipelined GB_CYC_CNT |
| INSTR | N-bit instruction register output |
| TKNBUF_DATA | N-bit, bi-directional data box to-from its token RAM |
| BUSY: | VIU busy with token processing |

TABLE II

Partial Buffer Signals

| | |
|---|---|
| WD0[7:0] | Write video data for Video Bank 0 |
| WD1[7:0] | Write video data for Video Bank 1 |
| WD2[7:0] | Write video data for Video Bank 2 |
| WD3[7:0] | Write video data for Video Bank 3 |
| PB_DOUT_TOP[15:0] | 2-pel interpolator output for even Token RAM |
| PB_DOUT_BOT[15:01] | 2-pel interpolator output for odd Token RAM |

TABLE III

Processing State Machine Output Signals

| | |
|---|---|
| PHASE: | Even odd clock phase generator for the interpolator |
| OTKN_RDY: | Instruction execution completed |
| VM_START: | Row access command to video interface state machine |
| COMP_SEL: | Component number being processed |
| VM_START_ROW: | Video memory row address |
| VM_START_COL: | Starting column address of video memory |
| WRITE_VM: | Write to video memory |
| SKIP: | Full-pel motion resolution; Flow through interpolator |
| XHALF: | X axis interpolation |
| YHALF: | Y axis interpolation |
| CFIG: | Configuration of current component |
| NCOLS: | Number of pels per row to be accessed from video memory |
| TKB_RCNT: | Number of logical rows accessed from token buffer |
| TKB_ACCESS: | Transfer of pels between token buffer and partial buffer in progress |
| TKB_WR: | Partial buffer to token buffer transfer direction |
| PEL_CNT: | Column number in row being accessed from token buffer |
| P1_PEL_CNT: | Pipelined PEL_CNT |
| P2_PEL_CNT: | Pipelined PEL_CNT |
| P4_PEL_CNT: | Pipelined PEL_CNT |
| NEW_COMP: | New component being starting |
| TKB_START: | Start trabsfer between token buffer and partial buffer |
| PRE_TKB_DOUT_VLD: | Pel data from token buffer valid |
| YORG: | Even/odd start row address of sub-image |
| SPLIT_TKB: | Even and odd Token RAMs accessed simultaneously |
| QUAD_BUS: | 4-pel video bus instruction-type |
| SEL_PCLK: | Processing clock select signal for partial buffer |
| VLINE_SWAP: | Line-swap invoked for video access operation |
| VBUS_SEL: | Bus-select mode for component being processed |
| X_ONLY_INTP: | X interpolate required after video data fetch |

TABLE III-continued

Processing State Machine Output Signals

| | |
|---|---|
| TKB_DONE: | Token buffer-Partial buffer transfer complete |
| INTLV: | Interleave configuration for selected component |

TABLE IV

Video Interface State Machine Signals

| | |
|---|---|
| F_VM_ACCS_START: | Registered VM_ACCS_START to VCLK |
| BUS_REQ: | Page-mode access video bus request |
| RDPEL0: | Registered pel data read from video data bank 0 |
| RDPEL1: | Registered pel data read from video data bank 1 |
| RDPEL2: | Registered pel data read from video data bank 2 |
| RDPEL3: | Registered pel data read from video data bank 3 |
| VM_ACCS_DONE: | Page-mode access cycle completed |
| VM_DIN_VLD: | Registered pel data from video memory valid |
| VM_LOCKED: | Video bus locked for page-mode access |
| PRE_COL_CNT: | Pel count in the page-mode access |
| COL_CNT: | Pipelined column counter |
| P1_COL_CNT: | 2nd Piped column counter |
| SET_RAS[3:0]: | Set signals for the 4 RAS registers in VMUX_REG sub-unit |
| RST_RAS[3:0]: | Reset signals for the 4 RAS registers in VMUX_REG sub-unit |
| SET_CAS[3:0]: | Set signals for the 4 CAS registers in VMUX_REG sub-unit |
| RST_CAS[3:0]: | Reset signals for the 4 CAS registers in VMUX_REG sub-unit |
| XMSEL: | Memory select for video memory for page-mode access |
| XVM_ADDR: | Address for video memory during page-mode access |
| SET_WE: | Set signal for the VWE register in VMUX_REG sub-unit |
| RST_WE: | Reset signal for the VWE register in VMUX_REG sub-unit |
| SET_OE: | Set signal for the VOE register in VMUX_REG sub-unit |
| RST_OE: | Reset signal for the VOE register in VMUX_REG sub-unit |
| V_SWRST: | S/W reset re-synchronized to VCLK |
| VD01_OE: | Enable signal for video bus banks 0, 1 tri-state drivers |
| VD23_OE: | Enable signal for video bus banks 2, 3 tri-state drivers |

TABLE V

Refresh Unit Signals

| | |
|---|---|
| SET_RAS: | Set signal for all the RAS registers in VMUX_REG |
| RST_RAS: | Reset signal for all the RAS registers in VMUX_REG |
| SET_CAS: | Set signal for all the CAS registers in VMUX_REG |
| RST_CAS: | Reset signal for all the CAS registers in VMUX_REG |
| XMEMSEL: | Tri-state video memory select |
| SET_WE: | Set signal for the VWE register in VMUX_REG |
| RST_WE: | Reset signal for the VWE register in VMUX_REG |

TABLE VI

Sam Transfer Signals

| | |
|---|---|
| ACK_HSAM_REQ: | Acknowledge receipt of host SAM request |
| SAM_BUS_REG: | Request for video bus for SAM transfer |
| SAM_SET_RAS[3:0]: | Set signals for RAS registers |
| SAM_RST_RAS[3:0]: | Reset signals for RAS registers |
| SAM_SET_CAS[3:0]: | Set signals for CAS registers |
| SAM_RST_CAS[3:0]: | Reset signals for CAS registers |
| SAM_SET_WE: | Set signal for VWE register |
| SAM_RST_WE: | Reset signal for VWE register |
| SAM_SET_OE: | Set signal for VOE register |
| SAM_RST_OE: | Reset signal for VOE register |
| VADDR: | 11-bit video bus address |
| VMSEL: | 3-bit video bus memory select |

TABLE VII

Bus Arbiter Signals

| | |
|---|---|
| SAM_GRANT: | Bus grant to SAM-DRAM transfer block |
| VRAM_BUSY: | Video bus unavailable for page-mode access |
| RFSH_GRANT: | Bus grant to refresh block |
| VSM_GRANT: | Bus grant to video interface state machine |
| XVREQ_OUT: | VIU request for bus access |
| XVGRANT_OUT: | VIU bus grant to external slave |

TABLE VIII

Buffer Control Signals

| | |
|---|---|
| TKN_RAM_ADDR: | Row address for both token RAMs |
| TKN_RAM_MO: | Bus mode for both token RAMs |
| TKN_RAM_CS: | Select signal for both token RAMs |
| TKN_RAMA_CE: | Output enable for Token RAM#A |
| TKN_RAMB_CE: | Output enable for Token RAM#B |
| TKN_RAMA_WE: | Write enable for Token RAM#A |
| TKN_RAMB_WE: | Write enable for Token RAM#B |
| TKN_RAM_RCOL: | Right column address for both token RAMs |
| TKN_RAM_LCOL: | Left column address for both token RAMs |

TABLE IX

Video Interface Register Signals

| | |
|---|---|
| RAS_[3:0]: | RAS' for the 4 video banks |
| CAS_[3:0]: | CAS' for the 4 video banks |
| VWE_: | VWE' of the video bus |
| VOE_: | VOE' of the video bus |
| VBUS_OE_: | Enable for the video controls drivers |

TABLE X

Host Interface Signals

| | |
|---|---|
| SWRST: | Software reset latched on CLK |
| RSTALL: | Combined Hardware/software reset |
| HDATA: | Bi-directional, 16-bit host data bus |
| MASTER: | VIU configured as either master or slave on video bus |
| CNT1: | Row address to RAS delay (tASR) |
| CNT2: | Row address to first column address delay (tASR + tRAH) |
| CNT3: | RAS to CAS delay (tRCD) |
| CNT4: | CAS cycle (tCP + tCAS) |
| CNT5: | RAS pre-charge (tRP) |
| CNT6: | RAS to WE active delay (tRCD − tWCS) |
| CNT7: | ACNT3 − 1 |
| CNT8: | CAS pulse width (tCAS) |
| CNT9: | RAS hold time (tRSH) |
| CNT10: | CAS set-up time (tCSR) |
| CNT11: | CAS hold time (tCHR) |
| CNT12: | RAS pulse width for refresh (tRAS) |
| CNT13: | Transfer command to CAS hold time (tCTH) |
| CNT14: | Transfer command to RAS hold time (tTRL) |
| RFSH_CNT: | Refresh period |
| RFSH_EN: | Reresh enable |
| RFSH_REQ_HOST: | Host-initiated refresh cycle request |
| C0_X1: | Component 0 x-coordinate offset register 1 |
| C0_X1: | Component 0 y-coordinate offset register 1 |
| C0_X2: | Component 0 x-coordinate offset register 2 |
| C0_X2: | Component 0 y-coordinate offset register 2 |
| C0_X3: | Component 0 x-coordinate offset register 3 |
| C0_X3: | Component 0 y-coordinate offset register 3 |
| C1_X1: | Component 1 x-coordinate offset register 1 |
| C1_X1: | Component 1 y-coordinate offset register 1 |
| C1_X2: | Component 1 x-coordinate offset register 2 |
| C1_X2: | Component 1 y-coordinate offset register 2 |
| C1_X3: | Component 1 x-coordinate offset register 3 |
| C1_X3: | Component 1 y-coordinate offset register 3 |
| C2_X1: | Component 2 x-coordinate offset register 1 |
| C2_X1: | Component 2 y-coordinate offset register 1 |
| C2_X2: | Component 2 x-coordinate offset register 2 |
| C2_X2: | Component 2 y-coordinate offset register 2 |
| C2_X3: | Component 2 x-coordinate offset register 3 |
| C2_X3: | Component 2 y-coordinate offset register 3 |
| C0_LSWAP: | Component 0 line-swap control |
| C1_LSWAP: | Component 1 line-swap control |
| C2_LSWAP: | Component 2 line-swap control |
| C0_BUSSEL: | Component 0 Dual-bus mode bus select |
| C1_BUSSEL: | Component 1 Dual-bus mode bus selct |
| C2_BUSSEL: | Component 2 Dual-bus mode bus selct |
| C0_INTLV: | Component 0 interleave |
| C1_INTLV: | Component 1 interleave |
| C2_INTLV: | Component 2 interleave |
| HSAMD: | Host-initialized SAM operation |
| HSAM_REQ: | Host-initiated SAM operation valid |
| SAM_CTR0_RADR: | Counter 0 raw address |
| SAM_CTR1_RADR: | Counter 1 raw address |
| SAM_CTR2_RADR: | Counter 2 raw address |
| SAM_CTR3_RADR: | Counter 3 raw address |
| SAM_CTR0_CADR: | Counter 0 column address |
| SAM_CTR1_CADR: | Counter 1 column address |
| SAM_CTR2_CADR: | Counter 2 column address |
| SAM_CTR3_CADR: | Counter 3 column address |
| SAM_CTR0_SWAP1SEL: | Counter 0 first bank swap select |
| SAM_CTR1_SWAP1SEL: | Counter 1 first bank swap select |
| SAM_CTR2_SWAP1SEL: | Counter 2 first bank swap select |
| SAM_CTR3_SWAP1SEL: | Counter 3 first bank swap select |
| SAM_CTR0_SWAP2SEL: | Counter 0 first bank swap select |
| SAM_CTR1_SWAP2SEL: | Counter 1 first bank swap select |
| SAM_CTR2_SWAP2SEL: | Counter 2 first bank swap select |

TABLE X-continued

Host Interface Signals

| | |
|---|---|
| SAM_CTR3_SWAP2SEL: | Counter 3 first bank swap select |
| SAM_CTR0_MSEL: | Counter 0 memory select |
| SAM_CTR1_MSEL: | Counter 1 memory select |
| SAM_CTR2_MSEL: | Counter 2 memory select |
| SAM_CTR3_MSEL: | Counter 3 memory select |

TABLE XI

VIU Input and Output Signals

| Signal Name | Direction | Description |
|---|---|---|
| CLK | Input | Processing clock at 50 MHz |
| HWRST | Input | Hardware reset |
| GRESET | Input | Software reset |
| GB_DATA[95:0] | I/O | Global bus data |
| GB_DATA_RDY_ | I/O | Global bus data ready control |
| GB_REQ | Output | VIU request for global bus access |
| GB_GRANT | Input | Global bus request granted |
| GB_PAC_LD | Input | Global bus send instruction |
| GB_PAC_READY | I/O | Global bus instruction global bus data |
| BUSY | Output | VIU busy status flag |
| HCLK | Input | Host bus clock |
| HCS_ | Input | Host Processor chip-select |
| US_ | Input | VIU select by HIU |
| HWR_ | Input | Host interface write cycle |
| HOE_ | Input | Host interface output enable |
| HADDR[7:0] | Input | Host address bus |
| HDATA[15:0] | I/O | Bi-directional host data bus |
| VCLK | Input | Video bus clock |
| VREQ_IN | Input | External video bus request |
| VGRANT_IN | Input | External video bus grant input |
| VREQ_OUT | Output | VIU slave bus request output |
| VGRANT_OUT | Output | VIU bus grant output |
| RAS_[3:0] | Output | Page-mode cycle RAS' |
| CAS_[3:0] | Output | Page-mode cycle CAS' |
| CRET[3:0] | Input | CAS return signals |
| VMSEL[2:0] | Output | Page-mode cycle memory select |
| VADDR[10:0] | Output | Page-mode cycle address bus |
| VWE_ | Output | Page-mode cycle write enable |
| VOE_ | Output | Page-mode cycle output enable |
| XVD0[7:0] | Output | Output video data bus bank 0 |
| XVD1[7:0] | Output | Output video data bus bank 1 |
| XVD2[7:0] | Output | Output video data bus bank 2 |
| XVD3[7:0] | Output | Output video data bus bank 3 |
| VPELIN_0[7:0] | Input | Input video data bus bank 0 |
| VPELIN_1[7:0] | Input | Input video data bus bank 1 |
| VPELIN_2[7:0] | Input | Input video data bus bank 2 |
| VPELIN_3[7:0] | Input | Input video data bus bank 3 |
| VDIS | Input | VIU video bus disable input |
| VSAMD[3:0] | Input | External SAM operation code |
| VSAMRQ | Input | External SAM operation request |
| VD01_OE_ | Output | Enable for VD0, VD1 bus drivers |
| VD23_OE_ | Output | Enable for VD2, VD3 bus drivers |
| VBUS_OE_ | Output | Enable for VRAS_, VCAS_,etc. drivers |

TABLE XII

Host Memory Map

| HOST Relative Address | Register Name | HOST Data Bus | Read Write Capability |
|---|---|---|---|
| 0 | RFSH_CNT | 15:0 | R/W |
| 1 | CNT1 | 4:0 | R/W |
| | CNT2 | 12:8 | R/W |
| 2 | CNT3 | 4:0 | R/W |
| | CNT4 | 12:8 | R/W |
| 3 | CNT5 | 4:0 | R/W |
| | CNT6 | 12:8 | R/W |
| 4 | CNT7 | 4:0 | R/W |
| | CNT8 | 12:8 | R/W |
| 5 | CNT9 | 4:0 | R/W |
| | CNT10 | 12:8 | R/W |
| 6 | CNT11 | 4:0 | R/W |
| | CNT12 | 12:8 | R/W |
| 7 | CNT13 | 4:0 | R/W |
| | CNT14 | 12:8 | R/W |
| 8 | C0_X1 | 10:0 | R/W |
| 9 | C0_Y1 | 10:0 | R/W |
| A | C0_X2 | 10:0 | R/W |
| B | C0_Y2 | 10:0 | R/W |
| C | C0_X3 | 10:0 | R/W |
| D | C0_Y3 | 10:0 | R/W |
| E | C1_X1 | 10:0 | R/W |
| F | C1_Y1 | 10:0 | R/W |
| 10 | C1_X2 | 10:0 | R/W |
| 11 | C1_Y2 | 10:0 | R/W |
| 12 | C1_X3 | 10:0 | R/W |
| 13 | C1_Y3 | 10:0 | R/W |
| 14 | C2_X1 | 10:0 | R/W |
| 15 | C2_Y1 | 10:0 | R/W |
| 16 | C2_X2 | 10:0 | R/W |
| 17 | C2_Y2 | 10:0 | R/W |
| 18 | C2_X3 | 10:0 | R/W |
| 19 | C2_Y3 | 10:0 | R/W |
| 1A | C0_LSWAP | 3:0 | R/W |
| | C0_BUSSEL | 7:4 | R/W |
| | C0_INTLV | 8 | R/W |
| 1B | C1_LSWAP | 3:0 | R/W |
| | C1_BUSSEL | 7:4 | R/W |
| | C1_INTLV | 8 | R/W |
| 1C | C2_LSWAP | 3:0 | R/W |
| | C2_BUSSEL | 7:4 | R/W |
| | C2_INTLV | 8 | R/W |
| 1D | SAM_CTR0_RADR | 10:0 | R/W |
| 1E | SAM_CTR1_RADR | 10:0 | R/W |
| 1F | SAM_CTR2_RADR | 10:0 | R/W |
| 20 | SAM_CTR3_RADR | 10:0 | R/W |
| 21 | SAM_CTR0_CADR | 10:0 | R/W |
| 22 | SAM_CTR1_CADR | 10:0 | R/W |
| 23 | SAM_CTR2_CADR | 10:0 | R/W |
| 24 | SAM_CTR3_CADR | 10:0 | R/W |
| 25 | SAM_CTR0_SWAP1SEL | 3:0 | R/W |
| | SAM_CTR0_SWAP2SEL | 7:4 | R/W |
| | SAM_CTR0_MSEL | 10:8 | R/W |
| 26 | SAM_CTR1_SWAP1SEL | 3:0 | R/W |
| | SAM_CTR1_SWAP2SEL | 7:4 | R/W |
| | SAM_CTR1_MSEL | 10:8 | R/W |
| 27 | SAM_CTR2_SWAP1SEL | 3:0 | R/W |
| | SAM_CTR2_SWAP2SEL | 7:4 | R/W |
| | SAM_CTR2_MSEL | 10:8 | R/W |
| 28 | SAM_CTR3_SWAP1SEL | 3:0 | R/W |
| | SAM_CTR3_SWAP2SEL | 7:4 | R/W |
| | SAM_CTR3_MSEL | 10:8 | R/W |
| 29 | BSAM_REQ | 4 | R/W |
| | BSAMD | 3:0 | R/W |
| 2A | RFSH_EN | 1 | R/W |
| | MASTER | 0 | R/W |

TABLE XIII

```
integer xvect, yvect, fullpel, vratio, hratio, xhalf, yhalf
integer firstrow, firstcol, numrows, numcols
if (RDVxFMX instruction) { /* get forward motion vector from descriptor */
    xvect = sfield (43:33); /* xvect is an 11 bit 2's complement integer */
    yvect = sfield (32:22); /* yvect is an 11 bit 2's complement integer */
    fullpel = FULLBMV;}
else if (RDVxBMV instruction) = /* get backward motion vector */
    xvect = sfield (21:11); /* xvect is an 11 bit 2's complement integer */
    yvect = sfield (10:0); /* yvect is an 11 bit 2's complement integer */
    fullpel = FULLBMV;}
else {/* no motion vector */
    xvect = 0;
    yvect = 0;
    fullpel = 1;}
/* scale motion vector if required for component "k" */
    vratio = (CONFIG0(1) + 1)/(CONFIGk(1) + 1);
    hratio = (CONFIG0(0) + 1)/(CONFIG1(0) + 1);
    if (vratio == 2)yvect=yvect/2; /*truncation towards zero; i.e. (–1)/2=0|
    if (hratio == 2)xvectp32 xvect/2; /*truncation towards zero; i.e. (–1)/2=0|
if (fullpel ==0) =/* motion vectors have half-pel resolution */
    xhalf = vect & 1; /* xhalf is the least significant bit of xvect */
    xvect = xvect >>1; /* one bit end-off right shift with sign extension */
    yhalf = yvect & 1; /* yhalf is the least significant bit of yvect */
yvect = yvect >'1;} /* one bit end-off right shift with sign extension */
else { /* motion vectors have full-pel resolution */
        xhalf = 0
        yhalf = 0;}
/* compute logical row 0 and logical column 0 for component "k" */
        firstrow = vpos * 8 * (CONFIGk(1)+1) + yvect;
        firstcol = hpos * 8 * (CONFIGk(0)+1) + xvect;
/* compute number of rows and columns in logical pel block */
        numrows = 8 * (CONFIGk(1)+1) + yhalf;
        numcols = 8 * (CONFIGk(0)+1) + xhalf;
}
```

What is claimed is:

1. In a video processing system having a video memory for storing video data having P rows and Q columns, a method for reading and writing image data to the video memory comprising the steps of:

logically subdividing the video data of P rows and Q columns into a plurality of tiles having dimensions of p rows and q columns of image data; and mapping a given one of said tiles to a storage memory by placing the image data located on an even numbered row of said p rows and an even numbered column of said q columns on a first data bus and placing the image data located at an odd numbered row of said p rows and at an odd numbered columns of said q columns onto a second data bus.

2. The method of claim 1 further comprising the steps of:

storing the image data placed on said first data bus in a first buffer; and storing the image data placed on said second data bus in a second buffer.

3. The method of claim 2 further comprising the steps of:

interpolating between a first set of image data stored in said first and said second buffers and a second set of image data stored in said first and said second buffers;

realigning, prior to said step of interpolating, said first and said second sets of sata to reconstitute the image data as a first array and a second array of image data respectively; and wherein said first and said second arrays have alternating odd and even rows of image data.

4. The method of claim 1 where said first and said second data bus together form a video data bus and further comprising the step of configuring the video data bus to be one of 32 or 16 bits wide.

5. The method of claim 4 wherein said video data bus is configured as a 32 bit data bus and wherein:

the step of logically subdividing the video data into the plurality of tiles comprises the step of forming tiles having dimensions p=2 and q=2.

6. The method of claim 4 wherein said video data bus is configured as a 16 bit data bus and wherein:

the step of logically subdividing the video data into the plurality of tiles comprises the step of forming tiles having dimensions p=2 and q=1.

7. The method of claim 1 wherein the step of mapping further comprises the step of addressing the given tile by a single row and a single column coordinate.

8. The method of claim 1 wherein the step of mapping further comprises writing individual ones of the image data in any one of a plurality of memory devices according to a value stored in a register.

9. The method of claim 1 wherein the step of mapping onto a first and a second data bus further comprises the step of operating said first and said second data bus on a first video clock asynchronous with a system clock.

10. The method of claim 1 further comprising the step of interpolating between a first set and a second set of image data.

11. The method of claim 1 further comprising the step of refreshing the video memory.

12. In a video processing system having a video memory for storing image data having P rows and Q columns, a device for reading and writing data to the video memory comprising:

means, coupled to a video bus, for mapping a physical image date having P rows and Q columns logically subdivided into a plurality of tiles having dimensions of p rows and q columns, to a storage memory, by placing the image data located on an even numbered row of said p rows and an even numbered column of said q columns in a first buffer memory; and means, coupled to said video bus, for mapping said given one of said tiles to said storage memory by placing the image data located at an odd numbered row of said p rows and at an odd numbered column of said q columns into a second buffer memory.

13. The device of claim 12 wherein said video bus comprises a 32 bit video bus and p=2 and q=2.

14. The device of claim 12 wherein said video bus comprises a 16 bit video bus and p=2 and q=1.

15. The device of claim 12 further comprising a means, coupled to the video memory, for refreshing the video memory.

16. The device of claim 12 further comprising a video bus arbiter for arbitrating access to the video bus.

17. The device of claim 12 further comprising a means for interpolating between a first set of image data stored in said first and second buffers.

18. The device of claim 12 further comprising a circular buffer coupled to said first buffer and said second buffer for storing a first set of data from said first buffer together with a second set of data from said second buffer as an array of image data having alternating odd and even rows.

19. The device of claim 12, wherein the video memory includes a serial access video memory and a DRAM, the device further comprising:

a means, coupled to said video bus, for controlling transfers between the serial access video memory and the DRAM.

20. The device of claim 12, wherein the video memory includes a serial access video memory and a DRAM, the device further comprising:

means, coupled to the video bus, for controlling transfers between the serial access video memory and the DRAM.

21. The device of claim 12 wherein said device operates on a video clock asynchronous from a system clock.

22. The device according to claim 12 further comprising:

a latch having an input coupled to an output of the video memory and an output coupled to said storage memory; and a latching signal pin on the device coupled to a CAS signal, wherein the CAS signal is output from a CAS pin of the device to the video memory and wherein the latching signal pin forms a latching signal input to said latch.

23. In a video processing system having a video memory for storing image data having P rows and Q columns, a device for reading and writing data to the video memory comprising:

means, coupled to a video bus, for mapping a physical image data having P rows and Q columns logically subdivided into a plurality of tiles having dimensions of p rows and q columns, to a storage memory, a given one of said tiles, by placing the image data located on an even numbered row of said p rows and an even numbered column of said q columns in a first buffer memory and for mapping said given one of said tiles to said storage memory by placing the image data located at an odd numbered row of said p rows and at an odd numbered columns of said q columns into a second buffer memory;

a circular buffer, coupled to said first and to said second buffer memory for storing a first set of data from said first buffer together with a second set of data from said second buffer as an array of image data having alternating odd and even rows;

an interpolator, coupled to said circular buffer for interpolating the array of image data;

an arbiter, coupled to the video bus, for controlling access to the video bus; and a state machine, coupled to the means for mapping, to said interpolator and to said arbiter for sequencing operation of said means for mapping, said interpolator, and said arbiter.

24. The device of claim 23 further comprising a refresh controller, coupled to the arbiter for refreshing the video memory.

25. A latch device for a DRAM memory interface comprising:

a latching signal pin on the DRAM memory interface coupled to a CAS signal output from the DRAM memory interface CAS pin to the DRAM memory;

a latch having:
an input coupled to an output of the DRAM memory;
an output coupled to said interface;
a latching signal input coupled to said latching signal pin; and wherein when said latching signal pin is disabled, said latch is transparent.

* * * * *